(12) United States Patent
King et al.

(10) Patent No.: US 7,686,446 B2
(45) Date of Patent: Mar. 30, 2010

(54) VERTICAL DESKTOP PRINTER

(76) Inventors: Tobin Allen King, 393 Darling Street, Balmain, NSW (AU) 2041; Kia Silverbrook, 393 Darling Street, Balmain, NSW (AU) 2041

( * ) Notice: Subject to any disclaimer, the term of this patent is extended or adjusted under 35 U.S.C. 154(b) by 1099 days.

(21) Appl. No.: 11/014,727

(22) Filed: Dec. 20, 2004

(65) Prior Publication Data

US 2006/0028529 A1 Feb. 9, 2006

Related U.S. Application Data

(63) Continuation-in-part of application No. 10/760,254, filed on Jan. 21, 2004.

(51) Int. Cl.
*B41J 29/13* (2006.01)
(52) U.S. Cl. .................. 347/108; 347/42
(58) Field of Classification Search .......... 347/42, 347/108
See application file for complete search history.

(56) References Cited

U.S. PATENT DOCUMENTS

| | | | |
|---|---|---|---|
| 4,727,387 A | | 2/1988 | Israely |
| 5,682,186 A | | 10/1997 | Bohorquez et al. |
| 5,982,969 A | * | 11/1999 | Sugiyama et al. ........... 385/123 |
| 6,084,622 A | * | 7/2000 | Sugiura et al. ............. 347/170 |
| 6,281,912 B1 | | 8/2001 | Silverbrook |
| 6,382,769 B1 | | 5/2002 | Silverbrook |
| 6,439,908 B1 | | 8/2002 | Silverbrook et al. |
| 6,443,555 B1 | | 9/2002 | Silverbrook et al. |
| 6,502,614 B1 | | 1/2003 | King et al. |
| 6,557,976 B2 | | 5/2003 | McElfresh et al. |
| 2001/0040617 A1 | * | 11/2001 | Yoshino et al. ............. 347/108 |
| 2003/0081097 A1 | | 5/2003 | Gil et al. |
| 2004/0032481 A1 | * | 2/2004 | Sides, II .................... 347/108 |
| 2004/0212647 A1 | * | 10/2004 | Yakura et al. ................. 347/13 |
| 2005/0035998 A1 | | 2/2005 | Ando et al. |

FOREIGN PATENT DOCUMENTS

| | | | |
|---|---|---|---|
| JP | 01231755 A | * | 9/1989 |
| JP | 03-234651 | | 10/1991 |
| JP | 2001096847 A | * | 4/2001 |
| JP | 2002-036586 | | 2/2002 |
| JP | 2002-127426 | | 5/2002 |
| WO | WO 00/54973 | | 9/2000 |
| WO | WO 01/39981 A1 | | 6/2001 |

\* cited by examiner

*Primary Examiner*—Manish S Shah
*Assistant Examiner*—Laura E Martin

(57) ABSTRACT

A desktop printer having a relatively small "footprint" on a desktop is provided. It has a base and a print engine connected together by a substantially vertically extending body of the printer. A media supply and collector are provided on surfaces of the body so as to be substantially vertically disposed, where the media is supplied to the print engine for printing from the supply and is delivered to the collector after printing.

20 Claims, 43 Drawing Sheets

VERTICAL DESKTOP PRINTER

The present application is a Continuation-In-Part application of U.S. Ser. No. 10/760,254 filed on Jan. 21, 2004. In the interests of brevity, the disclosure of the parent application is incorporated in its entirety into the present specification by cross reference.

FIELD OF THE INVENTION

The present invention relates to a high-speed printer, and more particularly to a method of collection printouts from a desktop printer which can print more than 30 pages or more a minute at high quality whilst occupying a minimum amount of space.

CO-PENDING APPLICATIONS

The following applications have been filed by the Applicant simultaneously with the present application:

| | | | | | |
|---|---|---|---|---|---|
| 7,152,972 | 11/014,731 | 11/014,764 | 11/014,763 | 7,331,663 | 7,360,861 |
| 7,328,973 | 11/014,760 | 11/014,757 | 7,303,252 | 7,249,822 | 11/014,762 |
| 7,311,382 | 7,360,860 | 7,364,257 | 7,390,075 | 7,350,896 | 11/014,758 |
| 7,384,135 | 7,331,660 | 11/014,738 | 11/014,737 | 7,322,684 | 7,322,685 |
| 7,311,381 | 7,270,405 | 7,303,268 | 11/014,735 | 7,399,072 | 7,393,076 |
| 11/014,750 | 11/014,749 | 7,249,833 | 11/014,769 | 11/014,729 | 7,331,661 |
| 11/014,733 | 7,300,140 | 7,357,492 | 7,357,493 | 11/014,766 | 7,380,902 |
| 7,284,816 | 7,284,845 | 7,255,430 | 7,390,080 | 7,328,984 | 7,350,913 |
| 7,322,671 | 7,380,910 | 11/014,717 | 11/014,716 | 11/014,732 | 7,347,534 |
| 7,306,320 | 7,377,635 | 11/014,730 | | | |

The disclosures of these co-pending applications are incorporated herein by reference.

CROSS REFERENCES TO RELATED APPLICATIONS

The following patents or patent applications filed by the applicant or assignee of the present invention are hereby incorporated by cross-reference.

| | | | | | |
|---|---|---|---|---|---|
| 7,364,256 | 7,258,417 | 7,293,853 | 7,328,968 | 7,270,395 | 11/003,404 |
| 11/003,419 | 7,334,864 | 7,255,419 | 7,284,819 | 7,229,148 | 7,258,416 |
| 7,273,263 | 7,270,393 | 6,984,017 | 7,247,526 | 11/003,463 | 7,364,255 |
| 7,357,476 | 11/003,614 | 7,284,820 | 7,341,328 | 7,246,875 | 7,322,669 |
| 6,623,101 | 6,406,129 | 6,505,916 | 6,457,809 | 6,550,895 | 6,457,812 |
| 7,152,962 | 6,428,133 | 7,204,941 | 7,282,164 | 10/815,628 | 7,278,727 |
| 10/913,373 | 10/913,374 | 7,367,665 | 7,138,391 | 7,143,956 | 10/913,380 |
| 10/913,379 | 10/913,376 | 7,122,076 | 7,148,345 | 10/407,212 | 7,252,366 |
| 10/386,064 | 7,360,865 | 7,275,811 | 10/884,889 | 10/922,890 | 7,334,874 |
| 7,393,083 | 10/922,889 | 10/922,884 | 10/922,879 | 10/922,887 | 10/922,888 |
| 10/922,874 | 7,234,795 | 10/922,871 | 7,328,975 | 7,293,855 | 10/922,882 |
| 10/922,883 | 10/922,878 | 10/922,872 | 7,360,871 | 10/922,886 | 10/922,877 |
| 6,746,105 | 7,156,508 | 7,159,972 | 7,083,271 | 7,165,834 | 7,080,894 |
| 7,201,469 | 7,090,336 | 7,156,489 | 10/760,233 | 10/760,246 | 7,083,257 |
| 7,258,422 | 7,255,423 | 7,219,980 | 10/760,253 | 10/760,255 | 7,367,649 |
| 7,118,192 | 10/760,194 | 7,322,672 | 7,077,505 | 7,197,354 | 7,077,504 |
| 10/760,189 | 7,198,355 | 10/760,232 | 7,322,676 | 7,152,959 | 7,213,906 |
| 7,178,901 | 7,222,938 | 7,108,353 | 7,104,629 | 7,246,886 | 7,128,400 |
| 7,108,355 | 6,991,322 | 7,287,836 | 7,118,197 | 10/728,784 | 7,364,269 |
| 7,077,493 | 6,962,402 | 10/728,803 | 7,147,308 | 10/728,779 | 7,118,198 |
| 7,168,790 | 7,172,270 | 7,229,155 | 6,830,318 | 7,195,342 | 7,175,261 |
| 10/773,183 | 7,108,356 | 7,118,202 | 10/773,186 | 7,134,744 | 10/773,185 |
| 7,134,743 | 7,182,439 | 7,210,768 | 10/773,187 | 7,134,745 | 7,156,484 |
| 7,118,201 | 7,111,926 | 10/773,184 | 09/575,197 | 7,079,712 | 6,825,945 |
| 7,330,974 | 6,813,039 | 6,987,506 | 7,038,797 | 6,980,318 | 6,816,274 |
| 7,102,772 | 7,350,236 | 6,681,045 | 6,728,000 | 7,173,722 | 7,099,459 |
| 09/575,181 | 7,068,382 | 7,062,651 | 6,789,194 | 6,789,191 | 6,644,642 |
| 6,502,614 | 6,622,999 | 6,669,385 | 6,549,935 | 6,987,573 | 6,727,996 |
| 6,591,884 | 6,439,706 | 6,760,119 | 7,295,332 | 7,064,851 | 6,826,547 |
| 6,290,349 | 6,428,155 | 6,785,016 | 6,831,682 | 6,741,871 | 6,927,871 |
| 6,980,306 | 6,965,439 | 6,840,606 | 7,036,918 | 6,977,746 | 6,970,264 |
| 7,068,389 | 7,093,991 | 7,190,491 | 10/901,154 | 10/932,044 | 10/962,412 |
| 7,177,054 | 7,364,282 | 10/965,733 | 10/965,933 | 10/974,742 | 10/986,375 |
| 6,982,798 | 6,870,966 | 6,822,639 | 6,737,591 | 7,055,739 | 7,233,320 |
| 6,830,196 | 6,832,717 | 6,957,768 | 7,170,499 | 7,106,888 | 7,123,239 |

-continued

| | | | | | |
|---|---|---|---|---|---|
| 10/727,181 | 10/727,162 | 7,377,608 | 7,399,043 | 7,121,639 | 7,165,824 |
| 7,152,942 | 10/727,157 | 7,181,572 | 7,096,137 | 7,302,592 | 7,278,034 |
| 7,188,282 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 |
| 10/727,160 | 10/934,720 | 7,369,270 | 6,795,215 | 7,070,098 | 7,154,638 |
| 6,805,419 | 6,859,289 | 6,977,751 | 6,398,332 | 6,394,573 | 6,622,923 |
| 6,747,760 | 6,921,144 | 10/884,881 | 7,092,112 | 7,192,106 | 7,374,266 |
| 10/854,522 | 10/854,488 | 7,281,330 | 10/854,503 | 7,328,956 | 10/854,509 |
| 7,188,928 | 7,093,989 | 7,377,609 | 10/854,495 | 10/854,498 | 10/854,511 |
| 7,390,071 | 10/854,525 | 10/854,526 | 10/854,516 | 7,252,353 | 10/854,515 |
| 7,267,417 | 10/854,505 | 10/854,493 | 7,275,805 | 7,314,261 | 10/854,490 |
| 7,281,777 | 7,290,852 | 10/854,528 | 10/854,523 | 10/854,527 | 10/854,524 |
| 10/854,520 | 10/854,514 | 10/854,519 | 10/854,513 | 10/854,499 | 10/851,501 |
| 7,266,661 | 7,243,193 | 10/854,518 | 10/854,517 | 10/934,628 | |

BACKGROUND OF THE INVENTION

Desktop printers for use in home and office environments are well known and are widely commercially available with varying designs and capabilities. Typically, commercially available desktop printers are of a size and configuration that requires a relatively substantial amount of space to accommodate the printer unit and associated components, such as print media input and/or output trays. Indeed, much of this large "footprint" of conventional printers may be occupied by the input and output trays. The footprint of the printer typically also includes the space required for accessing the printer and for printing in an unobstructed manner.

Even in conventional printers which do not use such print media trays and incorporate print media source and collection areas within the printer unit itself, a limitation in minimising the printer's footprint still remains in that it must at the very least correspond to the largest print media size to be printed, for example, A4 or A3 paper.

With the ongoing trend of smaller and more compact workstations it is necessary to maximise the available workspace, such that it is becoming increasingly necessary to reduce the amount of space occupied by equipment, such as desktop printers. Thus, there is a need to minimise the footprint of a desktop printer.

SUMMARY OF THE INVENTION

In a first aspect the present invention provides a printer for printing on media supplied from a media supply and delivering printed media to a media collector, comprising:
  a base;
  a print engine for printing an image on media; and
  a substantially vertically extending body connecting the base and the print engine, said body having at least two substantially vertically extending surfaces,
  wherein the media supply is provided on a first surface of said surfaces of the body and the media collector is provided on a second surface of said surfaces of the body.

Optionally the print engine comprises a pagewidth inkjet printhead.

Optionally the first surface of the body is opposite the second surface.

Optionally the print engine is provided on top of the body.

Optionally the media supply is inclined to the vertical by an angle of about 15° to 20°.

Optionally the media collector is inclined to the vertical by an angle of about 10° to 15°.

Optionally the media supply comprises an input tray for storing media for printing arranged to be hingedly received by a receiving portion of the body formed by the first surface.

Optionally the print engine comprises a media transport system for transporting media from the media supply to the media collector via the print engine.

Optionally the printer further comprises a head unit hingedly engaged with the body so as to cover the print engine and media transport system.

Optionally the head unit comprises a user interface via which a user of the printer is able to control the operation of the printer.

Optionally the user interface comprises a touch screen for displaying information pertaining to the operation of the printer and allowing said user to control said operation by touching predefined areas of the screen.

Optionally the base comprises:
  power connectors for connection to an external power source for supply of power to the media transport system, the print engine and the user interface; and
  data connectors for connection to an external data source for supply of data to the print engine and the user interface.

Optionally the head unit comprises a manual feeding slot located above the position of the print engine for manual feeding of media to the print engine.

In a further aspect there is provided a printer, further comprising:
  a printhead incorporated in the print engine for printing on said media; and
  a transport device for transporting the media through a delivery path from the media supply to the media collector via the printhead,
  wherein the print media supply and collector are substantially vertically disposed, and
  the print media delivery path passes through an angle of at least 140°.

In a further aspect there is provided a printer, further comprising means for collecting printed sheets of media from the print engine, wherein the means:
  ejects a printed sheet from the print engine;
  allows said sheet to fall from the print engine assuming a substantially vertical path;
  captures the leading edge of said sheet; and
  applies a retaining force to said sheet, said retaining force having a component substantially perpendicular to said substantially vertical path; and
  collects said sheet on a retaining surface of the media collector, said retaining surface being inclined with respect to said substantially vertical path.

In a further aspect there is provided a printer, wherein:
the print engine comprises an outlet arranged to eject printed sheets of the media from the print engine in a substantially vertical path;
the media collector is disposed beneath said outlet and has a collection surface inclined with respect to said substantially vertical path for collecting said ejected sheets and a foot portion projecting from the collection surface; and
the foot portion is arranged to project into the substantially vertical path of said ejected sheets and has a contact surface arranged to contact a leading edge of said sheets to stop movement thereof in said substantially vertical path, said contact surface being arranged to urge said sheets toward the collection surface for collection.

In a further aspect there is provided a printer, wherein the media collector comprises a substantially vertical collection surface adapted to collect one or more sheets of the media fed from the print engine in a substantially vertical direction and to retain said one or more sheets in a substantially vertical orientation, the collection surface being arranged to impart a lateral curvature to the collected print media orthogonal to the feed direction of the media.

In a further aspect there is provided a printer incorporating a system for indicating a state of the printer, the system comprising:
a light source arranged to emit light of a plurality of colours;
a light transmitting channel extending along a surface of the printer and arranged so as to transmit light from the light source and emit said light along a length of the channel; and
a controller arranged to control the light source in response to a detected operational state of the printer, so that the light transmitting channel emits predefined different colours to indicate predefined different states of the printer.

In a further aspect there is provided a printer, further comprising:
a housing having the print engine;
a media supply tray incorporated in the media supply for receiving media for printing by said print engine, said media supply tray being arranged to be received by the housing so that said media is maintained in a substantially vertical orientation; and
a retaining element provided on the housing and arranged to contact the media when the supply tray is received by the housing so as to retain the media in said substantially vertical orientation.

In a further aspect there is provided a printer, further comprising a detachable stand for supporting the body, the media supply, the print engine and the media collector in an operating orientation in which the media supply and collector are substantially vertically disposed, and the media delivery path defines an angle of at least 140°.

In a further aspect there is provided a printer arranged as a desktop printer, wherein the print engine incorporates a pagewidth printhead arranged as a two-dimensional array of at least 5000 printing nozzles for printing across the width of media supplied from the substantially vertically orientated media supply and delivered to the substantially vertically orientated media collector after printing.

In a further aspect there is provided a printer arranged as a desktop printer, wherein the print engine has an array of ink ejecting nozzles configured as a pagewidth printhead arranged to print on media supplied from the substantially vertically orientated media supply by ejecting drops of ink across the width of said media at a rate of at least 50 million drops per second and to deliver the printed media to the substantially vertically orientated media collector.

In another aspect the present invention provides a printer comprising:
a print media supply for supplying print media for printing;
a printhead for printing on said print media;
a print media collector for collecting said printed print media; and
a transport device for transporting the print media through a delivery path from the print media supply to the print media collector via the printhead,
wherein the print media supply and collector are substantially vertically disposed, and
the print media delivery path passes through an angle of at least 140°.

In another aspect the present invention provides a printer for printing on media supplied from a media supply and delivering printed media to a media collector, comprising:
a base;
a print engine for printing an image on media; and
a substantially vertically extending body connecting the base and the print engine, said body having at least two substantially vertically extending surfaces,
wherein the media supply is provided on a first surface of said surfaces of the body and the media collector is provided on a second surface of said surfaces of the body.

In another aspect the present invention provides a method of collecting printed sheets of media from a printer, comprising the steps of:
ejecting a printed sheet from the printer;
allowing said sheet to fall from the printer assuming a substantially vertical path;
capturing the leading edge of said sheet; and
applying a retaining force to said sheet, said retaining force having a component substantially perpendicular to said substantially vertical path; and
collecting said sheet on a retaining surface, said retaining surface being inclined with respect to said substantially vertical path.

In another aspect the present invention provides a system for collecting printed sheets of media from a printer, comprising:
a print engine having a printhead for printing images on sheets of media and an outlet arranged to eject said printed sheets from the print engine in a substantially vertical path; and
a collector disposed beneath said outlet having a collection surface inclined with respect to said substantially vertical path for collecting said ejected sheets and a foot portion projecting from the collection surface,
wherein the foot portion is arranged to project into the substantially vertical path of said ejected sheets and has a contact surface arranged to contact a leading edge of said sheets to stop movement thereof in said substantially vertical path, said contact surface being arranged to urge said sheets toward the collection surface for collection.

In another aspect the present invention provides a collector for collecting print media fed from a printer comprising:
a substantially vertical collection surface adapted to collect one or more sheets of print media fed from said printer in a substantially vertical direction and to retain said one or more sheets in a substantially vertical orientation, wherein the collection surface is arranged to impart a lateral curvature to the collected print media orthogonal to the feed direction of the print media.

In another aspect the present invention provides a system for indicating a state of a printer, comprising:

a light source arranged to emit light of a plurality of colours;

a light transmitting channel extending along a surface of the printer and arranged so as to transmit light from the light source and emit said light along a length of the channel; and a controller arranged to control the light source in response to a detected operational state of the printer, so that the light transmitting channel emits predefined different colours to indicate predefined different states of the printer.

In another aspect the present invention provides a printing device for printing an image onto a surface of print media comprising:

a housing having a print engine for printing;

a print media supply tray for receiving print media for printing by said print engine, said print media supply tray arranged to be received by the housing so that said print media is maintained in a substantially vertical orientation; and a retaining element provided on the housing and arranged to contact the print media when the supply tray is received by the housing so as to retain the print media in said substantially vertical orientation.

In another aspect the present invention provides a printer comprising:

a print media supply for supplying print media for printing;

a printhead for printing on said print media;

a print media collector for collecting said printed print media;

a transport device for transporting the print media through a delivery path from the print media supply to the print media collector via the printhead; and a detachable stand for supporting the print media supply, the printhead and the print media collector in an operating orientation wherein the print media supply and the print media collector are substantially vertically disposed, and the print media delivery path defines an angle of at least 140°.

In another aspect the present invention provides a desktop printer comprising a pagewidth printhead arranged as a two-dimensional array of at least 5000 printing nozzles for printing across the width of media supplied from a substantially vertically orientated media supply and delivered to a substantially vertically orientated media collector after printing, the media supply and collector being provided on different sides of a substantially vertically extending body of the printer.

In another aspect the present invention provides a desktop printer comprising an array of ink ejecting nozzles configured as a pagewidth printhead arranged to print on media supplied from a substantially vertically orientated media supply by ejecting drops of ink across the width of said media at a rate of at least 50 million drops per second and to deliver the printed media to a substantially vertically orientated media collector, the media supply and collector being provided on different sides of a substantially vertically extending body of the printer.

DETAILED DESCRIPTION OF THE EMBODIMENTS

Figure 1:
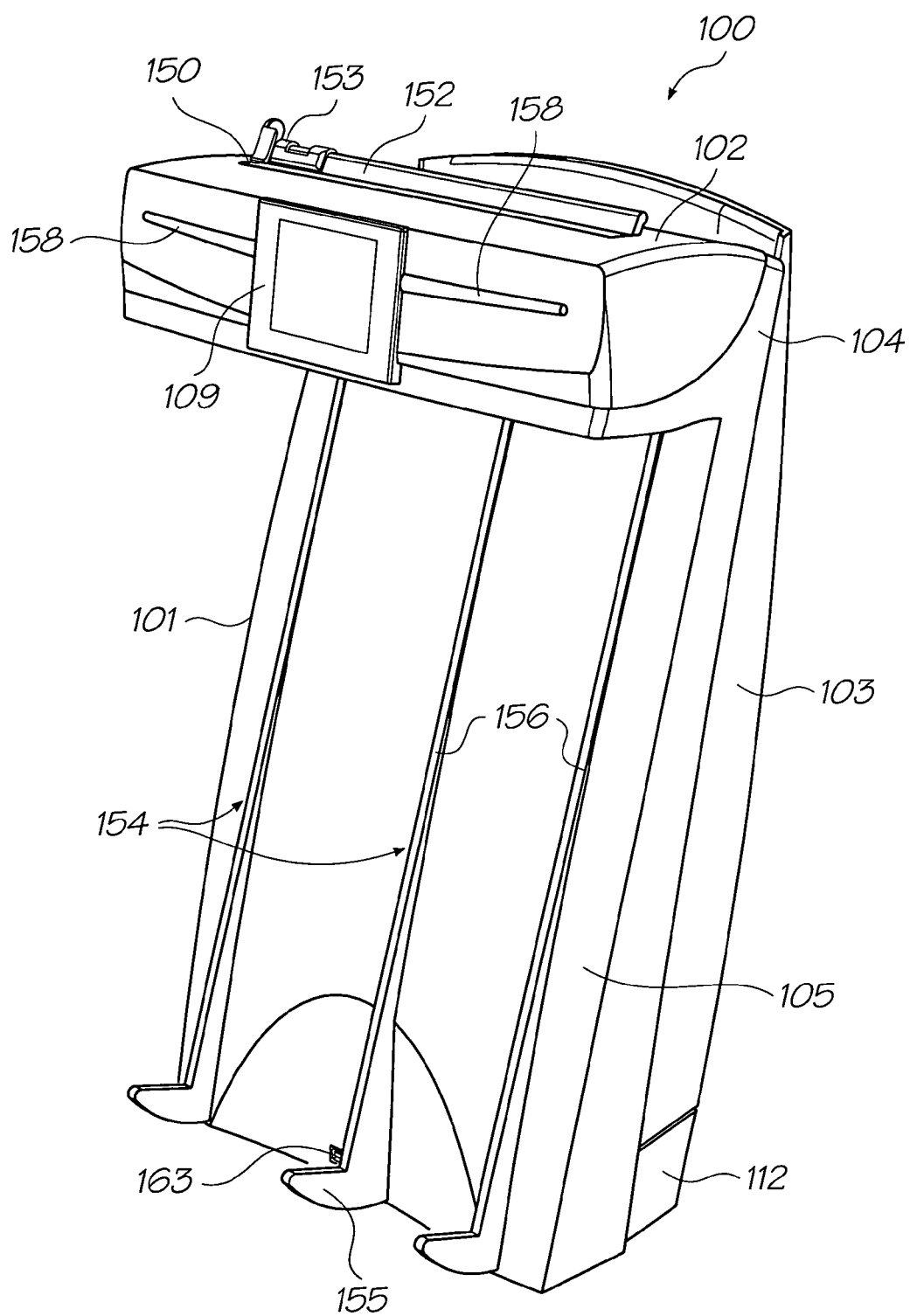
FIG. 1 shows a perspective view of a printer in accordance with an embodiment of the present invention.
Figure 2:
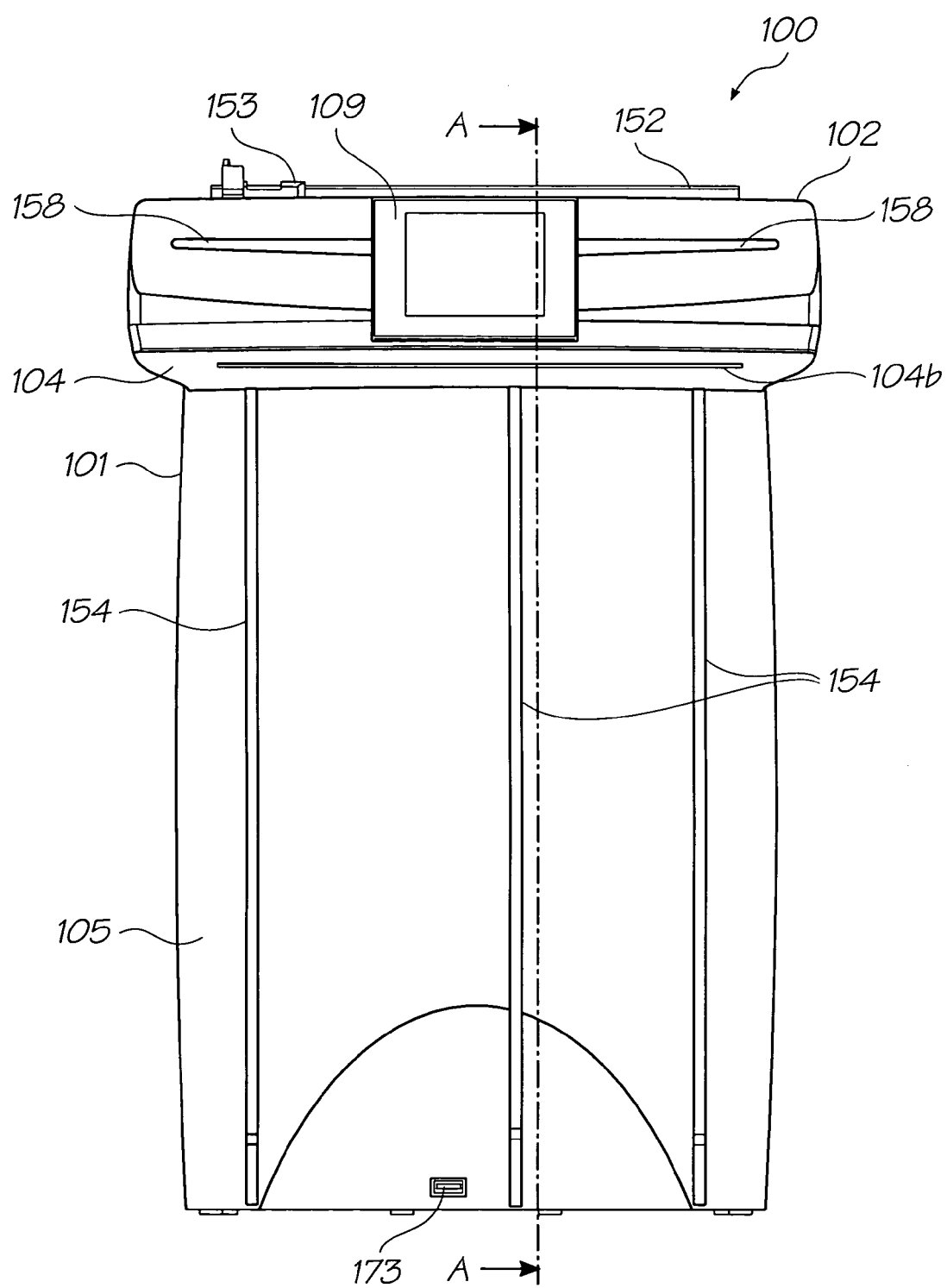
FIG. 2 shows a front plan view of the printer of FIG. 1.

A printer 100 in accordance with the present invention is variously illustrated in FIGS. 1 to 7. The printer 100 comprises a housing 101, a head unit 102 and a print media source tray assembly 103.

The housing 101 is provided as a substantially vertically extending body of the printer 100 having an inverted L-shape with an upper portion 104 and a lower portion 105. The upper portion 104 is arranged to receive a picker assembly 106 and a print engine assembly 107 (see FIGS. 6 and 7) which together provide a print media transport system for transporting print media from the print media source tray assembly 103 which acts as a print media source or supply of the printer 100, to the printing mechanics of the print engine assembly 107 (described later). The lower portion 105 is arranged as a print media collection area or collector. In this description, all references to upper, lower, outer, inner, bottom and top are provided with respect to the orientation of the printer 100 shown in FIGS. 1 to 7.

Figure 6:
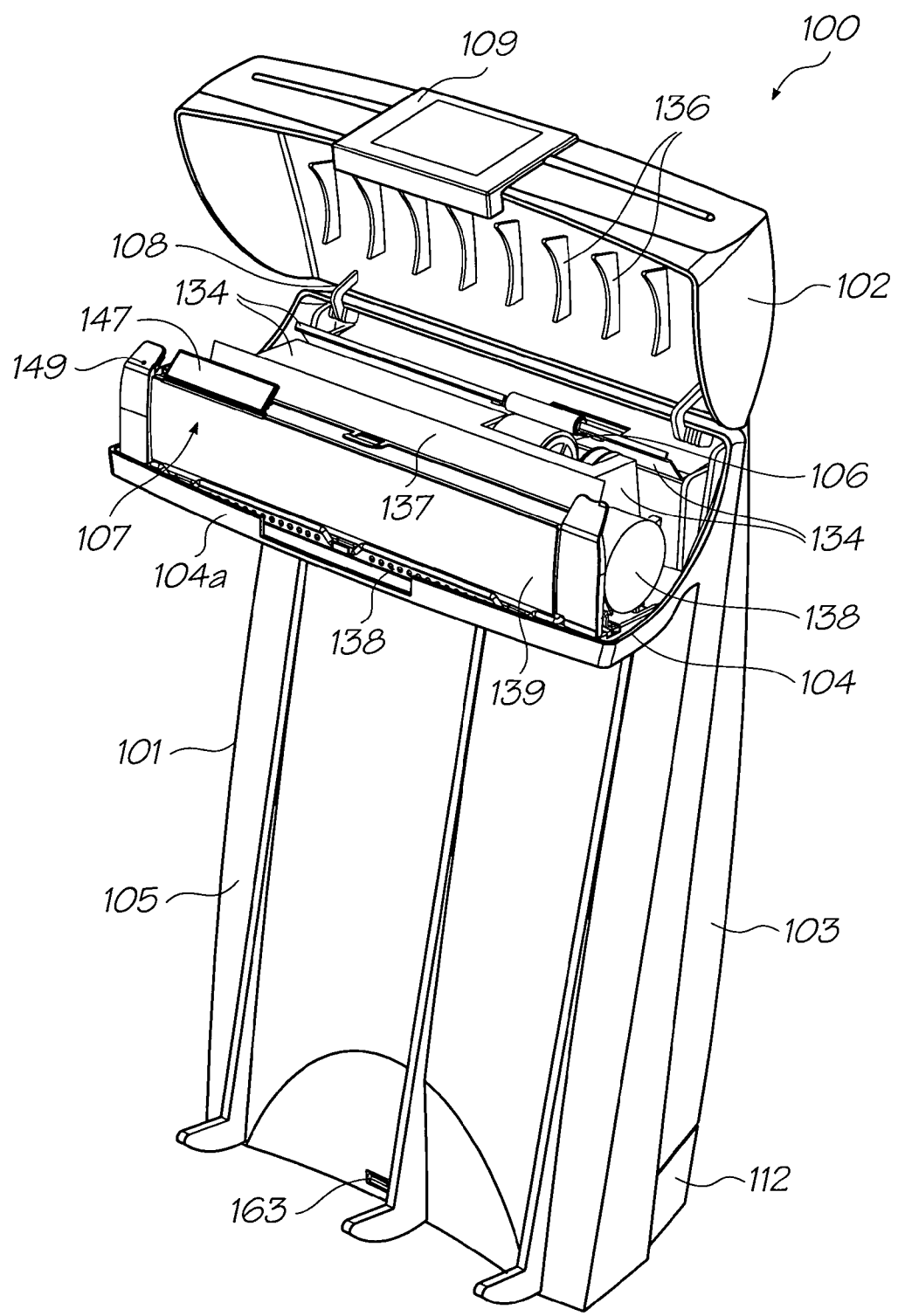
FIG. 6 illustrates components of a housing and a head unit of the printer of FIG. 1.

The head unit 102 covers the picker and print engine assemblies 106 and 107 held by the upper portion 104 of the housing 101 and is pivotally attached to the upper portion 104 via hinges 108 (see FIG. 6). This provides easy access to the picker and print engine assemblies 106 and 107 so that maintenance thereof and the clearing of print media jams and the like can be performed. The head unit 102 incorporates a user interface 109 via which a user can operate the printer 100 (discussed in more detail later).

Figure 5:
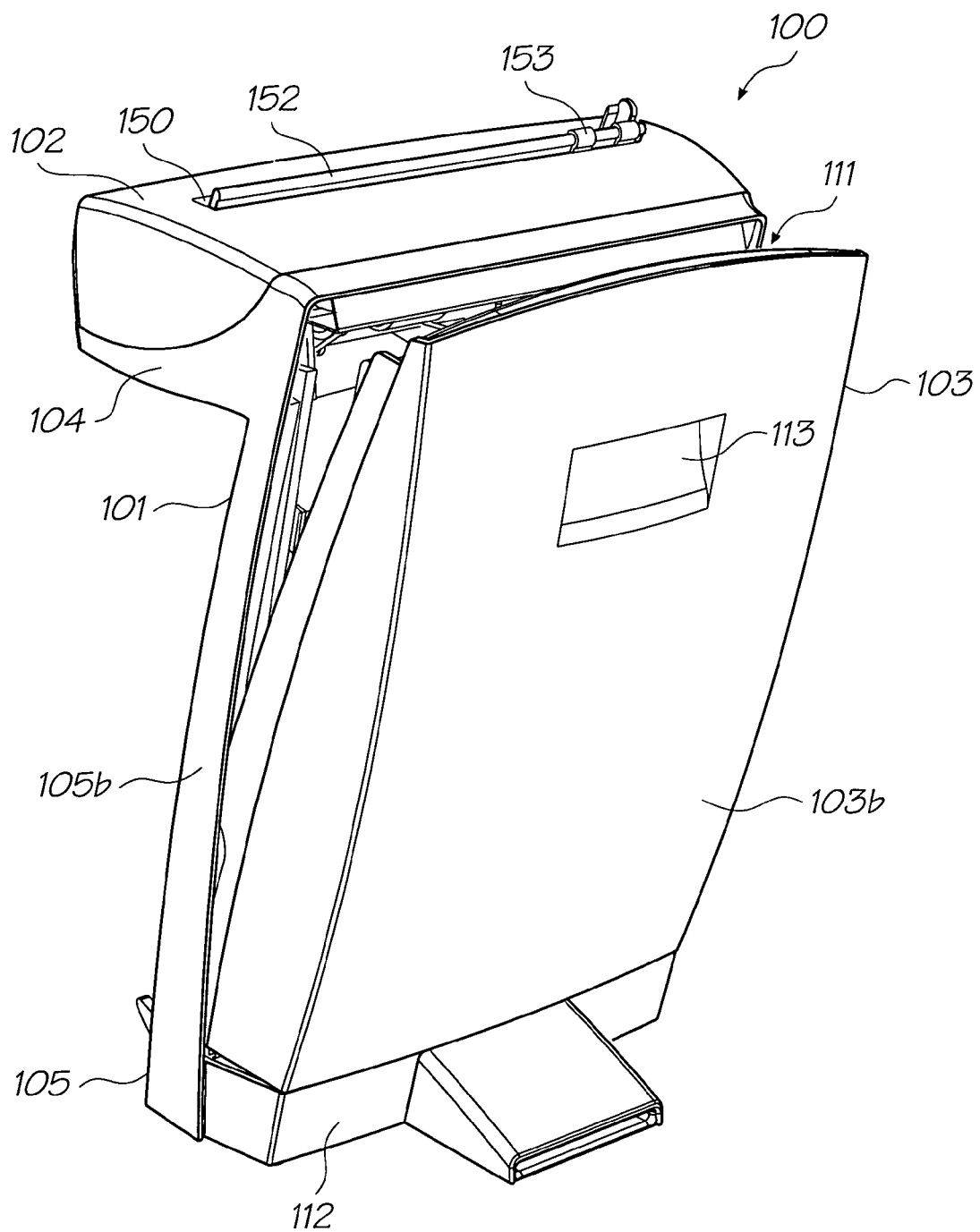
FIG. 5 illustrates an open position of the print media source tray assembly of FIG. 4.
Figure 7:
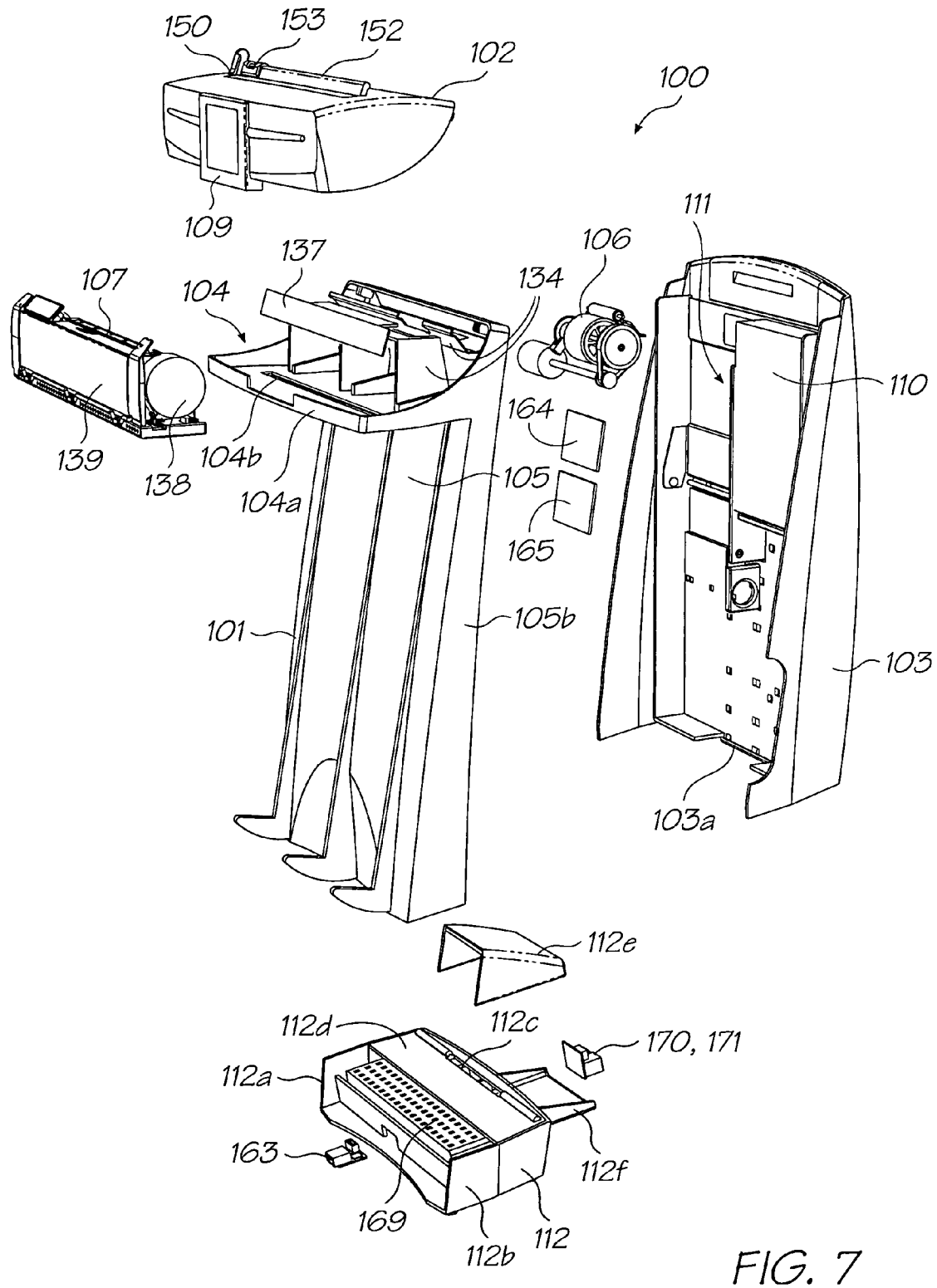
FIG. 7 shows an exploded view of the printer of FIG. 1 illustrating the various components thereof.

The print media source tray assembly 103 is received by the lower portion 105 of the housing 101, as is shown in FIGS. 5 and 6, and is capable of storing print media 110 for printing in a paper tray portion 111 thereof (see FIG. 7). The print media 110 may be provided in the form of variously sized print media stacks each comprising of about 250 sheets, and up to 500 sheets, i.e., a ream of paper. For example, in FIG. 7 photographic print media, e.g., 4"×6" paper, is held by the source tray assembly 103, whilst in FIG. 8 A4 paper is held. In the following description the print media for use in the printer 100 is referred to as paper, however other forms of print media are applicable.

The housing 101 and the source tray assembly 103 are supported by a base unit 112 which houses power and data connections for the various electronic components of the printer 100. Particularly, the collection area 105 of the housing 101 and the source tray assembly 103 are supported by the base unit 112 in a substantially vertical orientation. That is, the planar surfaces of the source tray assembly 103 and the collection area 105 which are used to support paper for printing and paper which has been printed, respectively, are held by the base unit 112 so as to be substantially vertically oriented, which provides a reduced "footprint" of the printer 100 as discussed in more detail later.

Figure 13:
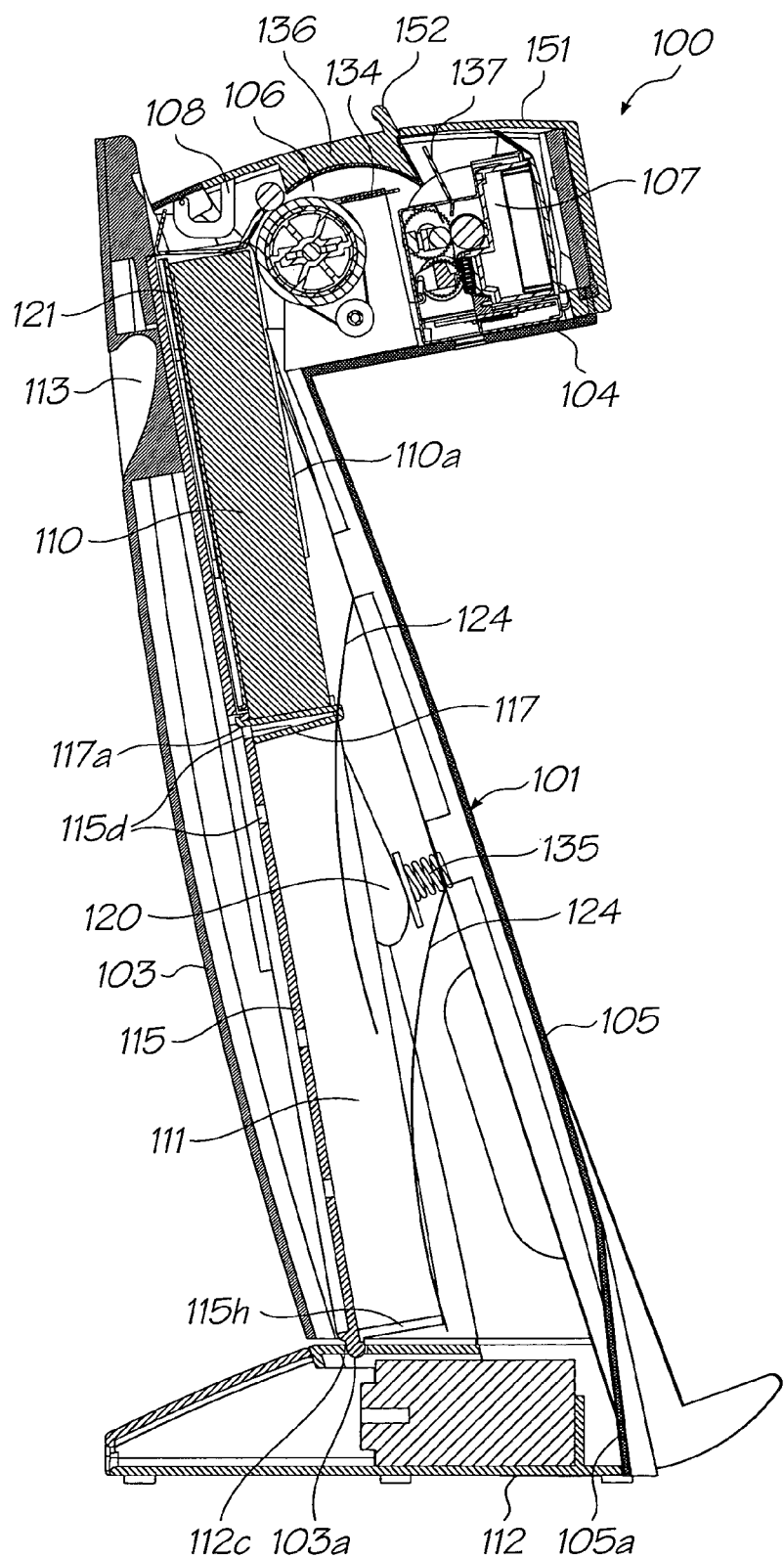
FIG. 13 shows a cross-sectional view of the printer taken along the line A-A of FIG. 2.

Referring to FIGS. 5, 7, 8, 11 and 13 (where FIG. 13 shows a cross-sectional view of the printer 100 taken along the line A-A of FIG. 2), the printer 100 is constructed by sliding an inner surface 105a and side portions 105b of the collection area 105 over front edges 112a and side portions 112b, respectively, of the base unit 112, with the upper portion 104 of the housing 101 mounting the print engine assembly and picker assemblies 106 and 107 hingedly covered by the head unit 102.

The source tray assembly 103 is secured to the base unit 112 by engaging a tab 103a on the bottom edge thereof with a slot 112c in an upper surface 112d of the base unit 112. Through this, the source tray assembly 103 can be hingedly engaged with the housing 101, as shown in FIG. 5, in order to access the paper tray portion 111. This is done by using a handle recess 113 provided in an outer surface 103b of the source tray assembly 103. Those skilled in the art will understand that the above construction technique is merely one such technique, and alternative means of constructing the printer 100, such as using one or more "clipping" arrangements, are within the scope of the present invention.

The printer 100 thus constructed is intended for use as a desktop printer which is capable of printing information onto paper at a rate of at least 30 pages per minute (ppm), preferably at least 60 ppm, with a printing resolution providing for so-called photographic quality printing of at least 1200 dots per inch (dpi), preferably at least 1600 dpi. In use, the printer 100 presents a footprint, i.e., the surface area occupied by the printer 100 on the desktop, which is greatly reduced from that of conventional printers since the printer 100 along with its paper supply and collector, i.e., the source tray assembly 103 and the collection area 105, stands in a substantially vertical orientation with respect to the desktop surface. The manner in which the printer 100 operates in this substantially vertical orientation will now be discussed.

Figure 8:
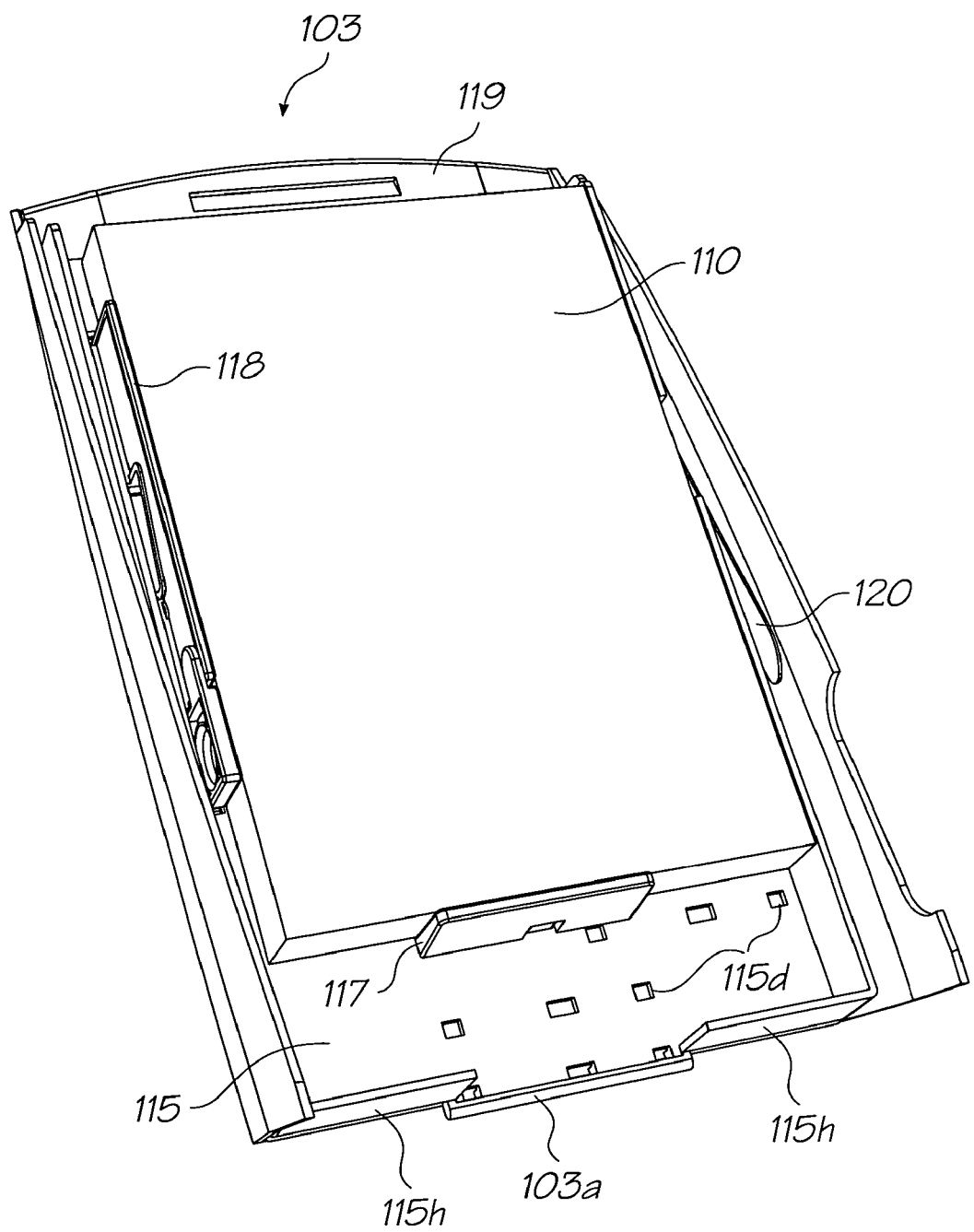
FIG. 8 illustrates the print media source tray assembly of FIG. 4 loaded with A4 print media.
Figure 9:
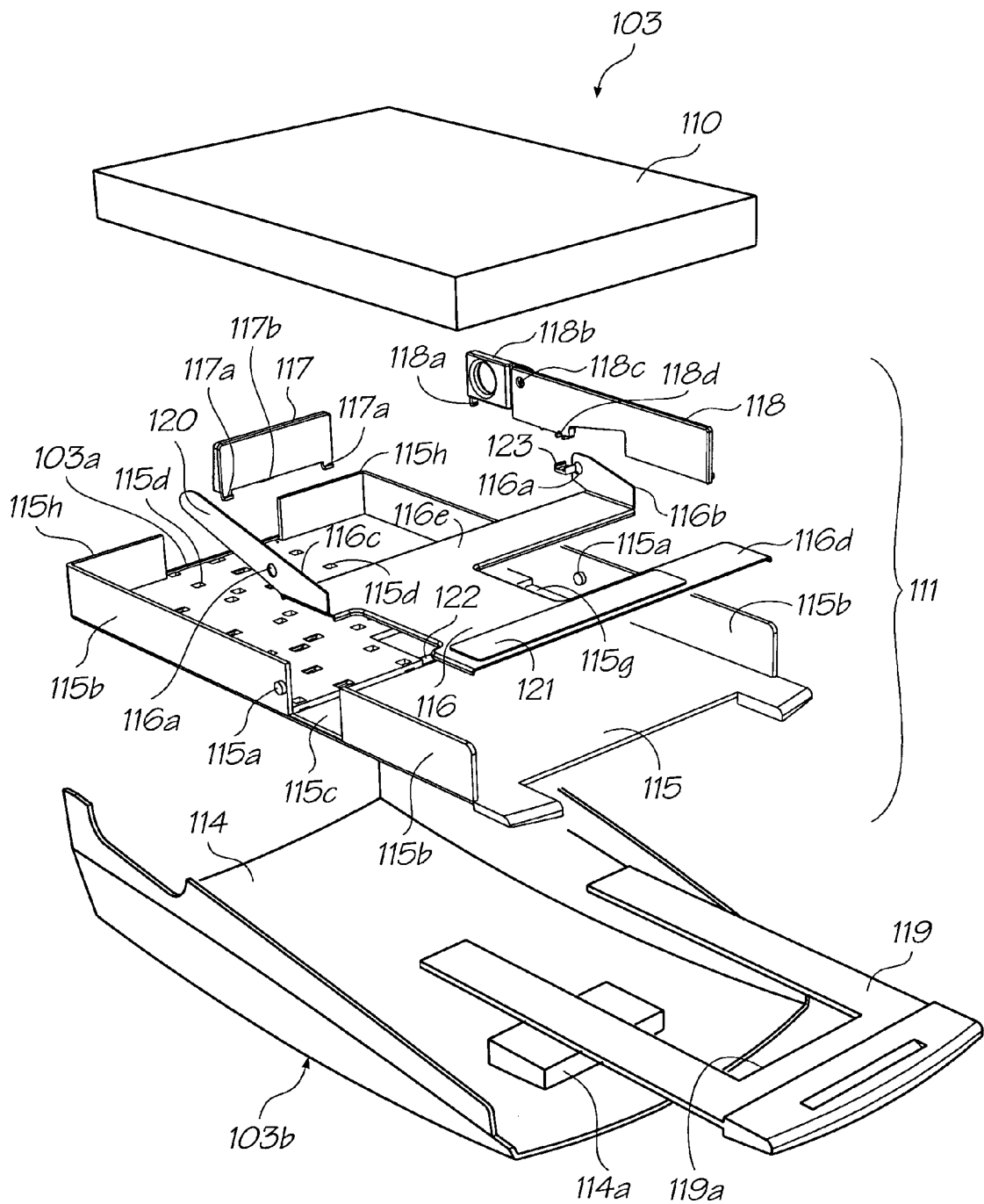
FIG. 9 shows an exploded view of the print media source tray assembly of FIG. 8.

FIG. 8 illustrates the source tray assembly 103 separated from the printer 100 and holding the stack 110 of A4 paper, and FIG. 9 shows an exploded view of the source tray assembly 103 as shown in FIG. 8. As can be seen, the source tray assembly 103 comprises a cover portion 114 which forms the rear outer surface 103b of the printer 100 when the source tray assembly 103 is mounted to the base unit 112 and the housing 101 (see FIG. 4). The cover portion 114 holds the paper tray portion 111 which consists of a tray 115, a platen 116 arranged within the tray 115, a stop plate 117 and a fence plate 118. The paper stack 110 is loaded on the source tray assembly 103 by being placed on the platen 116 arranged in the tray 115 and is held in a desired location on the platen 116 by using the stop and fence plates 117 and 118.

Figure 19:
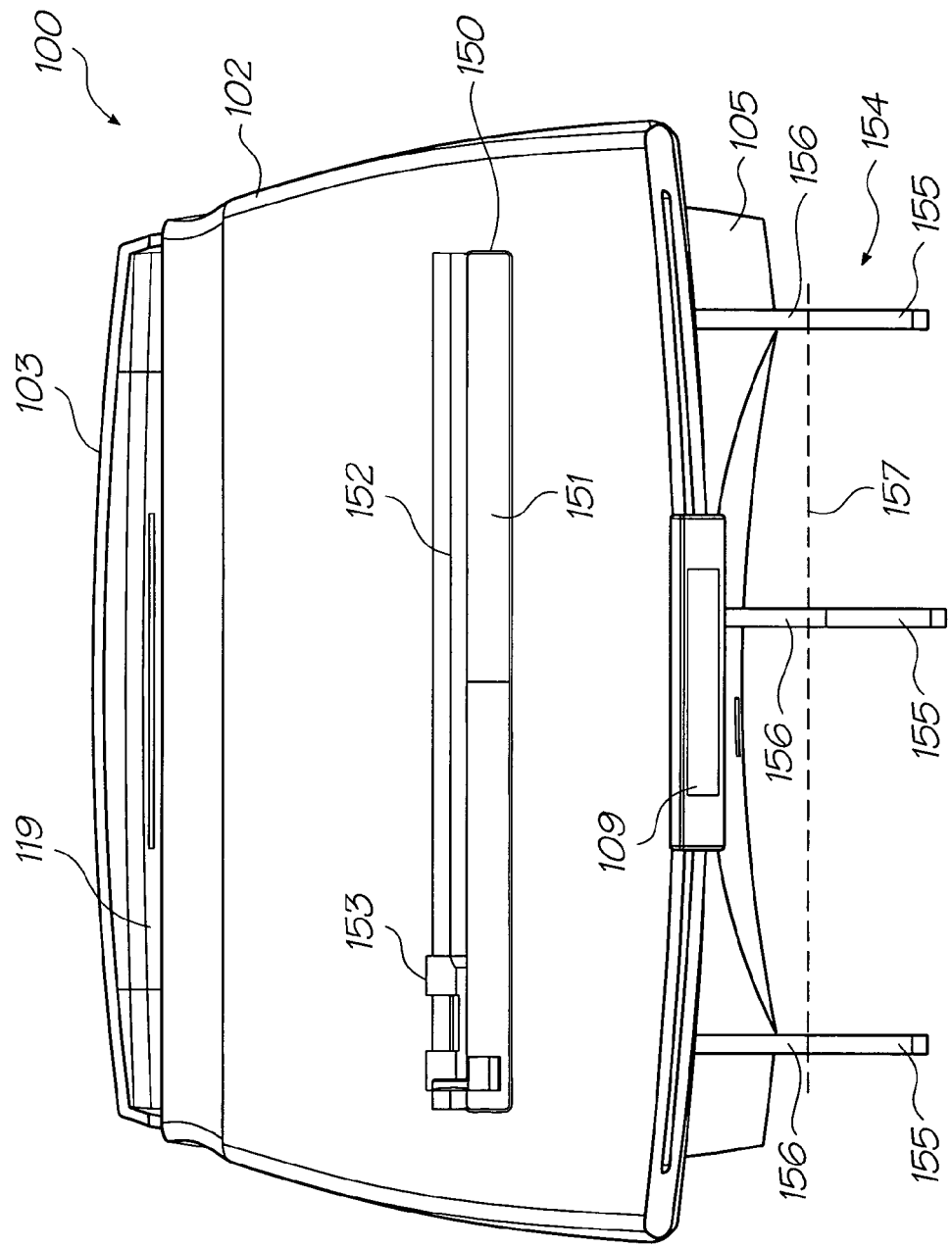
FIG. 19 shows a top plan view of the printer of FIG. 1.

A support member 119 is held between the cover portion 114 and the tray 115 so as to be slidable beyond the top edge of the source tray assembly 103 to an uppermost position, as is shown in FIG. 19. A raised portion 114*a* of the cover 114 contacts an inner edge 119*a* of the support member 119 thereby providing a lowermost position for the support member 119, as is shown in FIG. 8. The reasons for providing this slidable support member 119 are discussed later.

The platen 116 is secured to the tray 115 by way of engaging holes 116*a* in side portions 116*b* and 116*c* of the platen 116 with corresponding lugs 115*a* on side portions 115*b* of the tray 115. By way of this engagement, the platen 116 is able to pivot with respect to the tray 115. The reasons for providing this pivoting motion of the platen 116 will become apparent from the discussion below. The side portion 116*c* of the platen 116 situated at a lower end thereof below the pivots 115*a*/116*a* is angled away from the planar body of the platen 116 so as to provide a lever arm 120 for facilitating the pivoting of the platen 116.

A pad 121 is provided on an upper arm portion 116*d* of the platen 116, and the side portions 116*b* and 116*c* project from a lower arm portion 116*e* of the platen 116. The pad 121 is formed of a material, such as rubber, felt, cork, etc., which provides friction on the rear surface of the lowermost sheet of paper in the stack 110 loaded on the assembled platen 116 and tray 115. This friction is provided so as to assist in the process of picking-up the sheets of paper from the stack 110 for printing, which is discussed in detail later.

The stop plate 117 has (two) tabs 117*a* arranged to be able to engage with a plurality of (pairs of) holes 115*d* of the tray 115 and a tab 117*b* arranged to be able to engage with a plurality of further holes 115*e* of the tray 115. The holes 115*d* and 115*e* are provided in a section of the planar portion of the tray 115 below that which receives the platen 116, where one of the holes 115*e* is provided between each of a pair of the holes 115*d* so that the tabs 117*a* and 117*b* can be engaged therewith to secure the stop plate 117 to the tray 115 (see FIG. 13).

The fence plate 118 similarly has a tab 118*a* for engaging with holes 115*f* provided in a lateral row on the tray 115. The tab 118*a* is provided on a bottom edge of a locking member 118*b* which is used to lock the fence plate 118 in place on the tray 115 by engaging the tab 118*a* with one of the holes 115*f*. This is enabled by the locking member 118*b* being able to pivot with respect to the body of the fence plate 118 about a pivot point 118*c*. A hole (or depression) is provided in the locking member 118*b* to allow a user's finger and the like to be placed therein so as to disengage the tab 118*a* from the holes 115*f* of the tray 115. The fence plate 118 is secured to the tray 115 by engaging a clip portion 118*d* with a rod 122 provided in a recess 115*g* of the tray 115 and a clipping element 123, shown individually in FIG. 9, positioned beneath the rod 122. In this way, the fence plate 118 is able to slide laterally across the tray 115 along the rod 122.

Figure 10:
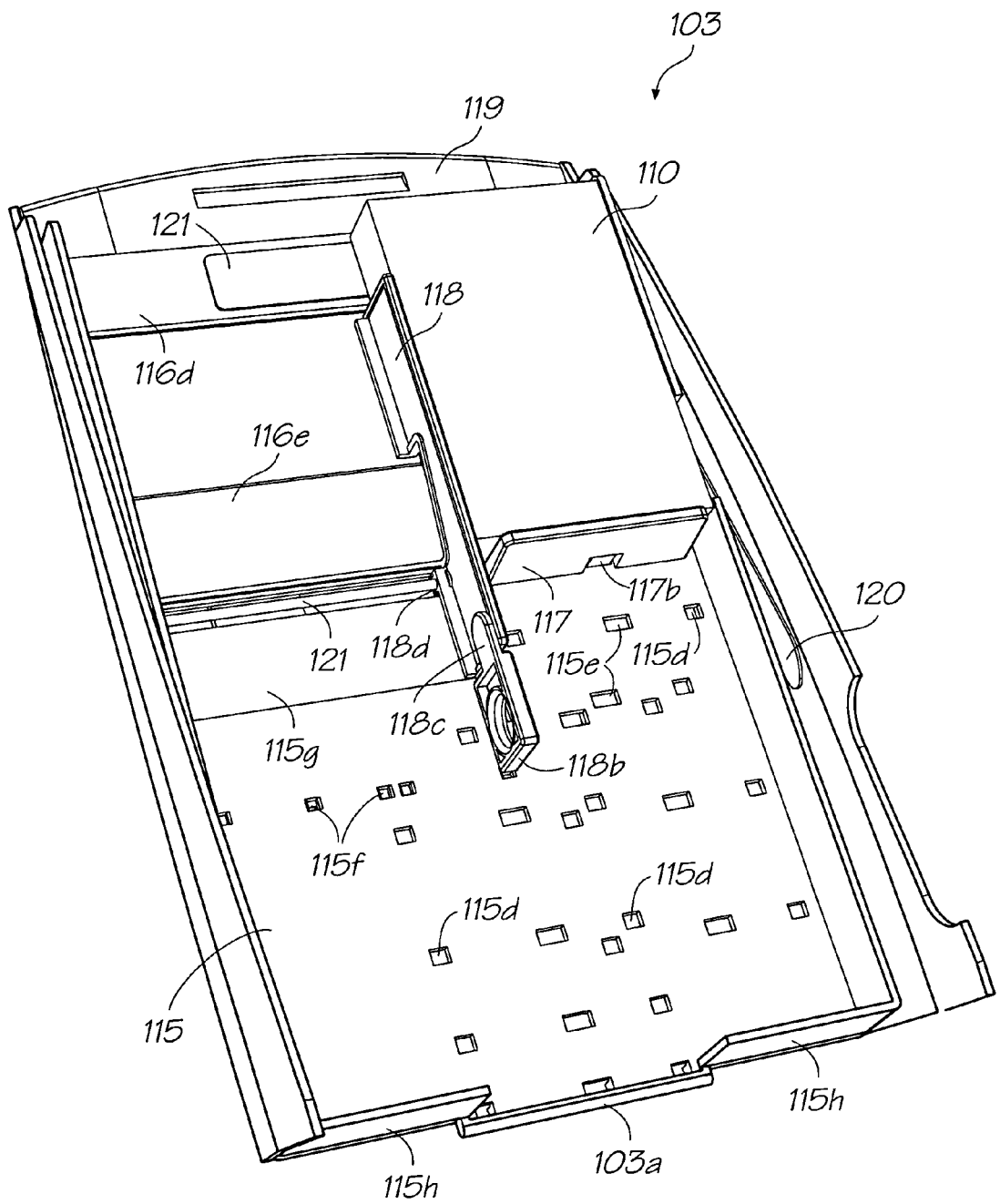
FIG. 10 illustrates the print media source tray assembly of FIG. 4 loaded with photographic print media.

The tray 115, and consequently the source tray assembly 103, is made to a size sufficient to accommodate the maximum sized paper to be used with the printer 100. In the embodiment shown in the figures, the maximum paper size that may be accommodated in this way is US legal (8.5"×14"). However, the printer 100 may be arranged to accommodate a different maximum print media size. Different sized paper is accommodated in the source tray assembly 103 as shown in FIGS. 8 and 10 by moving the stop and fence plates 117 and 118 into varying positions via the holes 115*d-f*. Those skilled in the art will understand that the above-described arrangement to accommodate variously sized paper stacks within the source tray assembly 103 is merely an example, and alternative arrangements and mechanisms may be used in accordance with the present invention to securely hold such paper stacks.

Figure 11:
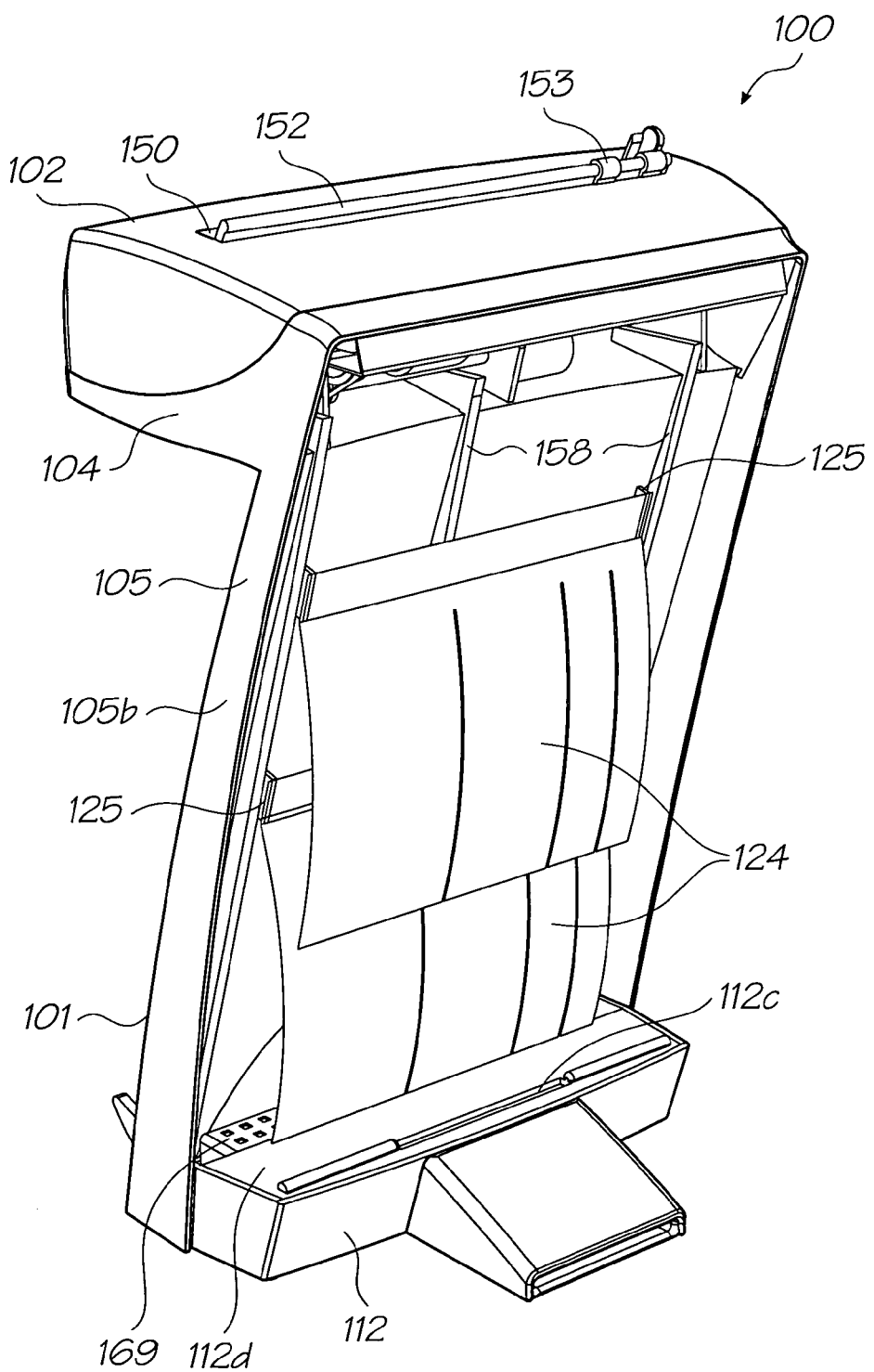
FIG. 11 illustrates the printer as shown in FIG. 4 with the print media source tray assembly removed.

FIG. 11 illustrates the inner section of the housing 101, with the housing 101 being mounted to the base unit 112. The inner section the housing 101 comprises foils 124 as retaining members for the paper stack 110. The foils 124 extend across the width of the inner section and are removably secured to the housing 101 via brackets 125 at one end thereof. For example, one of the foils 124 is shown removed in FIG. 12. When secured, the foils 124 hang down from their secured end so as to project out from the inner section of the housing 101. The foils 124 are made from a flexible material, such as plastic, but are secured so as to be resilient to small forces. The purpose of the foils 124 is as follows.

Referring to the cross-sectional view of the printer 100 in FIG. 13, the collection area 105 of the housing 101 is angled from the horizontal by about 75° to 80° (i.e., 10° to 15° from the vertical), which angle is provided so as to assist in collection of the printed paper from the print engine assembly 107 as discussed in more detail later. Consequently, when the source tray assembly 103 is mounted to the housing 101, it is at an angle of about 70° to 75° from the horizontal (i.e., 15° to 20° from the vertical). This angle on the source tray assembly 103 assists in the storage of the stack 110 and reduces the occurrence of "sagging" in the paper of the stack 110 over time. However, the action of the picker assembly 106 used to pick-up the topmost sheet from the stack 110 may cause subsequent sheet(s) to experience some movement that may cause them to separate slightly from the stack 110, particularly at the lower regions.

Thus, the foils 124 are provided to apply a retaining force against the sheets in the stack 110 urging them back against the stack 110 thereby preventing individual sheets from separating and falling into the lower region of the paper tray portion 111 which can cause jams to occur. The resilient nature of the foils 124 provides the appropriate retaining force to maintain the sheets in position. Whilst two foils 124 are shown a greater or lesser number of foils is within the scope of the present invention as to are foils having recessed portions along their length rather than being continuous, so long as the arrangement thereof provides the securing of the sheets in the stack 110. The stack 110 is situated at the upper right corner of the tray 115 so that a topmost sheet 110*a* of the stack 110 is presented to the picker assembly 106, as shown in FIGS. 6 and 14.

Figure 14:
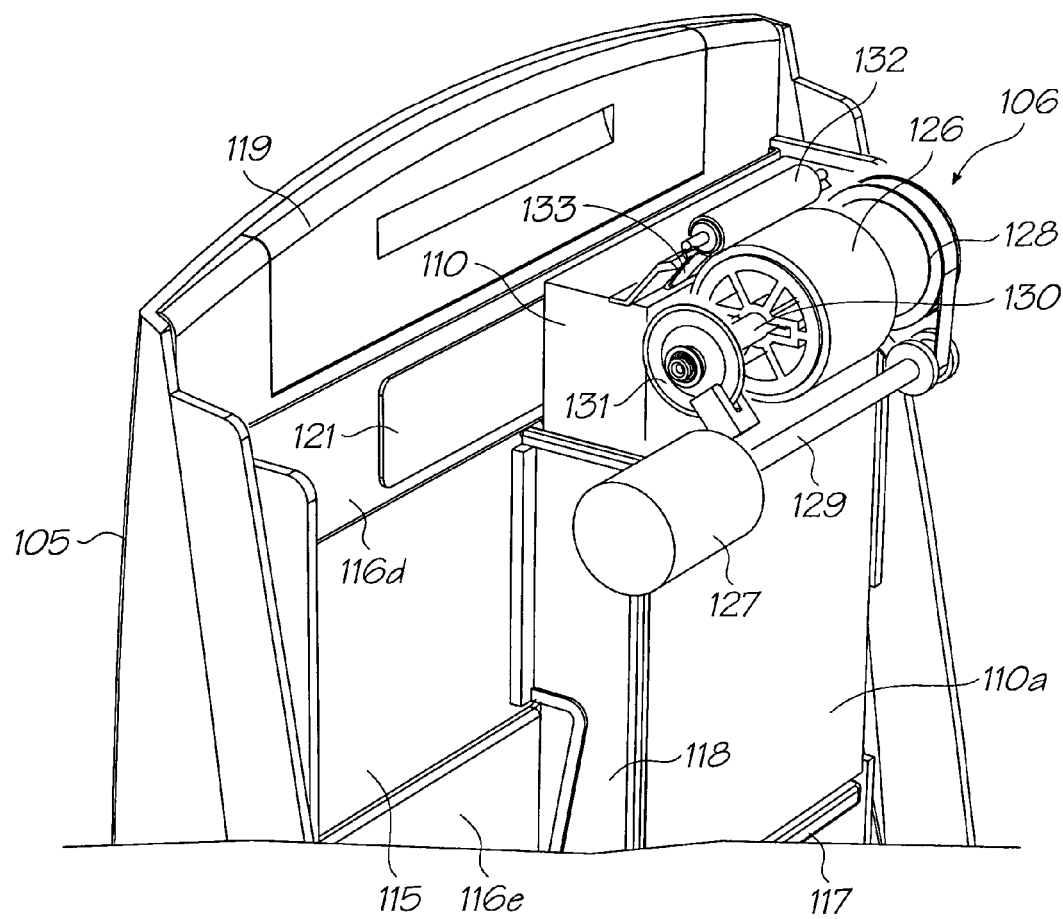
FIG. 14 illustrates an operative position of a picker assembly of the printer in relation to the print media source tray assembly of FIG. 10.

The picker assembly 106, shown most clearly in FIG. 14, may comprise a drive roller 126 driven by a motor 127 via a gearing mechanism 128 situated on motor and roller axles 129 and 130. In the arrangement shown, the drive roller 126 is rotated clockwise by the motor 127 so as to pick-up the topmost sheet 110*a*, where the speed of the drive roller 126 is controlled by feeding back a detection result of an encoder arrangement 131 to the motor 127 via control circuitry (not shown). The drive roller 126 has a surface, such as rubber, which grips the sheets of paper.

An idler or pinch roller 132 having a position variable with respect to the drive roller 126 is used so that a sheet of differently sized print media can pass therebetween. A separator pad 133 is provided to ensure that only a single sheet is fed through the picker assembly 106 to the print engine assembly 107 for printing at any one time, thereby preventing multiple feeds to the print engine assembly 107 which can cause jams and/or distorted prints. It will be understood that other types of picker mechanism could be used in accordance with the present invention.

Figure 15:
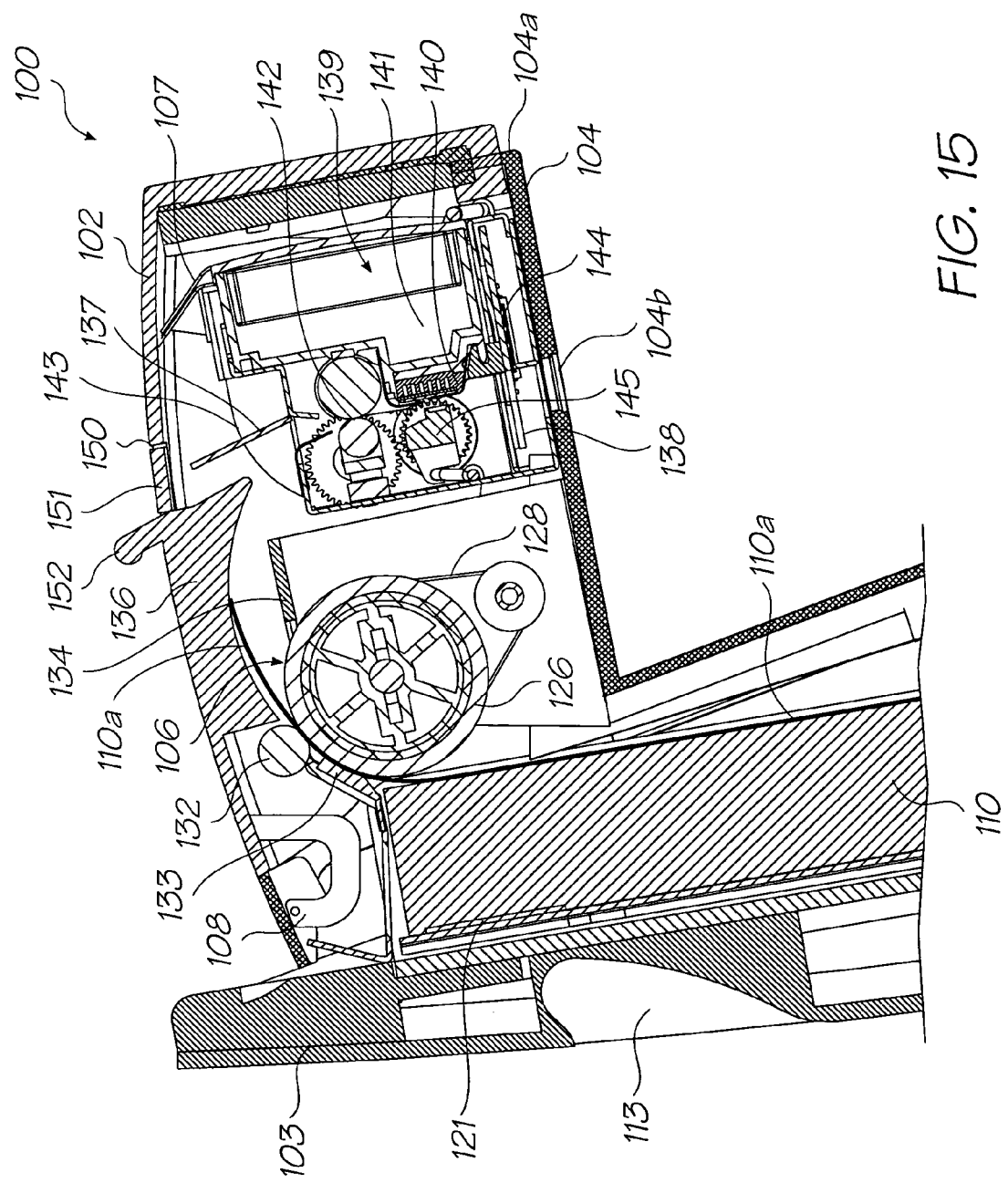
FIG. 15 illustrates, in more detail, the components in an upper portion of the printer shown in FIG. 13 in relation to a path of a topmost sheet from a print media stack held by the print media source tray assembly through the picker assembly of FIG. 14.
Figure 16:
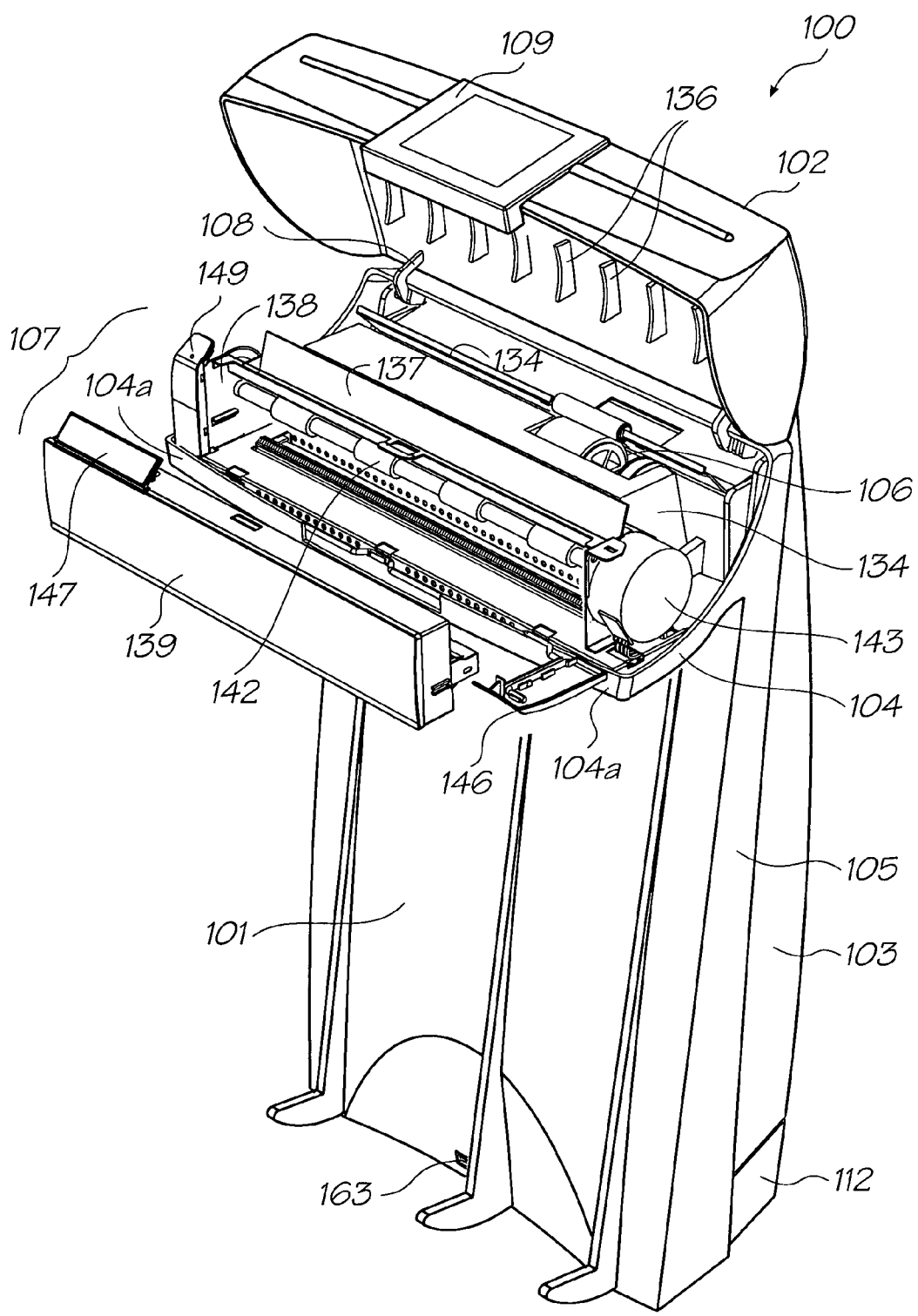
FIG. 16 illustrates an open position of the head unit with a cartridge unit shown removed from the printer of FIG. 6.

The picker assembly 106 is held within the upper portion 104 of the housing 101 via a support frame 134, as shown in FIGS. 6, 7 and 13, so as to be in the position shown in FIG. 14 relative to the stack 110. In operation, the topmost sheet 110*a* of the stack 110 is located against the drive roller 126 of the picker assembly 106 so that it may be readily picked-up for advancement to the print engine assembly 107 for printing, as shown in FIG. 15. As each consecutive topmost sheet 110*a* is picked-up the relative height of the stack 110 decreases. Therefore, the platen 116 of the source tray assembly 103 is spring loaded towards the picker assembly 106 to ensure that the topmost sheet 110*a* is consistently presented to the picker assembly 106.

To achieve this, the housing 101 comprises a spring mechanism 135 which contacts the lever arm 120 of the platen 116 as shown in FIG. 13. The spring mechanism 135 urges the lever arm 120 towards the tray 115 thereby causing the platen 116 to pivot about its pivot points 115*a*/116*a*, which causes an upper portion of the sheets in the stack 110 to be angled away from the tray 115 and towards the housing 101. Thus, throughout the pick-up process the upper portion of the stack 110 is urged toward the picker assembly 106. As an alternative, the spring mechanism 135 can be incorporated on the lever arm 120 of the platen 116 so as to engage with the inner section of the housing 101 to provide the same action.

In this pick-up process, when the stack 110 approaches its depleted state, there will be a situation where only a small number of sheets remain, e.g., two sheets. In this situation it is possible that all of these sheets will be picked-up together, creating a multiple feed. This is because the friction between the sheets may be greater than the friction between the stack 110 and the source tray assembly 103. Thus, the pad 121 is provided on the platen 116, as previously described, so as to present a higher friction surface between the last sheet of paper in the stack 110 and the platen 116 than that between the last and second-to-last sheets of paper in the stack 110. This arrangement assists in ensuring that too many sheets are not fed at once which otherwise may cause a jam to occur at the interface between the separator pad 133 and the drive roller 126 of the picker assembly 106 or further downstream of the transport system or print engine assembly 107.

Upon leaving the drive roller 126, the leading edge of the advancing sheet 110*a* impinges upon an upper surface of the head unit 102, as is shown in FIG. 15. A plurality of (shaped) guides 136 are therefore provided on this upper surface of the head unit 102 (see also FIG. 6) to guide the sheet 110*a* to the print engine assembly 107. That is, the leading edge of the sheet 110*a* follows the trajectory of the shape of the guides 136 to contact a guide plate 137 of the print engine assembly 107 which then directs the sheet 110*a* into the print engine assembly 107 under the drive of the drive roller 126 of the picker assembly 106.

The print engine assembly 107 may be of the type described in the present Applicant's U.S. patent applications Ser. Nos. 10/760,254 to 10/760,258, the disclosures of which are all incorporated herein by reference. These applications have been identified by their filing docket number, which will be substituted with the corresponding application number, once assigned. As such, the print engine assembly 107 is generally comprised of two parts: a cradle unit 138 and a cartridge unit 139, shown variously in FIGS. 6, 7, 15 and 16.

The cartridge unit 139 comprises a printhead 140 for printing on a sheet of print media as it passes thereby and ink handling and storage reservoirs 141 for providing ink to the printhead 140. The printhead 140 is a pagewidth printhead, which means that no scanning of the printhead 140 across the sheets is required. This enables high-speed printing to be performed. Those skilled in the art however will understand that the present invention is applicable to printers employing other types of printheads. Further, as shown in FIG. 15, the cartridge unit 139 comprises a single printhead 140. However, a duplex printer may be used employing a cartridge unit having two pagewidth printheads aligned so that printing surfaces thereof oppose each other with a gap therebetween for accommodating the sheet of print media.

The cradle unit 138 comprises the guide plate 137, a roller assembly 142 and an associated motor 143 for advancing the sheet 110*a* and controlling the trajectory and speed of the sheet 110*a* as it passes the printhead 140, drive electronics 144 for controlling the printing performed by the printhead 140 and a capping unit 145 for capping the printhead 140 when printing is not being performed.

The cradle unit 138 is mounted within the upper portion 104 of the housing 101 and the cartridge unit 139 is removable received within the cradle unit 138, which allows for easy replacement of the printhead 140 and ink storage reservoirs 141 when necessary. A release latch 146 is provided for controlling this removal. The ink handling and storage reservoirs 141 of the cartridge unit 139 may store different coloured ink and associated printing fluids, such as fixative for assisting the setting of the printed ink. The printhead 140 draws the ink from the reservoirs 141 in order to print on the print media sheets.

Figure 17:
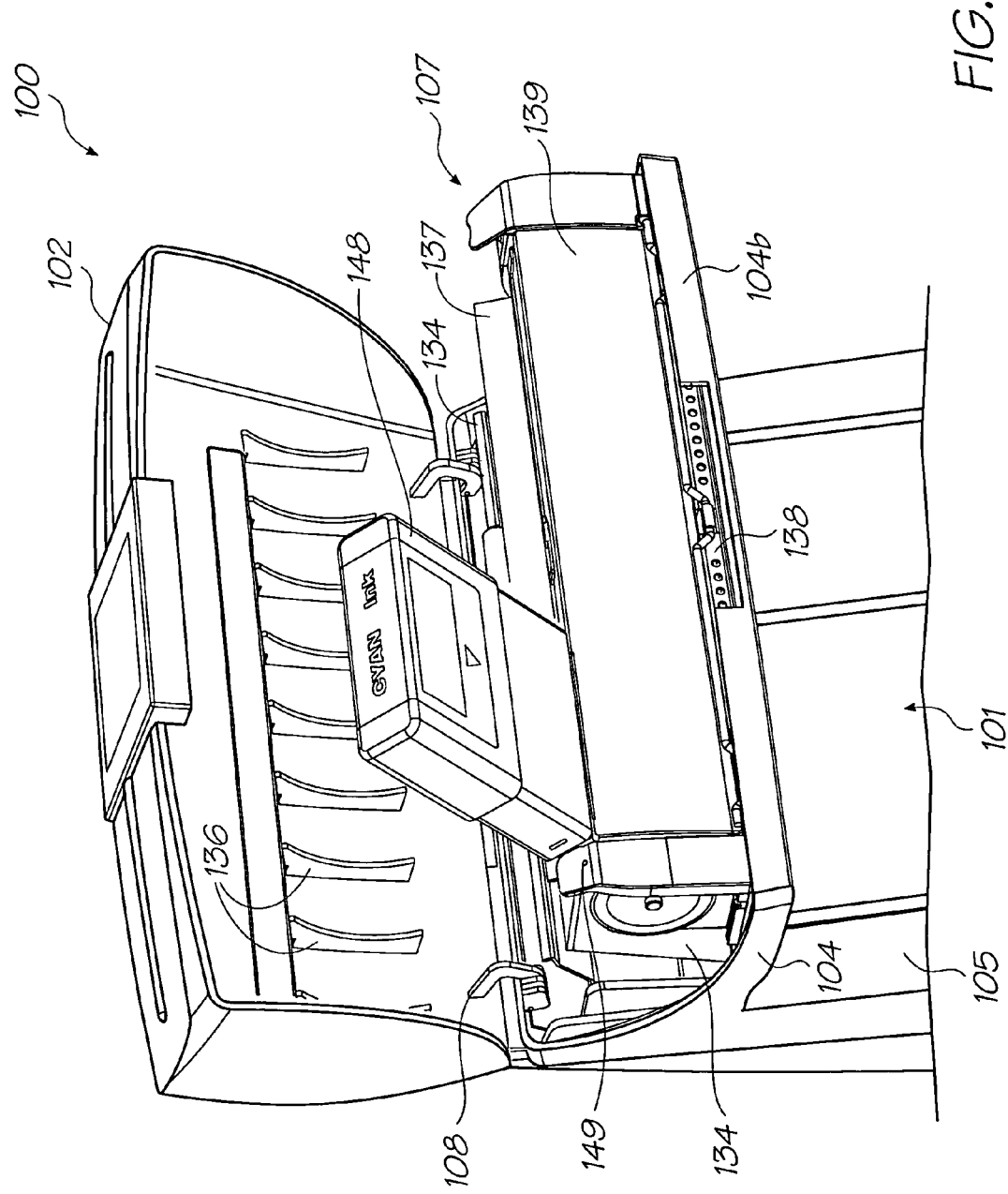
FIG. 17 shows the opened head unit of FIG. 16 in more detail with the cartridge unit in place and a refill cartridge being applied thereto.

A refill port 147 is incorporated in the cartridge unit 139 to which a refill cartridge 148 can be applied so as to refill the reservoirs with the particular types of inks which may have been depleted through printing, as shown in FIG. 17 for the case of cyan ink. In order to facilitate this refilling process an indicator light 149, such as an LED, is provided on the cradle unit 138 which is controlled to indicate to a user when refilling is needed and/or has been completed in the manner described in the present Applicant's above-mentioned applications. The need for refilling can also be indicated to a user via the user interface 109 of the head unit 102 or by print manager software loaded on the user's personal computer (PC) connected to the printer 100, as discussed later.

The mounted position of the cradle unit 138 is such that the leading edge of the sheet 110*a* being fed from the drive roller 126 of the picker assembly 106 and guided by the plurality of guides 136 and the guide plate 137 enters the roller assembly 142 of the cradle unit 138 so as to be advanced past the printhead 140 to be printed under action of the roller assembly 142 (and, in part, of the drive roller 126). The leading edge of the sheet 110*a* progresses through the cradle unit 138 and following printing exits the upper portion 104 of the housing 101 via an exit slot 104*b* (see FIGS. 7 and 13). As such, the sheet 110*a* is guided through an angle of at least 140°, and preferably an angle of at least 180°, from the source tray assembly 103 to the collection area 105 via the printhead 140.

Figure 18:
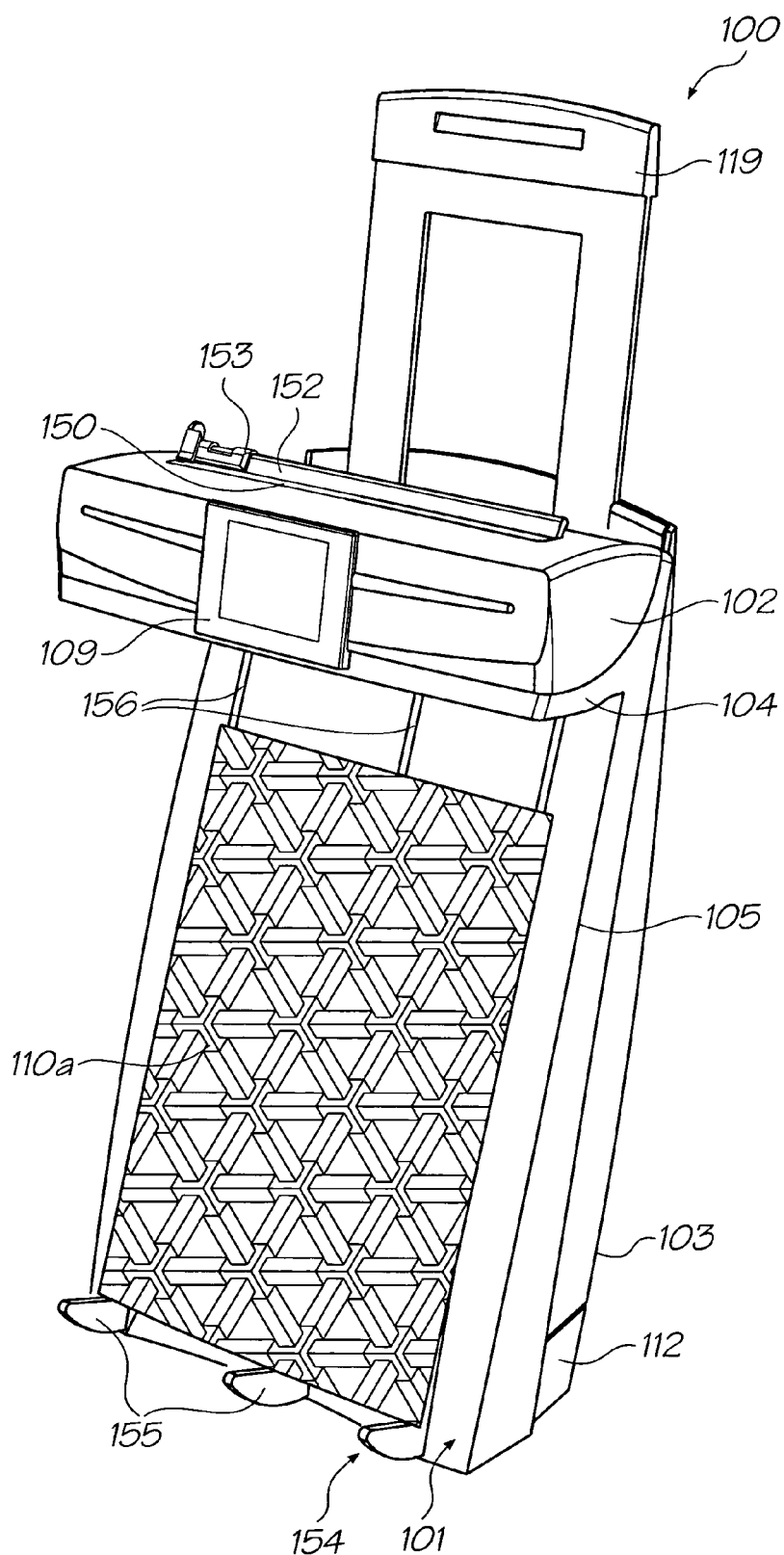
FIG. 18 illustrates print media collection performed by the printer of FIG. 1 and an extendable support member of the printer.

During the printing process, the trailing edge of the sheet 110*a* is transferred from being driven by the drive roller 126 to being driven only by the roller assembly 142 of the print engine assembly 107. Once printed, the trailing edge exits the upper portion 104 of the housing 101 via the exit slot 104*b*, whereupon the printed sheet 110*a* is collected by the collection area 105 of the housing 101, as shown in FIG. 18. The orientation of the cradle unit 138 and the cartridge unit 139 of the print engine assembly 107 is such that the printed sheet 110*a* falls under gravity through the exit slot 104*b* so as to be collected by the collection area 105.

Sheets of print media may also be manually fed to the roller assembly 142 of the print engine assembly 107 rather than being fed from the stack 110 held by the source tray assembly 103. This manual feeding is primarily provided for printing individual print jobs on print media that may not be present in or suitable for the source tray assembly 103, such as photographic paper or other types of print media, such as cardboard, wood, fabric and plastics.

In order to provide for this manual feeding, a slot 150 is provided in an upper portion of the head unit 102, as shown in FIG. 19, through which print media sheets are manually fed. The slot 150 has a length sufficient to accommodate the width of the maximum print media size for the printer 100. In order to reduce the entry of dust and the like into the print engine assembly 107 through the slot 150, since dust, etc may damage the printhead 140, a flap 151 (see FIG. 15) spring loaded so as to be hinged inwardly or outwardly may be provided to close the slot 150 when manual feeding is not being performed.

Referring again to FIG. 19, the head unit 102 may comprise a margin element 152 which runs the length of the slot 150 on the upper surface of the head unit 102. The margin element 152 partly supports the sheet being fed and incorporates a sliding fence 153 which assists in controlling the feeding of differently sized print media through the slot 150. In order to manually feed a print media sheet into the printer 100 in this arrangement, the flap 151 is hinged so as to be lowered or raised and the leading edge of the sheet is fed through the slot 150 so as to impinge on the left hand side (in the orientation of FIG. 15) of the guide plate 137 of the print engine assembly 107. The sheet then progresses down the guide plate 137 so as to enter the roller assembly 142 similar to the process for an automatically fed sheet described earlier.

When manual feeding is being performed for consecutive sheets, the support member 119 of the source tray assembly 103 can be extended as shown in FIG. 18 so that the yet-to-be-fed sheets can be held against the upper surface of the head unit 102 and the support member 119. This support is provided by the support member 119 being angled from the vertical due to the above-described angle of the source tray assembly 103.

Figure 20:
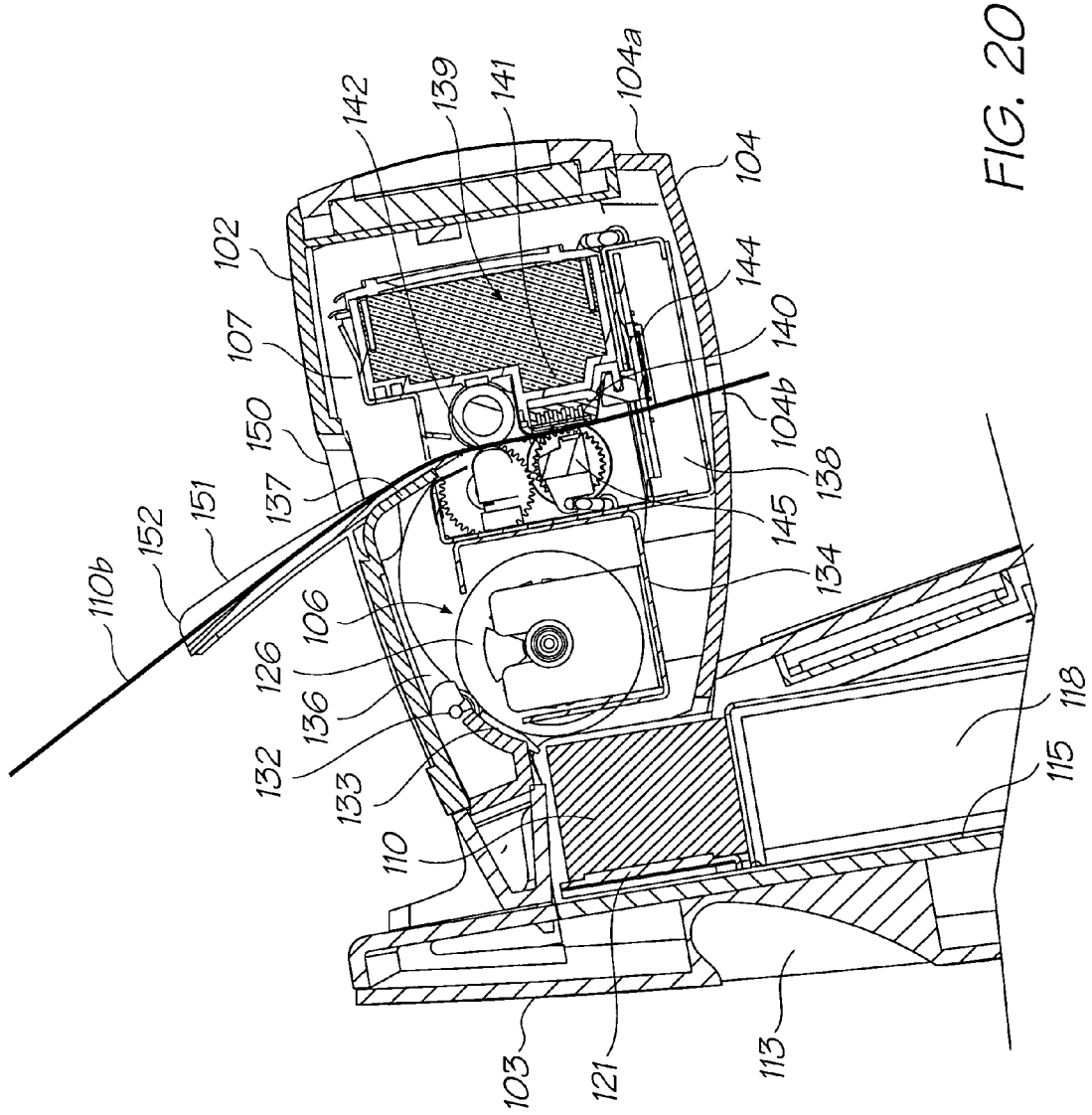
FIG. 20 shows in cross-section the components in an upper portion of a printer in accordance with an embodiment of the present invention illustrating a path of a manually-fed print media sheet.

Additional guiding support for the manually fed sheets may be provided as shown in FIG. 20. That is, the flap 151 of the head unit 102 may alternatively be arranged so as to provide such support for a manually fed sheet 110*b* by being configured to be larger than the slot 150, see FIG. 21, and hinged so that part of the flap 151 extends into the head unit 102 and the remaining part of flap 151 projects out of the head unit 102 when manual feeding is desired. As can be seen, in this arrangement the guide plate 137 is provided within the head unit 102 so as to assist in the supporting position of the flap 151, and the margin element 152 and the sliding fence 153 are incorporated into the flap 151.

Figure 21:
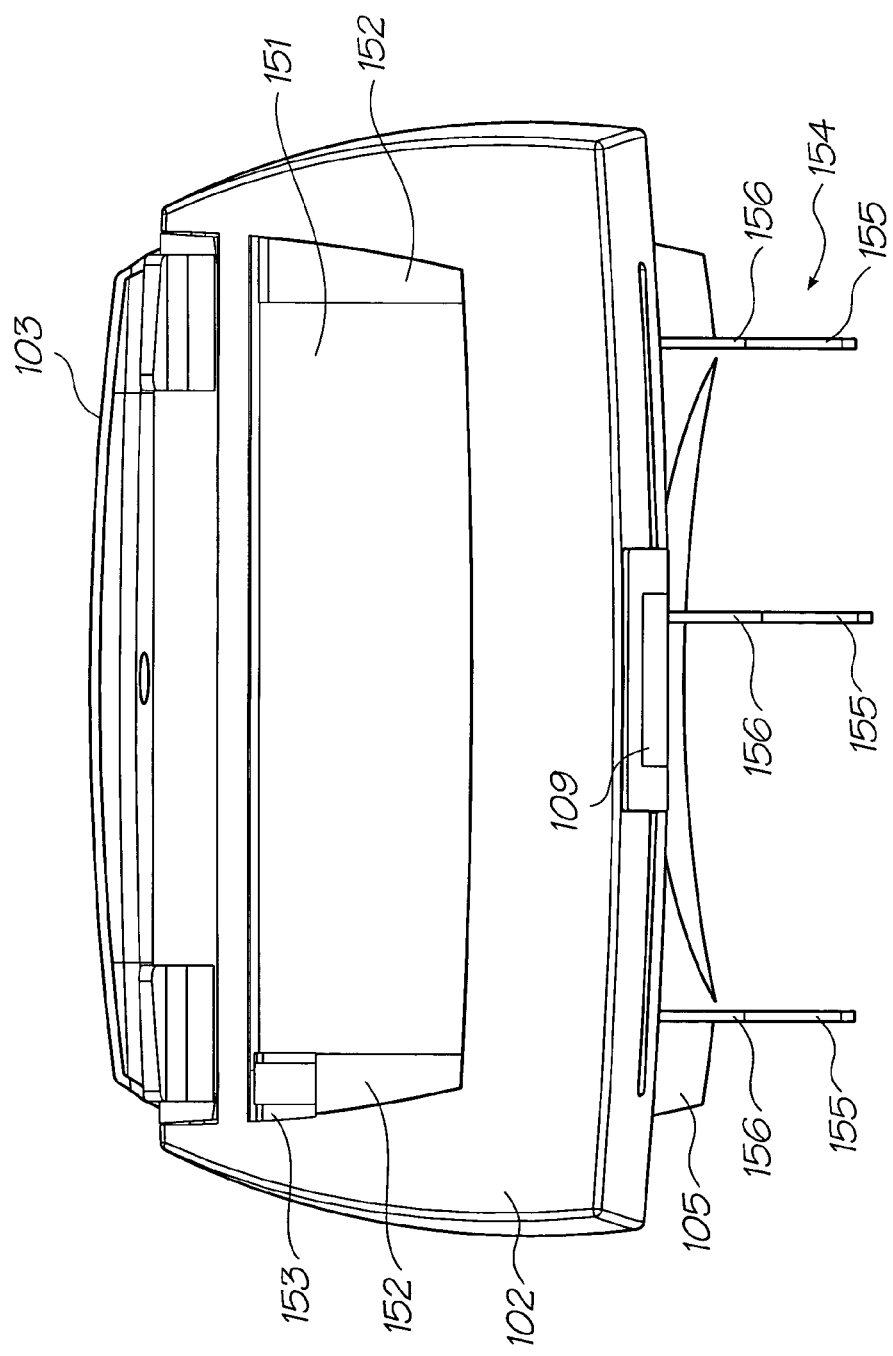
FIG. 21 shows a top view of the printer of FIG. 20.

Further, as can be seen from FIGS. 20 and 21, the head unit 102 in this arrangement is configured slightly differently and more compactly from the head unit 102 shown in FIGS. 15 and 19, in order to accommodate the larger flap 151. Due to the more compact size, a direct drive picker assembly 106 may be used as shown in FIG. 20, which has the motor 127 and drive roller 126 on the same axle.

As described earlier, the outer surface of the lower portion 105 of the housing 101 serves as a collector for collecting the printed sheets which exit the print engine assembly 107 through the exit slot 104*b* of the upper portion 104 of the housing 101. This is done whether the printed sheet is automatically or manually fed.

In order to securely collect a number of printed sheets 110*a*, which may amount to at least the number of sheets comprised in the stack 110, the collection area 105 comprises guides or ribs 154 for guiding collection of the printed sheets 110*a* and holding such once collected. To achieve this the guides 105 are substantially L-shaped with a foot 155 located at the bottom end of the collection area 105 and a leg 156 running substantially for the length of the collection area 105, as shown in FIG. 1.

As can be seen in FIG. 18, the flat upper surfaces of the feet 155 are aligned parallel with one another and substantially orthogonal to the incline of the collection area 105 so as to provide a stop surface and support for the leading edge of the falling printed sheet 110*a*. By using a plurality of the ribs 154 (e.g., three are shown in the figures) with the feet 155 in parallel-alignment, the consecutively released sheets 110*a* can be "squared-up" or "knocked-up" so as to provide a neat collection of the printed sheets 110*a*.

The middle rib 154 situated between the two outer ribs 154 is located closer to the right hand side outer rib 154 (as orientated in FIG. 1) than the left hand side outer rib 154. This is so that print media having a width which does not extend for the full width of the collection area 105, such as the photographic paper shown in FIG. 10 aligned in the upper right corner of the tray 115, is properly collected and knocked-up by the collection area 105.

Further, the middle rib 154 is arranged so that the leg 156 thereof projects out from the surface of the collection area 105 further than the legs 156 of the outer ribs 154. This is illustrated in FIGS. 19 and 22, where in the top view of FIG. 19, broken line 157 shows that the legs 156 of the outer ribs 154 are aligned parallel to one another with respect to the surface of the collection area 105 whilst the leg 156 of the middle rib 154 projects out from the surface beyond line 157, and in the side view of FIG. 22, the leg 156 of the middle rib 154 is clearly shown as projecting further from the surface of the collection area 105 than that of the outer rib(s) 154.

The legs 156 of the ribs 154 are arranged in this way so that curvature is imparted to the printed sheets 110*a* with a middle portion of each of the printed sheets 110*a* being situated further from the collection area 105 than the edge portions thereof. That is, a lateral curvature orthogonal to the surface of the collection area 105 is imparted to the collected sheets, which applies a retaining force on the sheets by allowing the sheets to become more rigid and less inclined to fall forward upon contact with the feet 155. This ensures that the sheets are allowed to settle on the collection area 105 without toppling forward which may effect the image printing thereon. This action is assisted by the previously-mentioned angle of about 75° to 80° from the horizontal of the collection area 105, upon which angle the legs 156 also substantially lie.

Figure 23A:
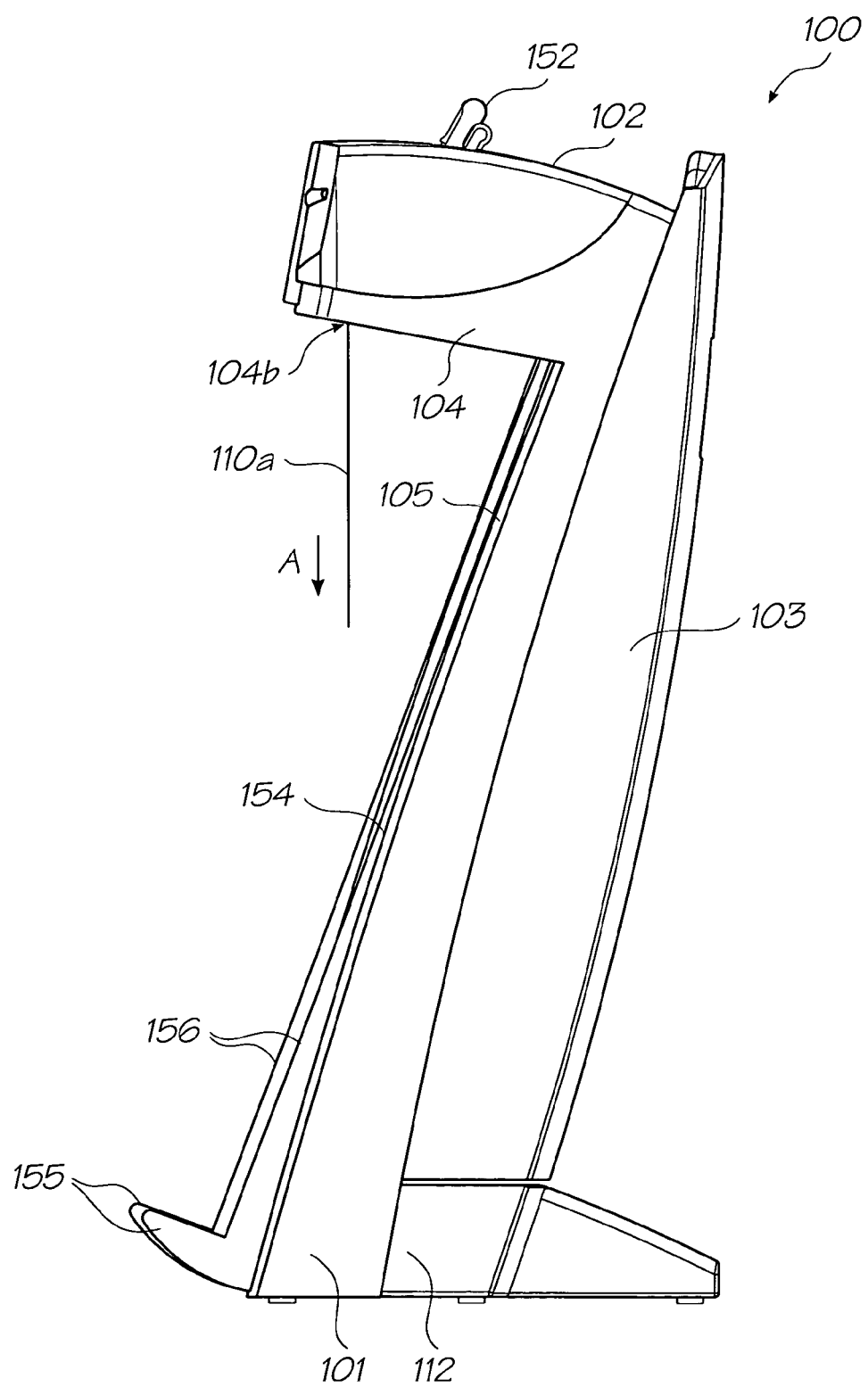
FIGS. 23A and 23B respectively illustrate the position of a sheet of print media exiting and being released from a print engine assembly of the printer of FIG. 1.
Figure 23B:
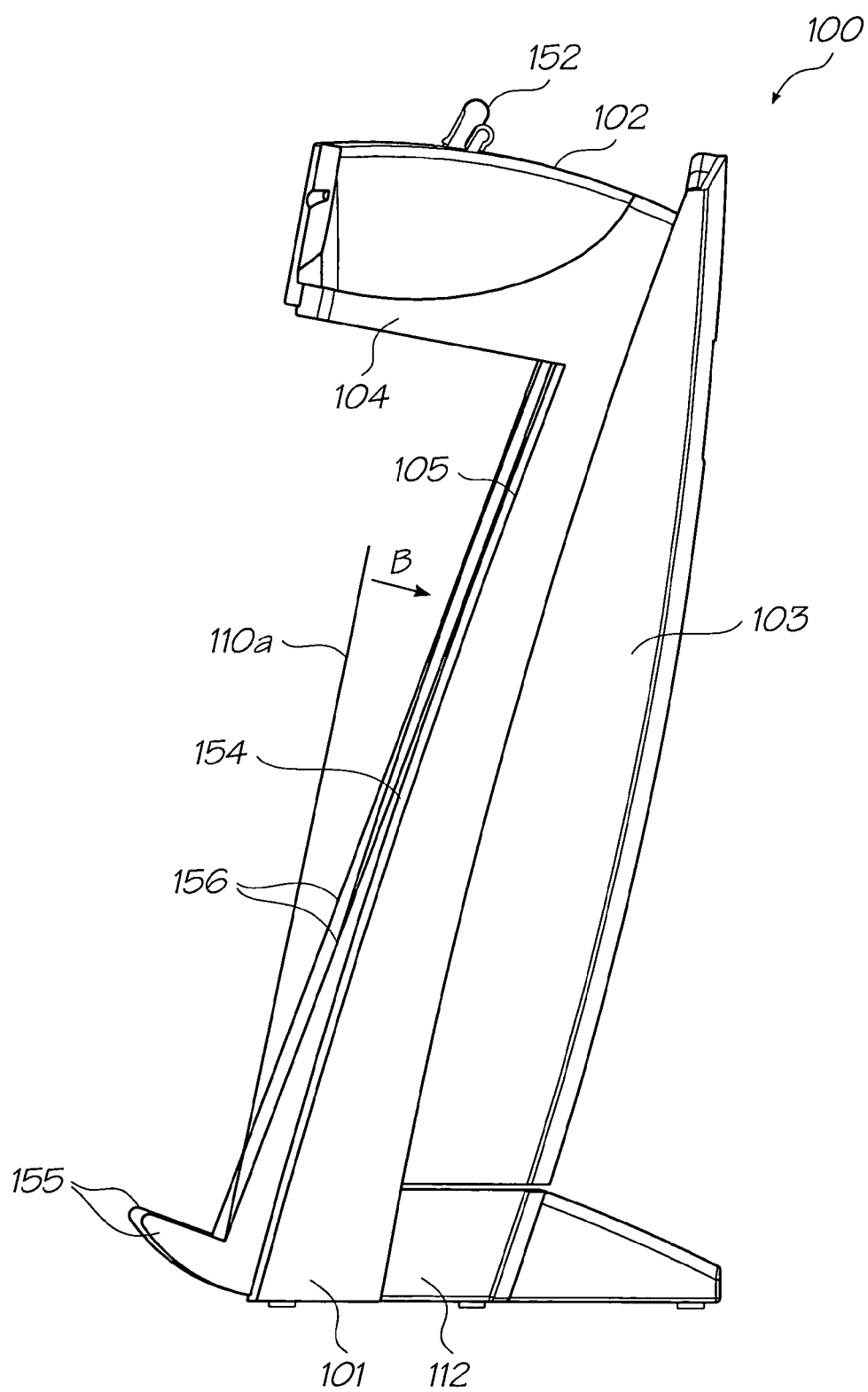

The manner in which the sheet 110*a* exits the upper portion 104 of the housing 101 and is captured on the collection area 105 is shown in FIGS. 23A and 23B, respectively. As can be seen from FIG. 23A, the sheet 110*a* exits the exit slot 104*b* of the upper portion 104 of the housing 101 in a substantially vertical orientation (i.e., in the direction of arrow A). Once the sheet 110*a* is released from the exit slot 104*b*, as shown in FIG. 23B, the sheet 110*a* drops downward under gravity until its downward motion is stopped by the leading edge of the sheet 110*a* coming into contact with the feet 155.

Figure 22:
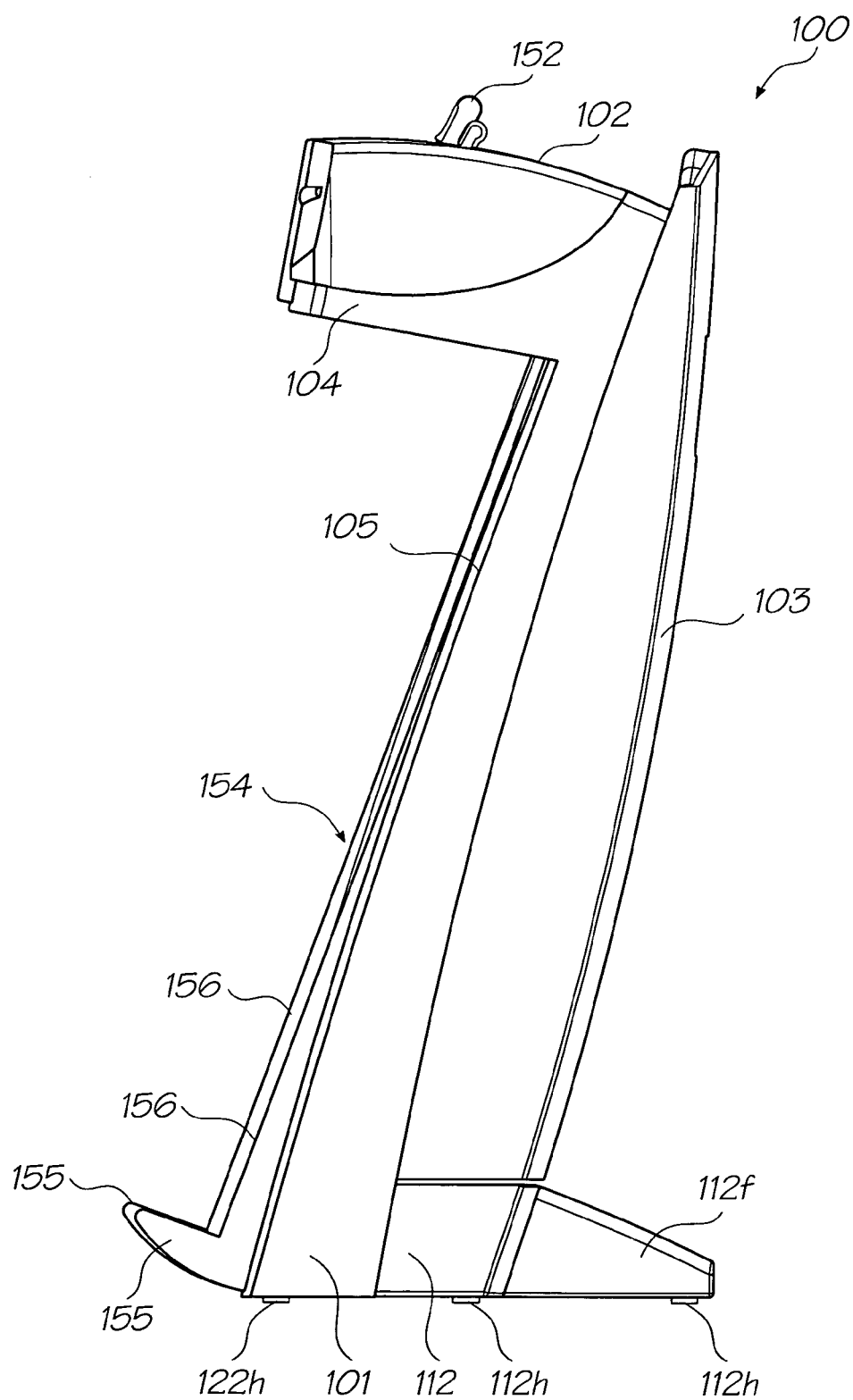
FIG. 22 shows a side plan view of the printer of FIG. 1.

As can be seen in FIG. 22, the feet 155 project from the surface of the collection area 105 substantially orthogonal to this surface. Therefore, the feet 155 are angled about 10° to 15° from the horizontal. As such, upon contact with the feet 155 the sheet 110*a* is caused to settle or (slowly) fall back to the surface of the collection area 105 in the direction of arrow B so as to finally come to rest in the position shown in FIG. 18. As described above, since curvature is imparted to the sheet 110*a* it becomes relatively rigid thereby reducing the likelihood of the top portion of the sheet 100*a* toppling over causing the sheet 110*a* to move forward off of the collection area 105.

Due to the high-speed printing ability of the printer 100, contact between surfaces of printed sheets could have detrimental effects on the quality of the printed image(s), such as smudging and the like which may occur due to the relatively short amount of time between the collection of consecutive sheets, e.g., about one second for 60 ppm printing. That is, the ink printed on the surface of the sheets may not have time to dry or set before the next sheet contacts and comes to rest on the previous sheet's surface, such that the ink may bleed between the sheets.

The above-described sheet collection arrangement of the present invention minimises the possibility of such effects on the printed image occurring as follows. As consecutive printed sheets are delivered vertically to the collection area 105, the exposure of the printed sheet to air is maximised as it proceeds along its downward trajectory after exiting the upper portion 104 of the housing 101 thereby facilitating increased drying and setting of the printed ink. Further, as the leading edge of the first sheet is captured by the feet 155 of the ribs 154, following release of the sheet from the upper portion 104, the sheet falls into position against the surface of the collection area 105 whereby a cushion of air is created between the falling sheet and the collection area 105. For the successive sheets, this cushion of air remains while the sheet settles and until it comes to rest through this settling motion on the previously collected sheet. This cushion of air prior to settling of the sheets assists the drying/setting of the ink printed on the previously collect sheet, or on both sheets in the case of duplex printing.

Figure 12:
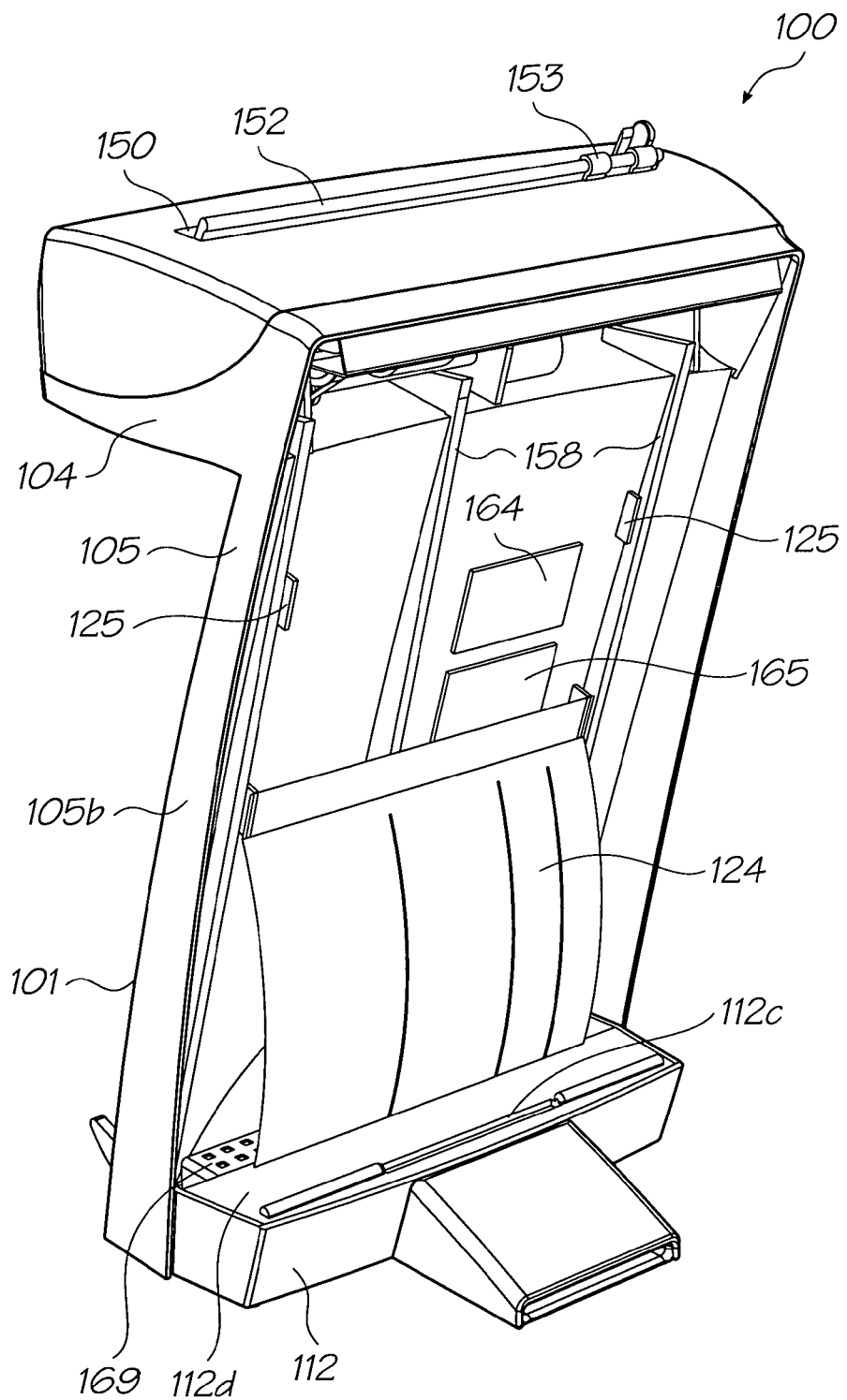
FIG. 12 illustrates the printer as shown in FIG. 11 with a foil member thereof removed revealing WIFI and Bluetooth® card components.

In addition to acting as a means for collecting printouts, the ribs 154 of the collection area 105 may also act as a means of providing a user of the printer 100 with an indication of the state of the printer 100 and/or the printing being performed thereby. This is achieved by forming the ribs 154 from light pipes 158 through which light can be emitted indicating such states, where these light pipe 158 are provided within the surface of the collection area 105 as shown in FIG. 12.

Figure 24A:
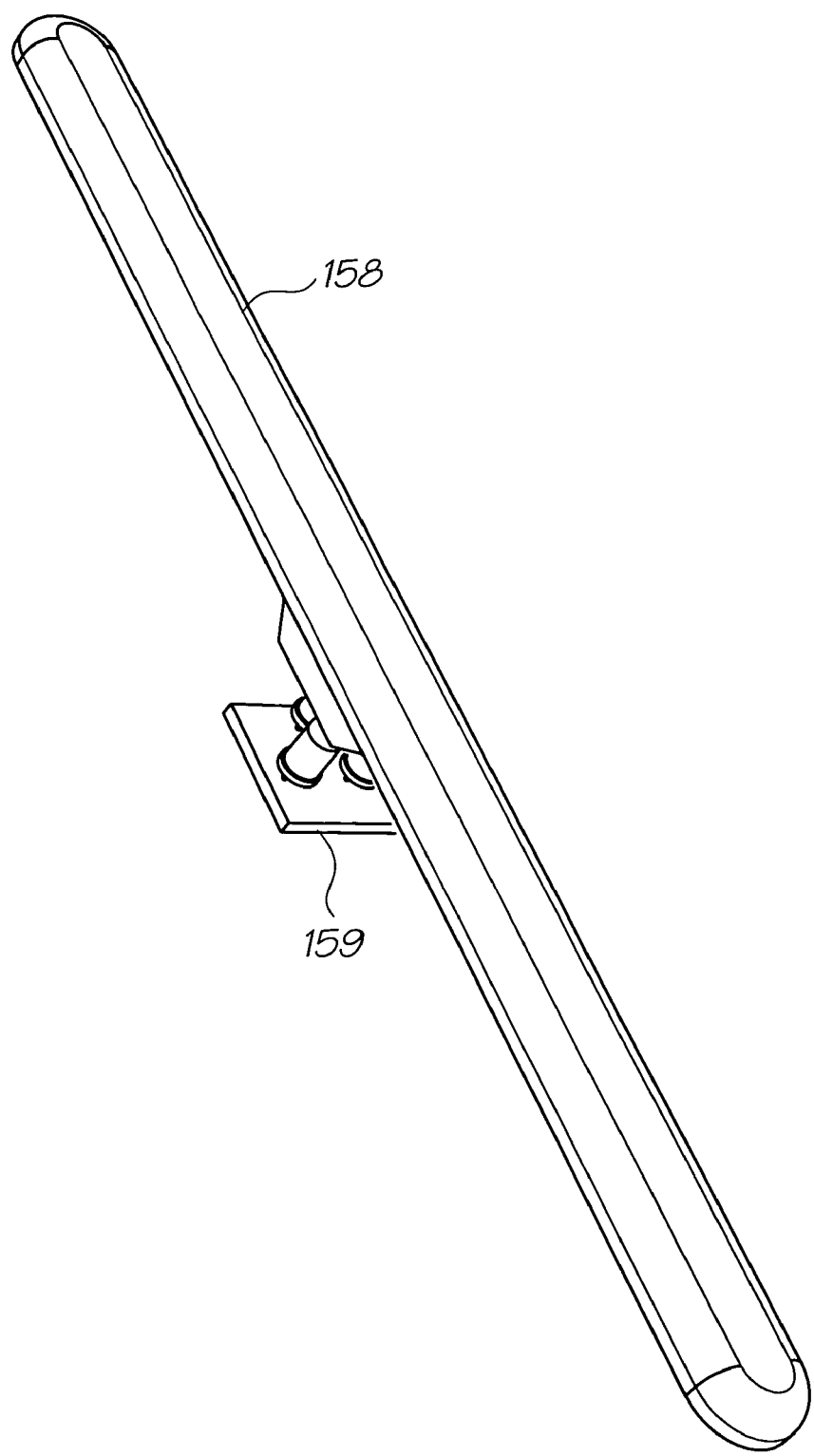
FIG. 24A illustrates a light pipe of the printer of FIG. 1.
Figure 24B:
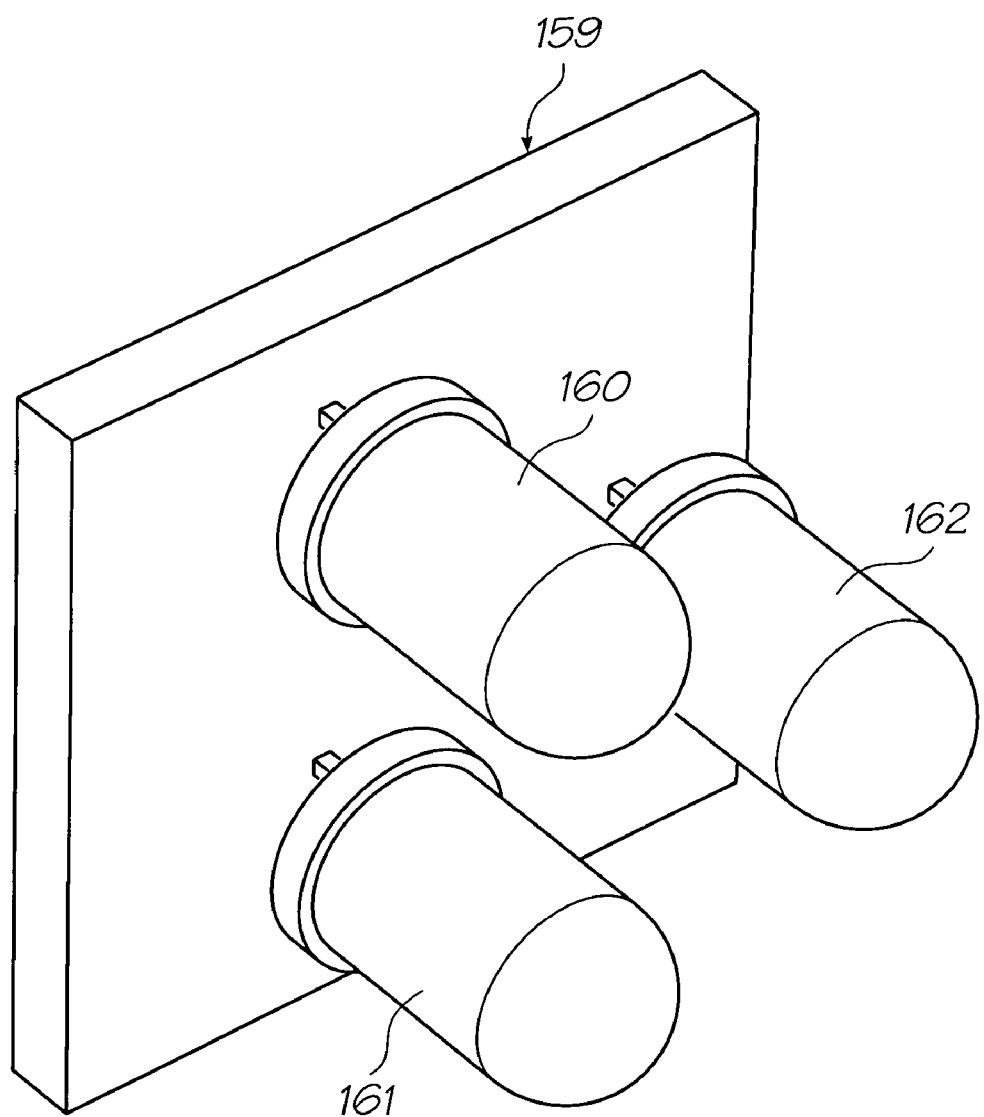
FIG. 24B illustrates a light source of the light pipe of FIG. 24A.

The structure of one of the light pipes 158 is shown in FIG. 24A. The light pipe 158 consists of a hollow transparent material, such as plastic, provided as a light transmitting channel which may be moulded into the shape of the ribs 154 or any other desired shape. The inner surface of the hollow material incorporates a lining which is highly reflective for light striking its surface at certain angles and transmissive for light striking at other angles. As such, light transmitted into the hollow portion is trained so as to flow for the length of the light pipe 158 and be emitted thereby through its entire length. A light source assembly 159 positioned on the light pipe 158, as shown in FIG. 24A, is used to supply light into the hollow portion of the light pipe 158. The light source assembly 159 may be positioned relative to the light pipe 158, such as in the position shown in FIG. 24 or at the end of the light pipe 158, for example. The light source assembly 159 may comprise three differently coloured light sources, a red light source 160, a green light source 161 and a blue light source 162, as shown in FIG. 24B. Each of the light sources 160-162 may be a LED. The use of these different coloured light sources 160-162 allows a wide spectrum of colours to be emitted by the light pipe 158 when the light sources 160-162 are selectively operated either individually or in combination. Alternatively, a single light source capable of multiple colour emission may be used. As such, different coloured light can be used to indicate different states of the printer 100 and/or the printing being performed thereby by controlling the light source assembly 159 emission with the control circuitry of the printer 100 and/or the drive electronics 144 of the print engine assembly 107.

For example, a blue light emitted by the light pipes 158 used as the ribs 154 of the collection area 105 may indicate that the printer 100 is in a standby state, whilst a green light may indicate that the printer 100 is in the state of printing and a red light may indicate that the printer 100 is malfunctioning, such as there being a paper jam or there being a need for more paper or ink. Other combinations of lighting, strobing, flashing, etc could alternatively be used for such purposes. For example, increased aesthetic appeal of the printer 100 could be provided by indicating the standby state with a cycle through a spectrum of colours. The operational state of the printer 100, such as the occurrence of a paper jam, may be determined in a conventional manner as understood by those skilled in the art.

The light pipes 158 can also be incorporated into the head unit 102 of the printer 100, as shown in FIG. 1. The light pipes 158 of the head unit 102 can be controlled in the same manner as those of the ribs 154, as discussed above, in order to indicate to a user the state of the printer 100, etc. Further, the combination of the light pipes 158 in both the head unit 102 and the collection area 105 can be used to indicate the state of different parts of the printer 100 by the individual operation thereof. Further still, other parts of the printer 100 could also be arranged with the light pipes 158 for this purpose. For example, the display of a red light with the light pipes 158 in the head unit 102 whilst the rest of the light pipes 158 of the printer 100 display green light could be used to immediately indicate to a user that there is a problem in the area of the head unit 102, such as paper jam or the like, whilst the rest of the printer 100 is functioning normally. In this way the user can easily and quickly identify and address any problems with the functioning of the printer 100.

Alternatively, the light pipes 158 may be provided in only one area of the printer 100 to indicate the state of the whole of the printer 100. In this case, the light pipes 158 are preferably provided only in the head unit 102 on the front facing surface thereof about the user interface 109, as shown in FIG. 1 for example, so as to provide good visibility for users. In this arrangement, if a problem arises with the functioning of the printer 100, the light pipes 158 of the head unit 102 can be used to indicate that a problem has occurred, upon which the user can refer to the user interface 109 or the print manager software loaded on the user's PC to determine what problem has occurred, and where.

For example, the light pipes 158 may emit blue light to indicate the standby state of the printer 100, green light to indicate the normal operation state of the printer 100, orange light to indicate a fault state of the source tray assembly 103, such as paper jam at the picker assembly 106 or the source tray assembly 103 not being fully closed with respect to the housing 101, and purple light to indicate a fault state of the head unit 102, such as a paper jam at the roller assembly 142 of the print engine assembly 107. However, other combinations of coloured lights may be used to indicate the state of the different operational areas of the printer 100.

The user interface 109 may be a display screen, such as a liquid crystal display, as shown in FIG. 1, used to display information about the state of the printer 100 and the like, and is preferably a touch screen via which users can operate the printer 100. This means that mechanical buttons and the like do not need to be provided on the printer 100 which facilitates a compact design of the printer 100. However, such buttons can be provided together with a simple display screen if desired.

The user interface 109 can therefore be used, either alone or in combination with the light pipes 158, to display information as to the state of the printer 100, such as the ink capacity left in the ink storage reservoirs of the print engine assembly 107, the occurrence of a paper jam in the transport system, as well as command and information menus, etc for the operation of the printer 100. To achieve this, the user interface 109 may further comprise a memory and a processor (not shown) for storing software for such menus and processing commands input by the user by touching areas of the touch screen. Alternatively, such components may be provided by the drive electronics 144 of the print engine assembly 107 with suitable connections between the user interface 109 and the drive electronics 144 being provided in the head unit 102 and the upper portion 104 of the housing 101.

The command and information menus displayed by the user interface 109 can also be used to display information on print jobs being, or to be, performed by the printer 100. In order to receive print jobs, the printer 100 may be connected directly to a user terminal (not shown), such as a PC, or connected to a plurality of such terminals via a network, which terminal(s) transmit the print jobs to the drive electronics 144 of the print engine assembly 107 for processing and printing by the printhead 140. Such menus can also be easily adapted to display in different languages, etc, which is convenient for providing the printer 100 for use in different countries. In this way the user interface 109 is able to display information to a user regarding the operation of the printer 100 which is more useful than that which is typically provided at the print manager level on a PC connected to the printer, which is typically the case for conventional desktop printers. This connection can be provided in a wired manner via a Pictbridge connector 163 situated in the collection area 105 area of the housing 101, as shown in FIG. 1, which allows for connection between the terminals and the printer 100. The Pictbridge connector 163 is positioned below the paper collection surfaces of the feet 155 of the collection area 105 so that a cable connected thereto (not shown) does not to interfere with the printout collection.

However, the Pictbridge connector 163 may instead be positioned on the side or rear of the housing 101, or within the base unit 112.

Alternatively, the connection between the terminals and the printer 100 can be provided in a wireless manner by using a WIFI card 164 and/or a Bluetooth® card 165 located in the inner section of the housing 101, as shown in FIGS. 7 and 12.

Figure 25:
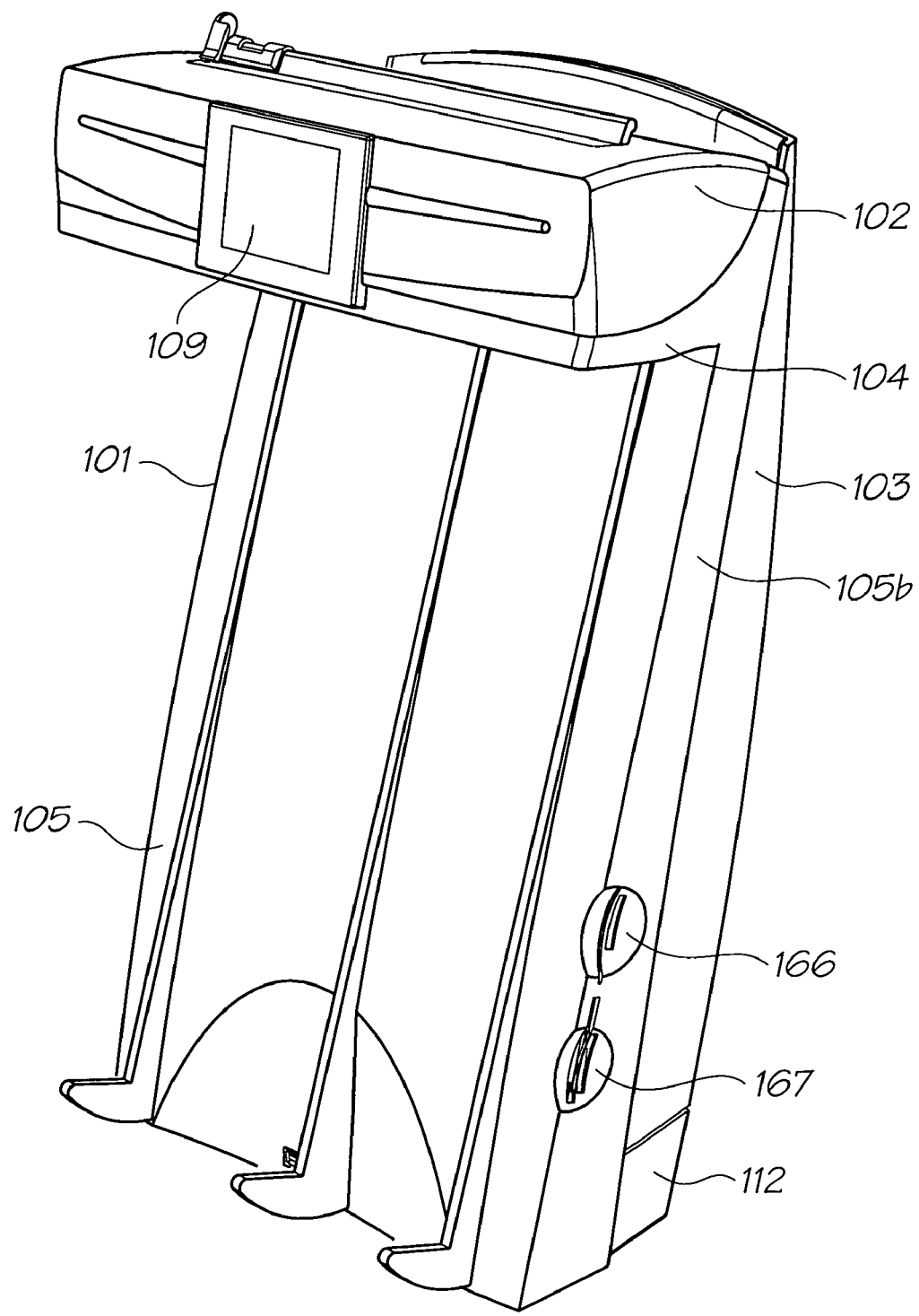
FIG. 25 shows a perspective view of a printer in accordance with an embodiment of the present invention.

Alternatively still, or in addition, the printer 100 may incorporate means for directly receiving image data for the print jobs by incorporating slots 166 and 167, such as those shown in FIG. 25 in one of the side portions 105b of the lower portion 105 of the housing 101. The slots 166 and 167 are arranged to receive photocards and the like so that images stored thereon can be downloaded to the printer's 100 or the drive electronics' 144 memory for direct printing.

Figure 26:
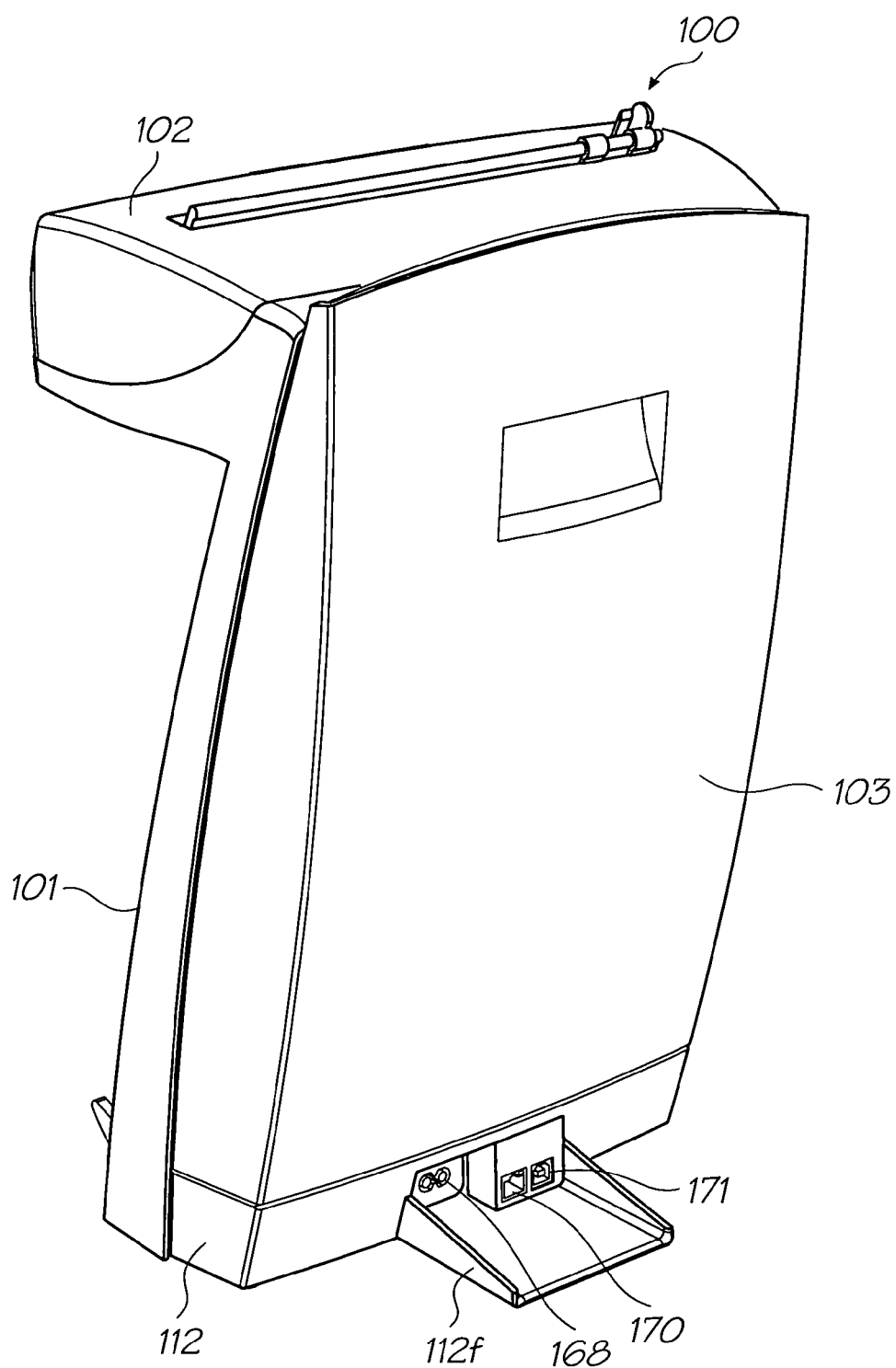
FIG. 26 illustrates the base unit as shown in FIG. 4 with a cover thereof removed.

Power for the user interface 109, the print engine assembly 107 particularly for the motor 143 of the roller assembly 142, the printhead 140, the drive electronics 144 and the capping unit 145), the picker assembly 106 (particularly for the motor 127 of the drive roller 126), the light pipes 158 and other electronic components of the printer 100 is supplied from an external power source (not shown) via a power connector 168 and power supply unit (PSU) 169 provided in the base unit 112, as shown in FIGS. 7, 11 and 26. Corresponding connections from the PSU 169 to the various electronic components can be provided via suitable wiring housed within the inner section and upper portion 104 of the housing 101 of the printer 100.

As can be seen from FIG. 26, in which a cover 112e of the base unit 112 (see FIGS. 4 and 7) has been removed from a support portion 112f thereof, the base unit 112 not only provides a base for holding the housing 101 and source tray assembly 103 in a substantially vertical orientation but also provides for the various connections of the printer 100. That is, in addition to the power connector 168, the base unit 112 may also hold a USB connector 170 and an Ethernet connector 171, for connection to external devices/terminals and networks, for the reasons discussed earlier. As with the power connections, corresponding connections from the connectors 170 and 171, and also from the card devices 164 and 165 and the Pictbridge connector 163, to the various data components of the printer 100 can be provided via suitable wiring housed within the inner section and upper portion 104 of the printer 100.

Figure 3:
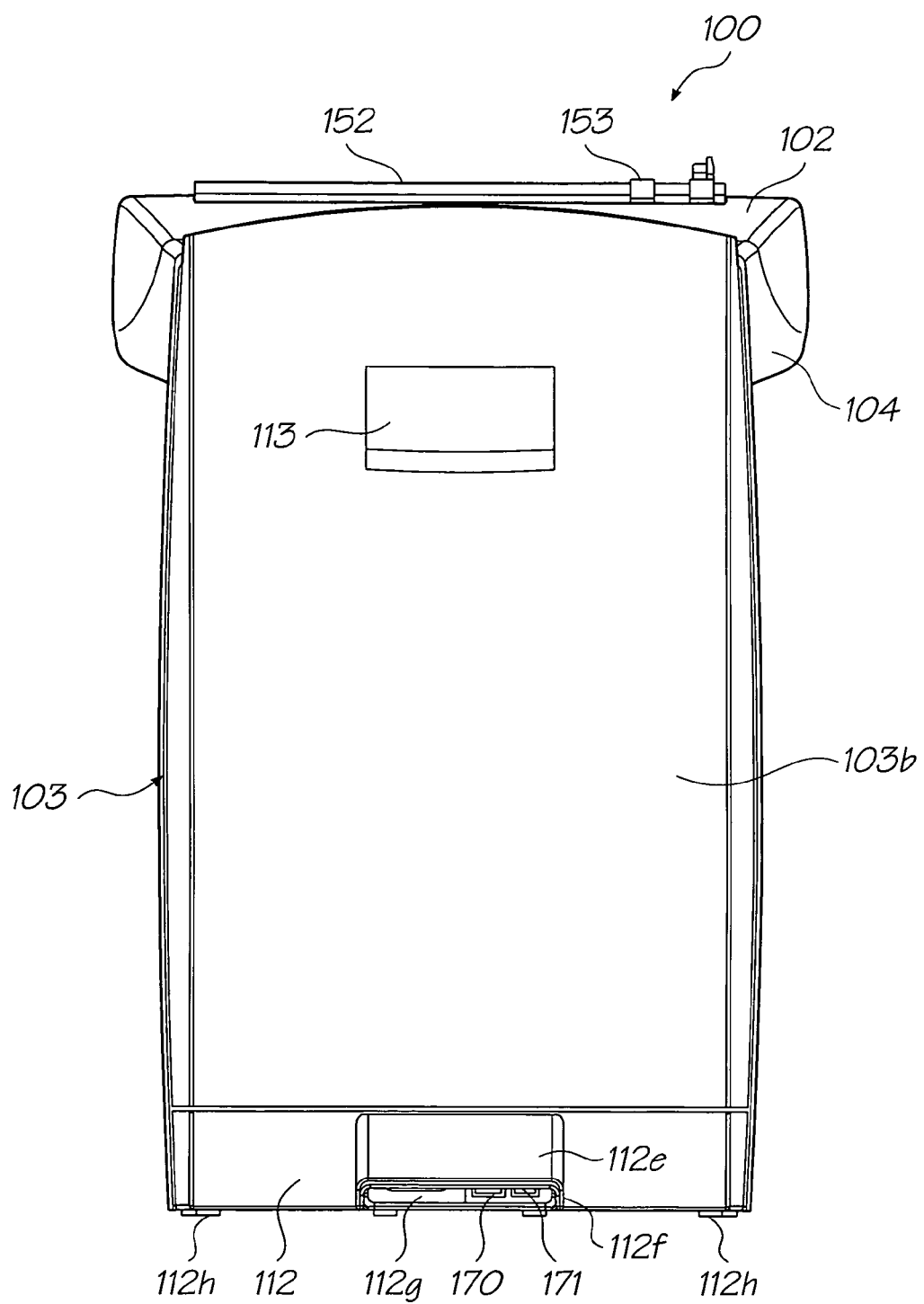
FIG. 3 shows a rear plan view of the printer of FIG. 1.
Figure 4:
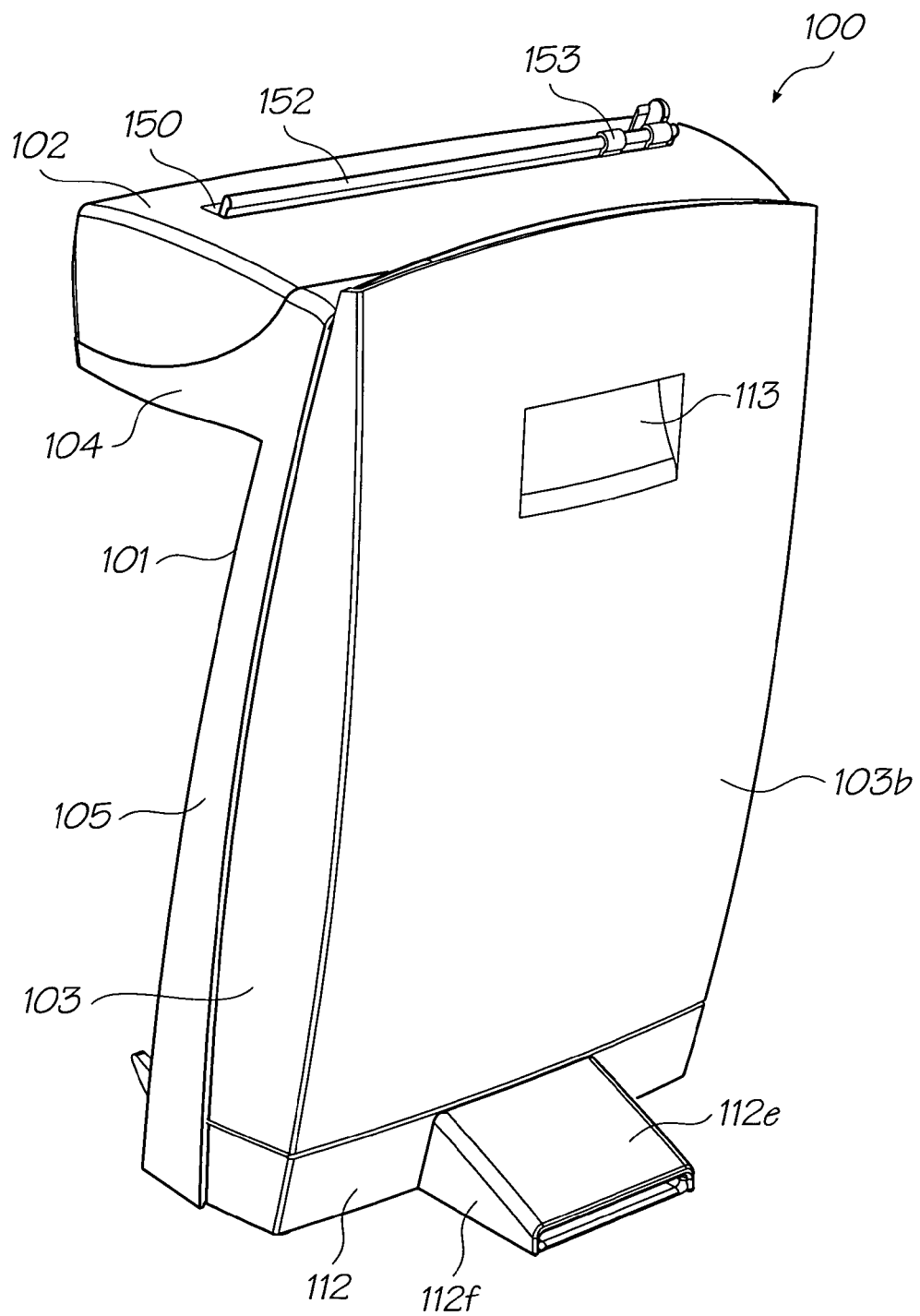
FIG. 4 shows a rear perspective view of the printer of FIG. 1 illustrating a print media source tray assembly and base unit thereof.

The support portion 112f of the base unit 112 extends from the bottom portion of the base unit 112 to the rear of the printer 100 so as to provide additional support for the assembled printer 100, particularly since the housing 101 and the source tray assembly 103 are angled from the vertical towards the rear of the printer 100. Further, the cover 112e is arranged on the support portion 112f and is easily removable to gain access to the connectors 168, 170 and 171 for connection to corresponding device/terminal cables (not shown). The cover 112e is conveniently able to be placed on the support portion 112f even when cables are connected as space is provided for accommodating the plugs on the end of the cables and a gap 112g is provided for accommodating the cables themselves (see FIG. 3). Feet portions 112h are also provided on the bottom of the base unit 112 for providing stability to the substantially vertical printer 100, as shown in FIGS. 3, 22 and 27.

Figure 28:
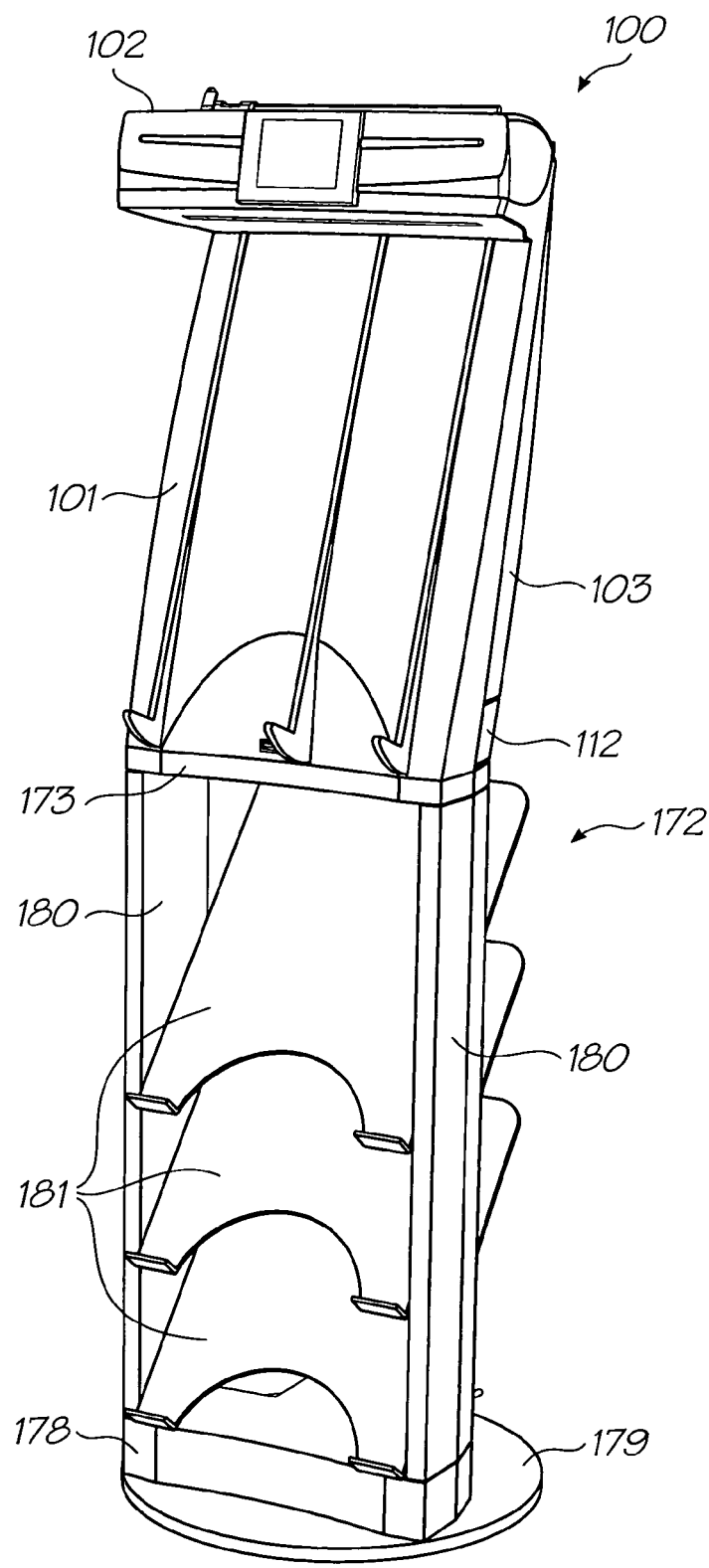
FIG. 28 illustrates the printer of FIG. 1 positioned on a stand assembly.
Figure 29:
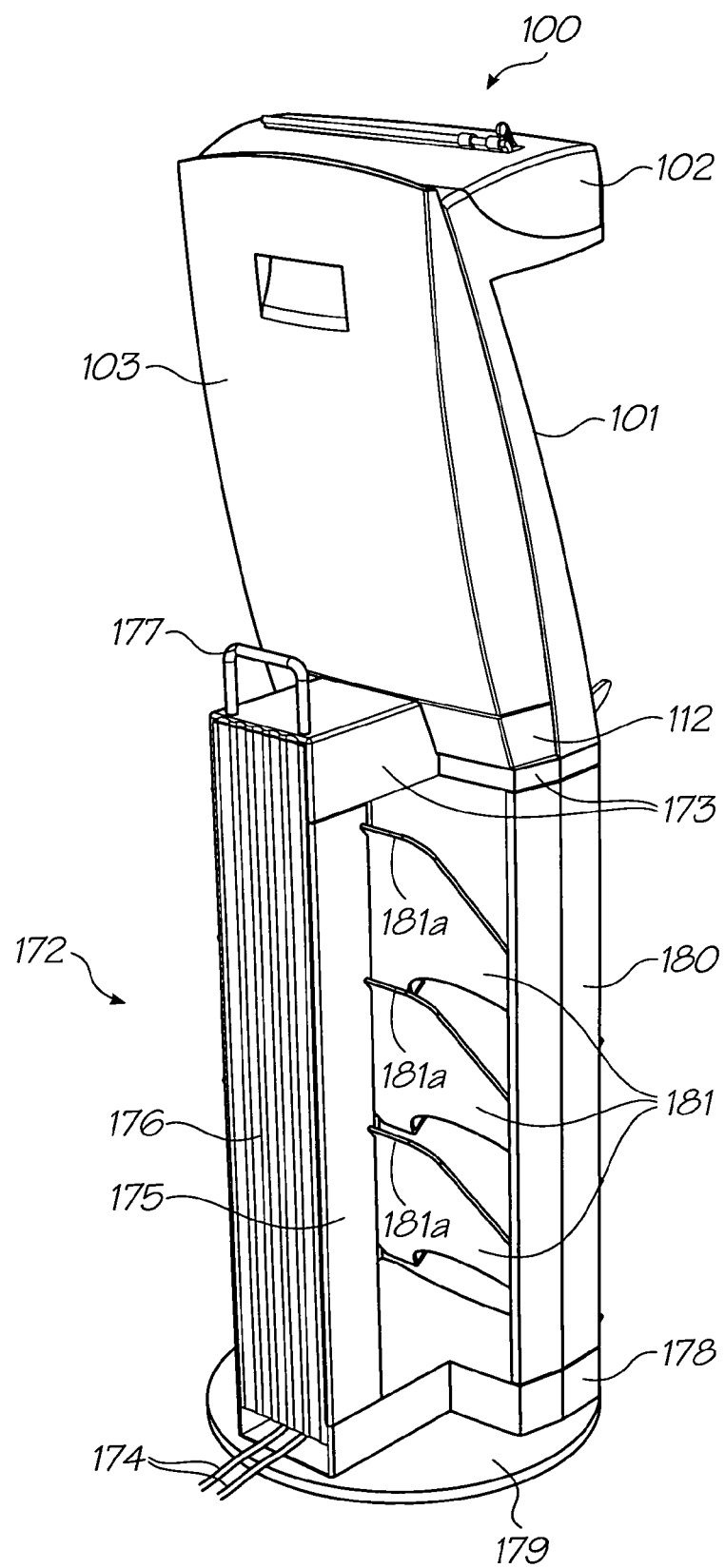
FIG. 29 shows a rear perspective view of the printer positioned on the stand assembly of FIG. 28.

Apart from serving the above-mentioned purposes of providing a support for the housing 101, the head unit 102 and the source tray assembly 103, and connections for power and data, the base unit 112 may also be arranged on a stand assembly 172 for the printer 100 as shown in FIGS. 28 and 29. The stand assembly 172 enables the printer 100 to be easily converted from a pure "desktop" printer to a stand-alone printer. This provides for even greater desk space in a home or office environment. Further, the stand assembly 172 is provided with a similar footprint to that of the printer 100, such that the assembled printer 100 and stand assembly 172 continues to provide a relatively small footprint printing system.

Figure 27:
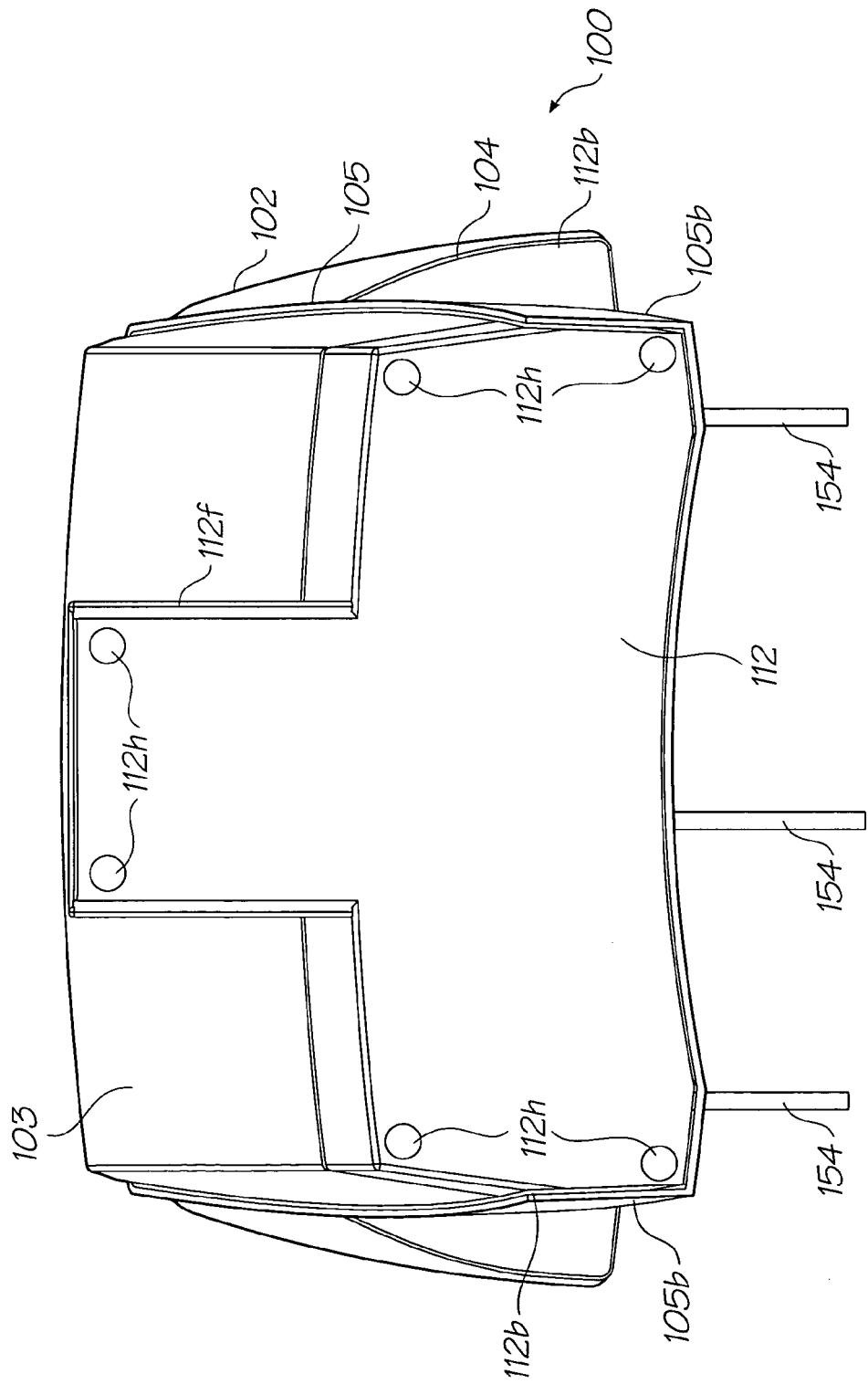
FIG. 27 shows a bottom view of the printer of FIG. 1.

As shown in FIG. 29, an upper frame portion 173 of the stand assembly 172 is arranged so as to conform to the shape of the bottom of the base unit 112, including the support portion 112f of the base unit 112, which is shown in FIG. 27. In this way, the base unit 112 is locked to the upper frame portion 173 by a nesting arrangement, thereby providing secure assembly of the printer 100 to the stand assembly 172.

Cables 174 from external devices/terminals for connection to the connectors 168, 170 and 171 provided in the base unit 112 are accommodated in a cable housing 175 which is held at a top end thereof by the upper frame portion 173 at the rear of the stand assembly 172. The cable housing 175 comprises a cover 176 which neatly and safely encloses the cables 174, whilst being removable so as to provide quick access thereto. A handle 177 is provided at the top of the cable housing 175 on the upper frame portion 173 for easy transport of the assembled printer 100 and stand assembly 172.

A lower frame portion 178 and a base plate 179, to which the lower frame portion 178 is attached, are provided at the bottom of the stand assembly 172. The base plate 179 provides sufficient stability to the assembled printer 100 and stand assembly 172 whilst retaining a relatively small footprint, whilst the lower frame portion 178 is shaped similar to the upper frame portion 173 so as to hold the bottom end of the cable housing 175. The upper and lower frame portions 173 and 178 hold a frame 180 therebetween within which one or more print media trays 181 may be arranged.

As can be seen, each of the print media trays 181 are provided at an angle to the vertical so as to each be able to hold a stack of print media, such as paper. The trays 181 may be used to store paper for printing and/or paper that has been printed. The frame 180 is shown in FIGS. 28 and 29 arranged with three of the trays 181, however a greater or lesser number of the trays may be provided in accordance with the present invention.

The provision of a plurality of trays 181 provides storage for stacks of different sized print media for printing. That is, if printing on different sized paper than is presently loaded in the source tray assembly 103 of the printer 100 is required, it is a simple task for a user to source this paper from the trays 181 to replace the paper in the source tray assembly 103 or manually feed this paper into the printer 100. Further, the plurality of trays 181 can be used to hold additional stacks of the most common paper size used with the printer 100 so as to provide an efficient means of reloading the source tray assembly 103 when the need for such is indicated to a user via the light pipes 158 and/or the user interface 109, for example.

The provision of the plurality of trays 181 may also provide a means to collate different print job outputs. That is, in a network printing environment, say, it may be necessary to collate the outputs of a number of users since those users may not immediately collect their printouts. Such manual collation may be needed due to the high-speed printing capability of the printer 100 through which many outputs may be produced in a relatively short amount of time.

The trays 181 are arranged to slide into place in the frame 180 so that the inner edges 181a thereof rest on the cable housing 175 (see FIG. 29). Further, the upper and lower frame portions 173 and 178 are arranged to removably receive the frame 180 and cable housing 195 therein. In this way, the stand assembly 172 is provided as a modular assembly of the above-mentioned parts such that it is easily assembled and disassembled. In its disassembled state, the stand assembly 172 presents a number of compact parts which can be easily packaged with the parts of the disassembled printer 100, i.e., the separate parts of the housing 101, the head unit 102, the source tray assembly 103, the picker assembly 106, the print engine assembly 107 and the base unit 112. In order to facilitate assembly/disassembly and the mobility of the assembled printer 100 and stand assembly 172, the components of the stand assembly 172 are preferably made from a lightweight material, such as plastic.

Exemplary construction and operation of the vertical printer of the present invention is now described.

For the desktop printer 100 configured to print on A4 paper as being the maximum-sized paper, the pagewidth printhead 140 of the print engine assembly 107 has a printhead width of 224 mm or 8.8 inches. In order to form this printing width the printhead 140 comprises a plurality of printhead integrated circuits (ICs) incorporating printing or ink ejecting nozzles therein, such as those described in the present Applicant's above-referenced applications Ser. Nos. 10/760,254 to 10/760,258.

In accordance with the present invention, at least 5,000 nozzles may be incorporated to provide the required quality of printing, i.e., at least 1600 dpi, at the high-speed of at least 30 ppm, preferably at least 60 ppm. However, depending upon the printing quality and speed required, the printhead may comprise at least 10,000 nozzles, preferably at least 20,000 nozzles, and more preferably at least 50,000 nozzles in higher-speed, higher-quality printing applications.

These nozzles are arranged as a two-dimensional array across the width of the printhead so as to eject ink, and other printing fluids such as fixative, onto the surface of the passing print media in order to print images thereon. Each of the nozzles corresponds to a printed dot on the print media, and therefore the larger the number of nozzles and the greater the packing density thereof in the printhead the closer the printed dots, and therefore the higher the resolution of the printing. The drive electronics 144 receives and processes image data from an external data source, via one or more of the data connectors 163, 170 and 171 or data devices 164 and 165, and drives the nozzles of the printhead in accordance with the processed image data (explained in more detail later).

With respect to the type of nozzle systems which are applicable for the printhead 140, any type of ink jet nozzle array which can be integrated on a printhead IC is suitable. That is, systems such as a continuous ink system, an electrostatic system and a drop-on-demand system, including thermal and piezoelectric types, can be used.

Regarding a thermal drop-on-demand system, there are various types known which typically include ink reservoirs adjacent the nozzles and heater elements in thermal contact therewith. The heater elements heat the ink which creates gas bubbles therein. The gas bubbles generate pressures in the ink causing droplets to be ejected through the nozzles onto the print media. The amount of ink ejected onto the print media by each nozzle and when this occurs is controlled by the drive electronics. Such thermal systems impose limitations on the type of ink that can be used however, since the ink must be resistant to heat, and also require a cooling process which can reduce the optimum printing speed.

Regarding a piezoelectric drop-on-demand system, various types are also known which typically use piezo-crystals arranged adjacent the ink reservoirs which are caused to flex when an electric current flows therethrough. This flexing causes droplets of ink to be ejected from the nozzles in a similar manner to the thermal systems described above. Such piezoelectric systems allow more control over the shape and size of the ink droplets than the thermal systems and the ink does not have to be heated and cooled between cycles, giving a greater range of available ink types.

Further, a micro-electromechanical system (MEMS) of nozzles could be used which includes thermo-actuators which cause the nozzles to eject ink droplets. Such nozzle systems are described in the present Applicant's following co-pending and granted applications:

U.S. Pat. Nos. 6,188,415; 6,209,989; 6,213,588; 6,213,589; 6,217,153; 6,220,694; 6,227,652; 6,227,653; 6,227,654; 6,231,163; 6,234,609; 6,234,610; 6,234,611; 6,238,040; 6,338,547; 6,239,821; 6,241,342; 6,243,113; 6,244,691; 6,247,790; 6,247,791; 6,247,792; 6,247,793; 6,247,794; 6,247,795; 6,247,796; 6,254,220; 6,257,704; 6,257,705; 6,260,953; 6,264,306; 6,264,307; 6,267,469; 6,283,581; 6,283,582; 6,293,653; 6,302,528; 6,312,107; 6,336,710; 6,362,843; 6,390,603; 6,394,581; 6,416,167; 6,416,168; 6,557,977; 6,273,544; 6,299,289; 6,299,290; 6,309,048; 6,378,989; 6,420,196; 6,425,654; 6,439,689; 6,443,558; and 6,634,735, U.S. patent application Ser. No. 09/425,420, U.S. Pat. Nos. 6,623,101; 6,406,129; 6,457,809; 6,457,812; 6,505,916; 6,550,895; 6,428,133; 6,305,788; 6,315,399; 6,322,194; 6,322,195; 6,328,425; 6,328,431; 6,338,548; 6,364,453; 6,383,833; 6,390,591; 6,390,605; 6,417,757; 6,425,971;

6,426,014; 6,428,139; 6,428,142; 6,439,693; 6,439,908; 6,457,795; 6,502,306; 6,565,193; 6,588,885; 6,595,624; 6,460;778; 6,464,332; 6,478,406; 6,480,089; 6,540,319; 6,575,549; 6,609,786; 6,609,787; 6,612,110; 6,623,108; 6,629,745; 6,652,071; 6,659,590, U.S. patent application Ser. Nos. 09/575,127; 09/575,152; 09/575,176; 09/575,177; 09/608,780; 09/693,079; 09/693,135; 09/693,735; 10/129, 433; 10/129,437; 10/129,503; 10/407,207; and Ser. No. 10/407,212, Ser. Nos. 10/683,064 and 10/683,041, U.S. patent application Ser. Nos. 10/302,274; 10/302,297; 10/302, 577; 10/302,617; 10/302,618; 10/302,644; 10/302,668; 10/302,669; 10/303,312; 10/303,348; 10/303,352; and 10/303,433, and Ser. Nos. 10/728,804 to 10/728,779, the disclosures of which are all incorporated herein by reference. Some of the above applications have been identified by their filing docket number, which will be substituted with the corresponding application number, once assigned.

Description of an exemplary MEMS nozzle system applicable to the printhead 140 is provided below, as is an exemplary manner in which the drive electronics processes the image data and drives such a nozzle system, with reference the FIGS. 30 to 43.

Figure 30:
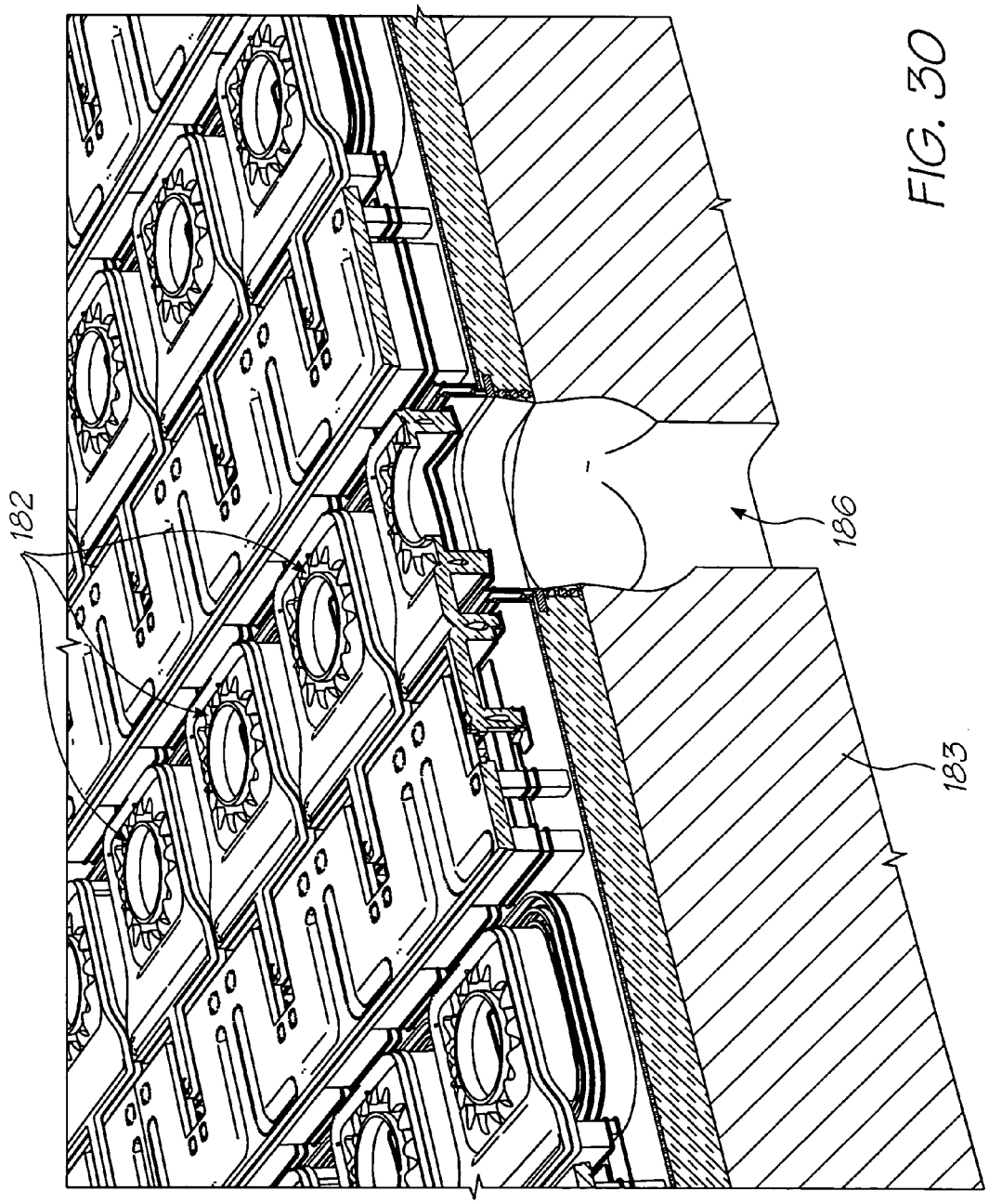
FIG. 30 shows a perspective view (partly in section) of a portion of a nozzle system of a printhead integrated circuit that is incorporated in a printhead of the printer of FIG. 1.

FIG. 30 shows an array of nozzle arrangements 182. The nozzle arrangements 182 shown are identical, however different nozzle arrangements 182 may used which are fed with different colored inks and fixative. Preferably, the printhead 140 is configured with the nozzle arrangements 182 in rows, with one row each to print in one of 5 colours: Cyan; Magenta; Yellow; blacK ("CMYK"); and InfraRed ("IR"), and one row to print Fixative ("F"). CMY is provided for regular colour printing, K is provided for black text, line graphics and greyscale printing, IR is provided for applications requiring "invisible" printing, and F is provided to assist in the prevention of smudging of the printouts at high-speed.

The printhead 140 can however be adapted to print using any desired number of colours, and can comprise a monolithic printhead IC or require multiple substrates depending upon implementation. Further, the rows of the nozzle arrangements 182 are staggered with respect to each other, allowing closer spacing of ink dots during printing than would be possible with a single row of nozzles. The multiple rows also allow for redundancy (if desired), thereby allowing for a predetermined failure rate per nozzle.

Figure 31:
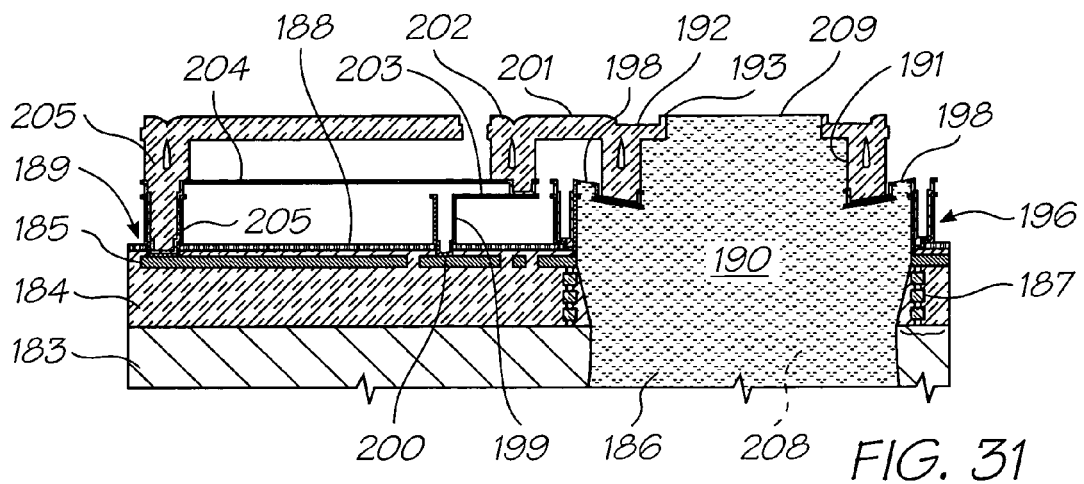
FIG. 31 shows a vertical sectional view of a single nozzle (of the nozzle system shown in FIG. 30) in a quiescent state.

The printhead ICs of the printhead 140 are manufactured using an integrated circuit fabrication technique and, as previously indicated, embody a micro-electromechanical system (MEMS). Referring to FIG. 31, which shows a single nozzle, each printhead IC includes a silicon wafer substrate 183 and CMOS microprocessing circuitry formed thereon. This is done by depositing a silicon dioxide layer 184 on the substrate 183 as a dielectric layer and aluminium electrode contact layers 185 on the silicon dioxide layer 184. Both the substrate 183 and the layer 184 are etched to define an ink channel 186, and an aluminium diffusion barrier 187 is positioned about the ink channel 186.

A passivation layer 188 of silicon nitride is deposited over the aluminium contact layers 185 and the layer 184. Portions of the passivation layer 188 that are positioned over the contact layers 185 have openings 189 therein to provide access to the contact layers 185.

Each nozzle includes a nozzle chamber 190 which is defined by a nozzle wall 191, a nozzle roof 192 and a radially inner nozzle rim 193. The ink channel 186 is in fluid communication with the chamber 190.

A moveable rim 194, that includes a movable seal lip 195, is located at the lower end of the nozzle wall 191. An encircling wall 196 surrounds the nozzle and provides a stationery seal lip 197 that, when the nozzle is at rest as shown in FIG. 31, is adjacent the moveable rim 194. A fluidic seal 198 is formed due to the surface tension of ink trapped between the stationery seal lip 197 and the moveable seal lip 195. This prevents leakage of ink from the chamber whilst providing a low resistance coupling between the encircling wall 196 and the nozzle wall 191.

The nozzle wall 191 forms part of lever arrangement that is mounted to a carrier 199 having a generally U-shaped profile with a base 200 attached to the layer 188. The lever arrangement also includes a lever arm 201 that extends from the nozzle wall and incorporates a lateral stiffening beam 202. The lever arm 201 is attached to a pair of passive beams 203 that are formed from titanium nitride and are positioned at each side of the nozzle, (best seen in FIGS. 34 and 35). The other ends of the passive beams 203 are attached to the carriers 199.

The lever arm 201 is also attached to an actuator beam 204, which is formed from TiN. This attachment to the actuator beam is made at a point which is a small, but critical, distance higher than the attachments to the passive beam 203.

Figure 33:
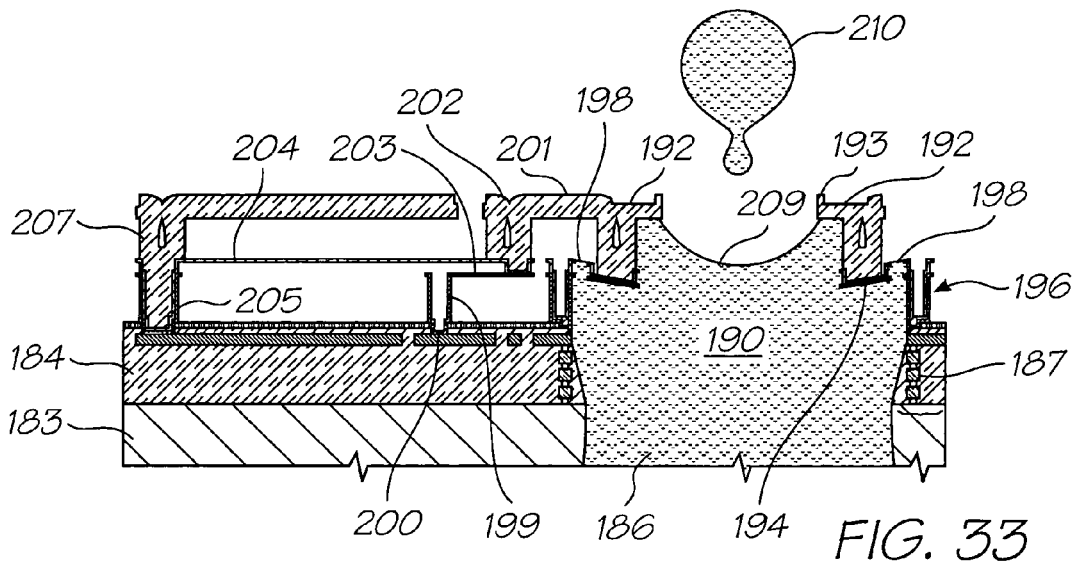
FIG. 33 shows a vertical sectional view of the nozzle of FIG. 32 at a later actuation state.
Figure 34:
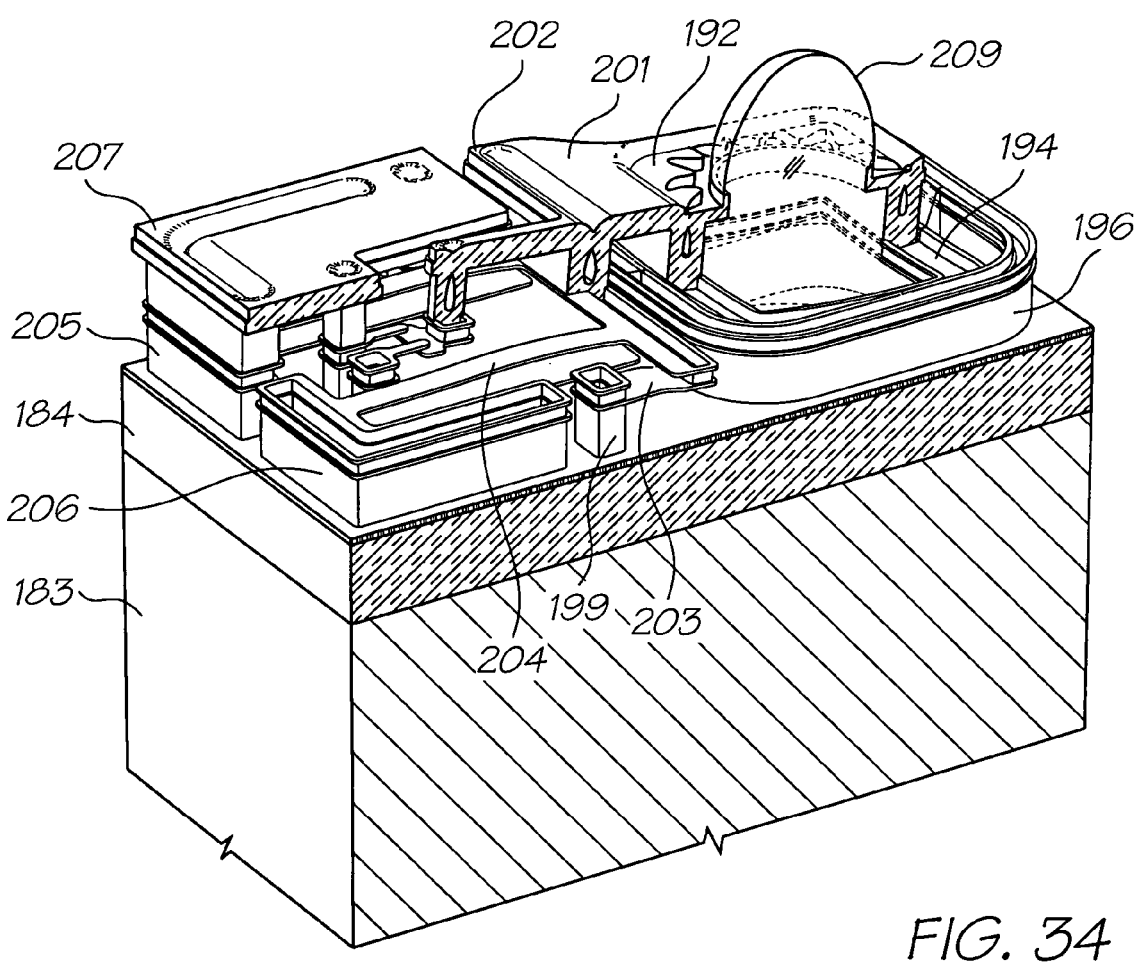
FIG. 34 shows in perspective a partial vertical sectional view of the nozzle at the initial actuation state shown in FIG. 32.
Figure 35:
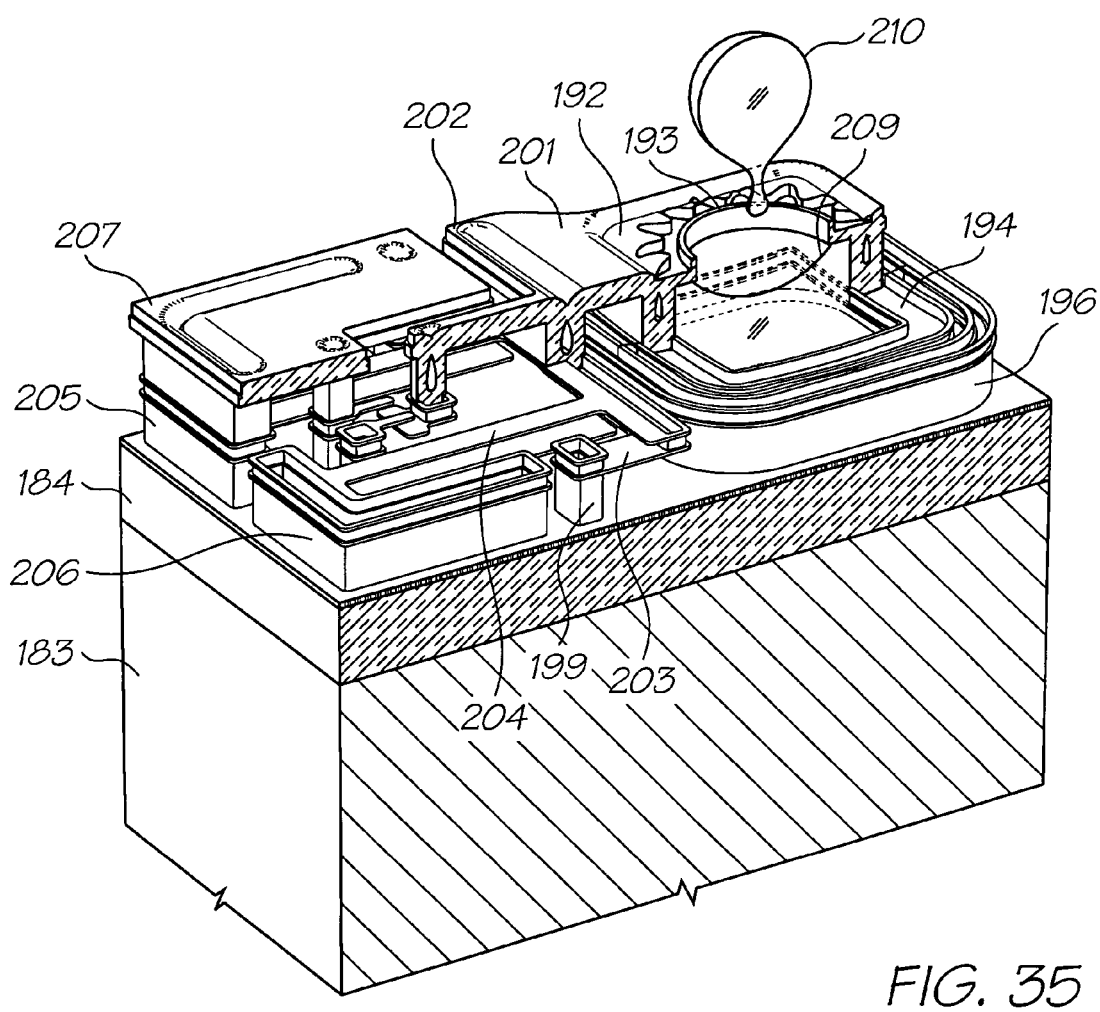
FIG. 35 shows in perspective a partial vertical sectional view of the nozzle at the later actuation state shown in FIG. 33.

As can best be seen from FIGS. 34 and 35, the actuator beam 204 is substantially U-shaped in plan, defining a current path between an electrode 205 and an opposite electrode 206. Each of the electrodes 205 and 206 is electrically connected to a respective point in the contact layer 185. The actuator beam 204 is also mechanically secured to an anchor 207, and the anchor 207 is configured to constrain motion of the actuator beam 204 to the left of FIGS. 31 to 33 when the nozzle arrangement is activated.

The actuator beam 204 is conductive, being composed of TiN, but has a sufficiently high enough electrical resistance to generate self-heating when a current is passed between the electrodes 205 and 206. No current flows through the passive beams 203, so they do not experience thermal expansion.

In operation, the nozzle is filled with ink 208 that defines a meniscus 209 under the influence of surface tension. The ink 208 is retained in the chamber 190 by the meniscus 209, and will not generally leak out in the absence of some other physical influence.

To fire ink from the nozzle, a current is passed between the contacts 205 and 206, passing through the actuator beam 204. The self-heating of the beam 204 causes it to expand, with the actuator beam 204 being dimensioned and shaped so that it expands predominantly in a horizontal direction with respect to FIGS. 31 to 33. The expansion is constrained to the left by the anchor 207; so the end of the actuator beam 204 adjacent the lever arm 201 is impelled to the right.

The relative horizontal inflexibility of the passive beams 203 prevents them from allowing much horizontal movement of the lever arm 201. However, the relative displacement of the attachment points of the passive beams and actuator beam respectively to the lever arm causes a twisting movement that, in turn, causes the lever arm 201 to move generally downwardly with a pivoting or hinging motion. However, the absence of a true pivot point means that rotation is about a pivot region defined by bending of the passive beams 203.

Figure 32:
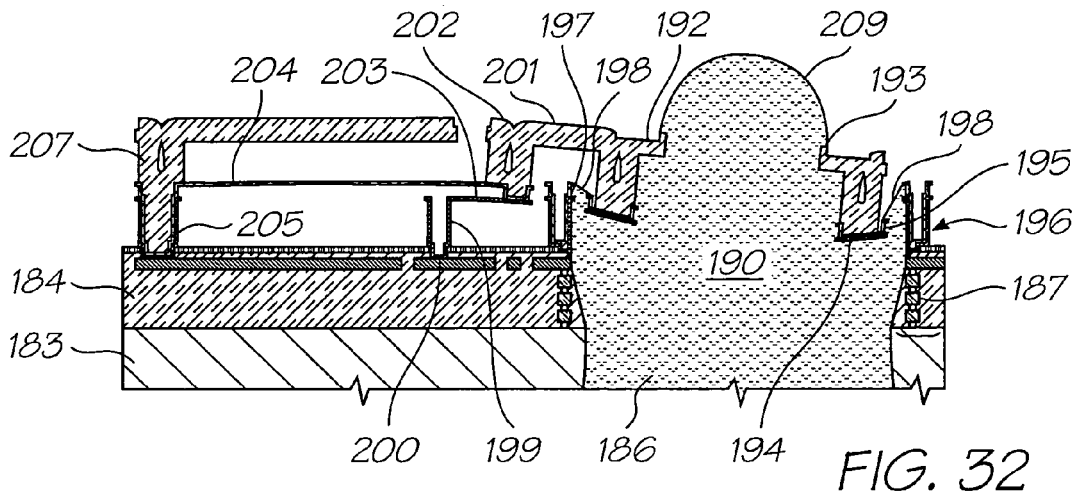
FIG. 32 shows a vertical sectional view of the nozzle of FIG. 31 at an initial actuation state.

The downward movement (and slight rotation) of the lever arm 201 is amplified by the distance of the nozzle wall 191 from the passive beams 203. The downward movement of the nozzle walls and roof causes a pressure increase within the chamber 190, causing the meniscus 209 to bulge as shown in FIG. 32. The surface tension of the ink causes the fluid seal 198 to be stretched by this motion, however ink is not allowed to leak out.

As shown in FIG. 33, at the appropriate time the drive current is stopped and the actuator beam 204 quickly cools and contracts. This contraction causes the lever arm 201 to commence its return to the quiescent position, which in turn causes a reduction in pressure in the chamber 190. The interplay of the momentum of the bulging ink and its inherent surface tension, and the negative pressure caused by the upward movement of the nozzle chamber 190 causes thinning, and ultimately snapping, of the bulging meniscus 209 to define an ink drop 210 that continues upwards until it contacts passing print media.

Immediately after the drop 210 detaches, the meniscus 209 forms the concave shape shown in FIG. 33. Surface tension causes the pressure in the chamber 190 to remain relatively low until ink has been suctioned upwards through the inlet 186, which returns the nozzle arrangement and the ink to the quiescent state shown in FIG. 31.

Figure 36:
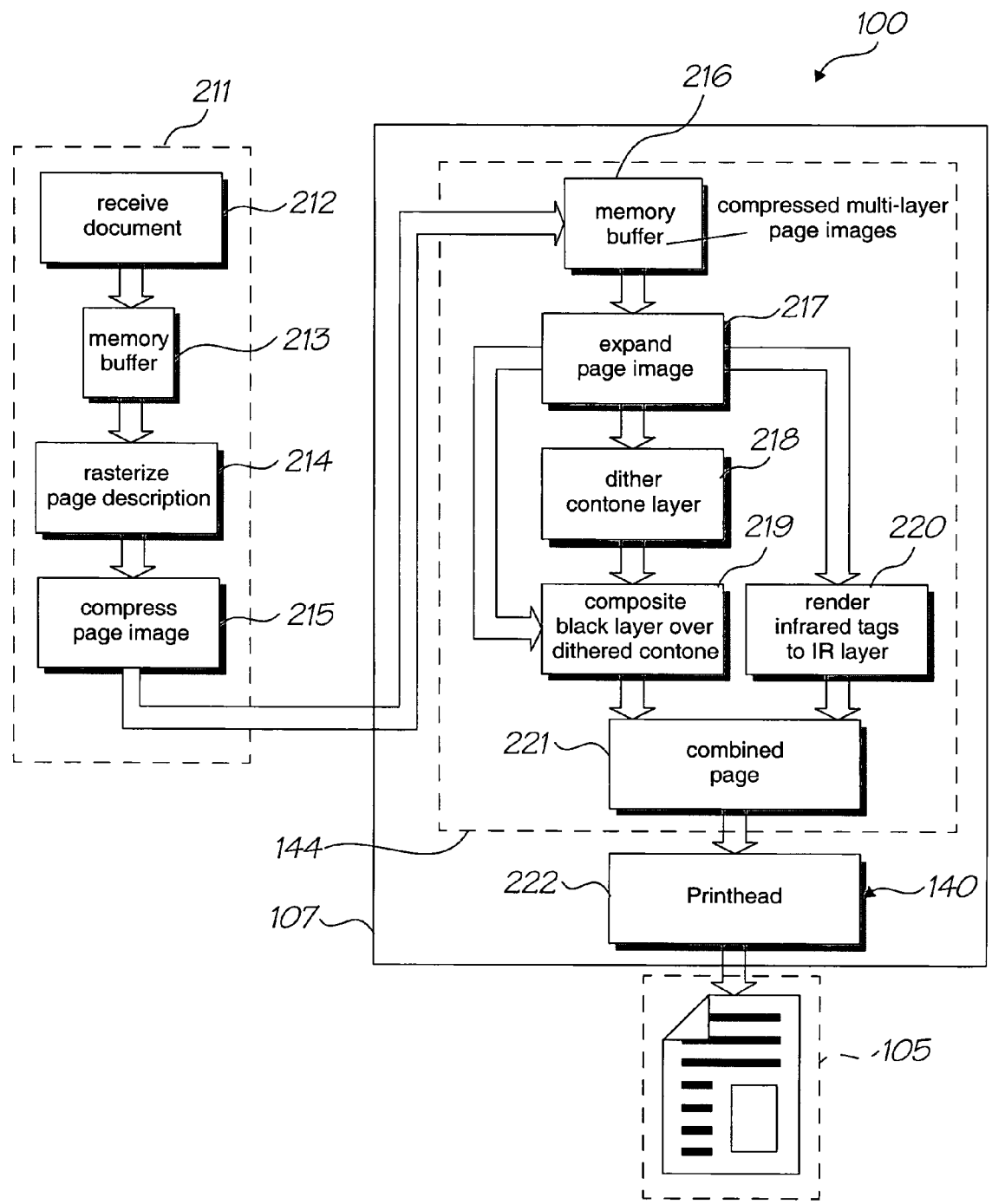
FIG. 36 shows a schematic diagram of document data flow in the printer of FIG. 1.
Figure 37:
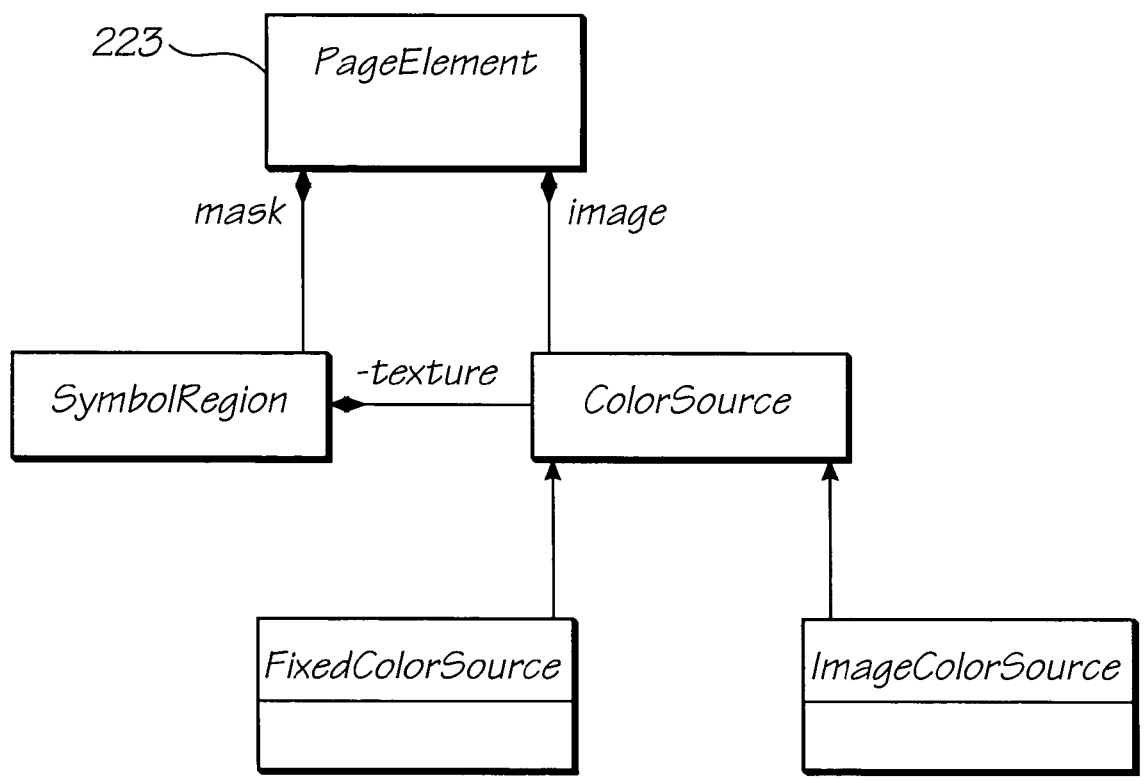
FIG. 37 illustrates a data representation of a page element used in FIG. 36.

In order to control the delivery of the drops from each of the nozzles, the print engine assembly 107 uses the drive electronics 144. As described earlier, the drive electronics 144 receives image data of print jobs to be printed by the printer 100. Referring to FIG. 36, this image data may be received from an external data source, such as a computer system or user's PC 211. The PC 211 is programmed to perform various steps involved in printing image data (i.e., a document), including receiving the document (step 212), buffering and rasterising the document to provide a page description (steps 213 and 214) and compressing this to provide a page image (step 215) suitable for transmission to the print engine assembly 107 of the printer 100.

At the drive electronics 144 of the print engine assembly 107 provided in the printer 100, the compressed, multi-layered page image is buffered (step 216) and then expanded to separate the different layers of the page image (step 217). The expanded contone layer is dithered (step 218) and then the black layer is composited over the dithered contone layer (step 219). Coded data can also be rendered (step 220) to form an additional layer, to be printed using infrared ink, for example, that is substantially invisible to the human eye. The black, dithered contone and infrared layers are combined (step 221) to form a page that is supplied to the printhead 140 for printing (step 222), which as mentioned above, is preferably configured to print in 5 colours.

Further, the document data is preferably divided into a high-resolution bi-level mask layer for text and line art and a medium-resolution contone colour image layer for images or background colours. Optionally, coloured text can be supported by the addition of a medium-to-high-resolution contone texture layer for texturing text and line art with colour data taken from an image or from flat colours. The contone layers are generalised by representing them in abstract "image" and "texture" layers which can refer to either image data or flat colour data. This division of data into layers based on content follows the base mode Mixed Raster Content (MRC) model known to those skilled in the art. Like the MRC base mode, compromises are made in some cases when data to be printed overlap. For example, all overlaps may be reduced to a 3-layer representation in a process (collision resolution) embodying the compromises explicitly. The central data structure is a generalised representation of the three layers, called a page element 223, shown in a simplified UML diagram in FIG. 37. The page element 223 can be used to represent units ranging from single rendered elements emerging from a rendering engine up to an entire band of a print job. Conceptually, the bi-level symbol region selects between the two colour sources, as described in more detail below with reference to FIGS. 37 and 38. It will be appreciated that the device components shown in FIG. 38, which carry out the steps 212 to 222 shown in FIG. 36, will typically be device dependent, in that they process the data into a form required by a software or hardware component further downstream.

Figure 38:
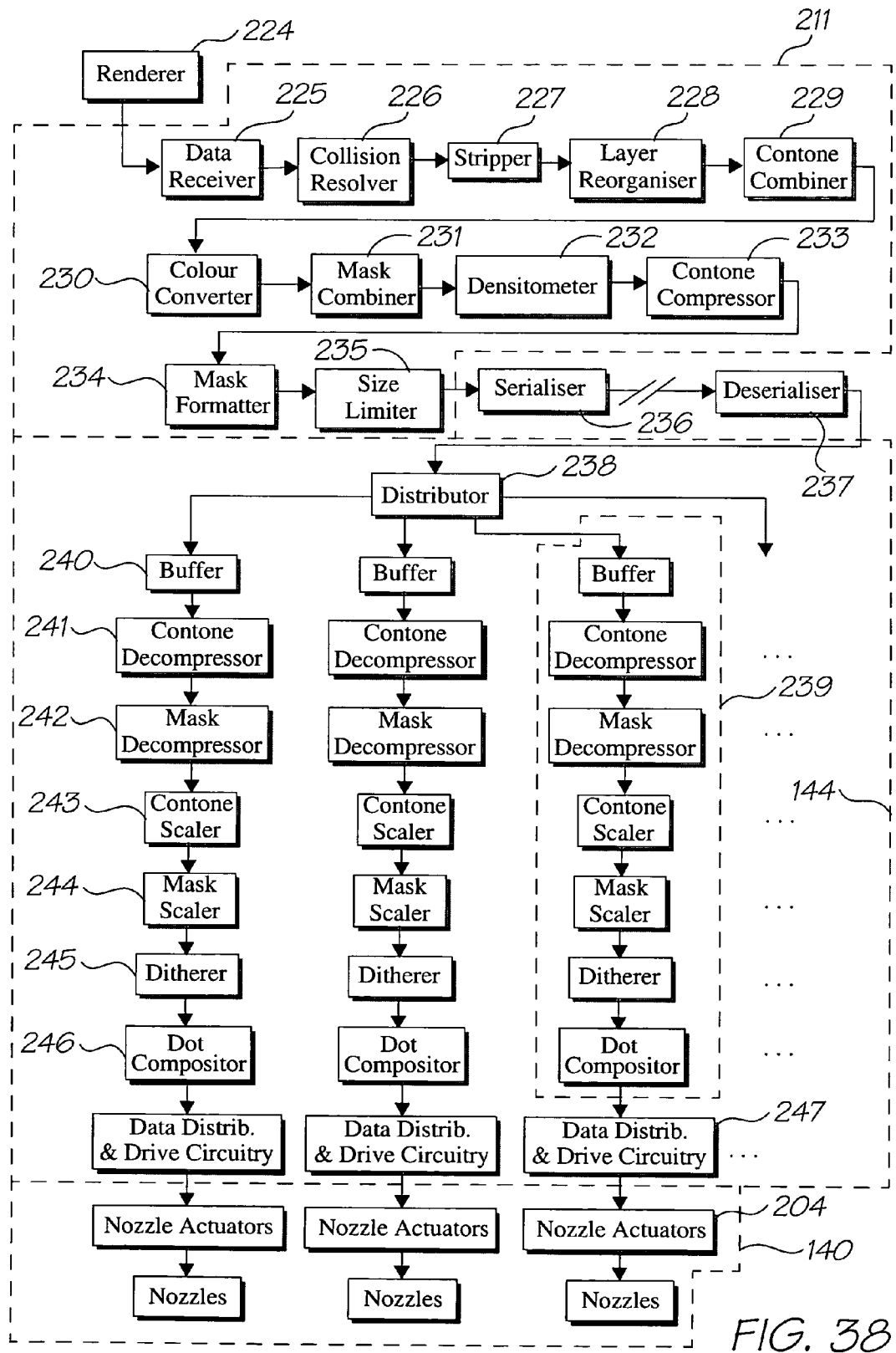
FIG. 38 shows a more detailed schematic diagram showing an architecture used in FIG. 36.

In FIG. 38, a renderer 224 is provided outside of the more general printer system pipeline shown in FIG. 36 in order to render files to be printed and deliver the rendered elements to a data receiver 225 (step 212) of the pipeline, using an Application Programming Interface (API) exposed by the data receiver 225 for that purpose. The rendered elements are delivered in order according to the painter's algorithm, which is well known to those skilled in the art. The data passed in through the API is converted by the data receiver 225 into lists of dictionaries and page elements for processing in later stages.

The data is then rasterised (step 214 in FIG. 36) as follows. A collision resolver 226 accepts the simple page elements created by the data receiver 225 (via buffering at step 213) and creates a fully opaque "resolved" page element for each intersection of a new element with the background and any elements already present. Fundamentally, the collision resolver 226 guarantees that the entire page is tiled with opaque elements. A stripper 227 divides a band of data into horizontally overlapping pieces, which is performed since the printer 100 is relatively fast and as such uses multiple parallel devices in order to achieve the required output dot-rate. In such cases, each horizontally overlapping piece is fed into a corresponding device downstream. Where such data division is not required, the stripper 227 can be omitted.

Different printing configurations will require different configurations of layers for delivery to the downstream hardware. A layer reorganiser 228 converts 3-layer page elements to the appropriate 2- or 3-layer form for the specific configuration. Again, there may be cases in which this function is not required, in which case the layer organiser 228 can be omitted. A contone combiner 229 combines and clips the image and texture layers of all page elements in a strip into single image and texture layers, as required by downstream hardware.

A colour converter 230 transforms the contone planes of all page elements from the input colour space to a device-specific colour space (which is usually CMYK). A mask combiner 231 performs the same operation on the mask layer as the contone combiner 229 performs on the contone layers. All elements are clipped to a strip boundary and drawn into a single mask buffer.

A densitometer 232 measures the density of the current page as a percentage of total possible density. This operation is necessary when the power supply of the printer 100 is not able to handle a fully dense page at full speed. A contone compressor 233 compresses the contone layers of all page elements in order to reduce downstream memory and/or transmission bandwidth requirements. A mask formatter 234 converts the mask layer of page elements, which may be represented as regions of placed symbol references, into the form expected by a downstream mask decompressor.

A size limiter 235 ensures that all size limitations, for bands and for entire pages, are adhered to, by either dividing bands into smaller bands or by recompressing the data, repeating until the constraint is satisfied. If data is to be transmitted to the printer 100 between pipeline stages, a serialised form of the data structures is generated (in a serialiser 236), transmitted, then deserialised (in a deserialiser 237).

Within the drive electronics 144 of the print engine assembly 107 incorporated in the printer 100, a distributor 238 converts data from a proprietary representation into a hardware-specific representation and ensures that the data for each strip is sent to the correct hardware device whilst observing any constraints or requirements on data transmission to these devices. The distributor 238 distributes the converted data to an appropriate one of a plurality of pipelines 239. The pipelines 239 are identical to each other, and in essence provide decompression, scaling and dot compositing functions to generate a set of printable dot outputs for the nozzles of the printhead 140.

Each pipeline 239 includes a buffer 240 for receiving the page image data from the PC 211 (step 216 in FIG. 36). A contone decompressor 241 decompresses the colour contone planes and a mask decompressor 242 decompresses the monotone (text) layer (step 217 in FIG. 36). Further, a contone scaler 243 and a mask scaler 244 are provided to scale the decompressed contone and mask planes, respectively, to take into account the size of the print media onto which the processed page is to be printed by the printhead 140.

The scaled contone planes are then dithered by a ditherer 245 using stochastic dispersed-dot dither (step 218 in FIG. 36). Clustered-dot, or amplitude-modulated, dither is not used since dispersed-dot, or frequency-modulated, dither reproduces high spatial frequencies (i.e., image detail) almost to the limits of the dot resolution while simultaneously reproducing lower spatial frequencies to their full colour depth when spatially integrated by the eye. A stochastic dither matrix is carefully designed to be relatively free of objectionable low-frequency patterns when tiled across the image. As such, its size typically exceeds the minimum size required to support a particular number of intensity levels (e.g., 16×16×8 bits for 257 intensity levels).

The dithered planes are then composited in a dot compositor 246 on a dot-by-dot basis to provide dot data suitable for printing (steps 219 and 221 in FIG. 36). This data is forwarded to data distribution and drive circuitry 247, which in turn distributes the data to the correct nozzle actuators 204 of the printhead 140 which in turn cause ink to be ejected from the correct nozzles at the correct time (step 222 in FIG. 36).

In the above system, a mainly software-based PC portion 211 is provided prior to the serialiser 236, and a mainly hardware-based print engine assembly portion 107, that is located within the printer 100 remote from the PC 211, is provided including everything from the deserialiser 237 onwards. It will be appreciated, however, that the indicated division between computer system and printer is somewhat arbitrary, and various components can be placed on different sides of the divide without substantially altering the operation as a whole. It will also be appreciated that some of the device components can be handled in hardware or software remotely from the computer system and printer. For example, rather than relying on the general-purpose processor of the PC, some of the components in the architecture can be accelerated using dedicated hardware.

Preferably, the hardware pipelines 239 are embodied in a controller of the print engine assembly 107, which also preferably includes one or more system on a chip (SoC) components, as well as the print engine assembly pipeline control application specific logic, configured to perform some or all of the functions described above in relation to the printing pipeline.

Figure 39:
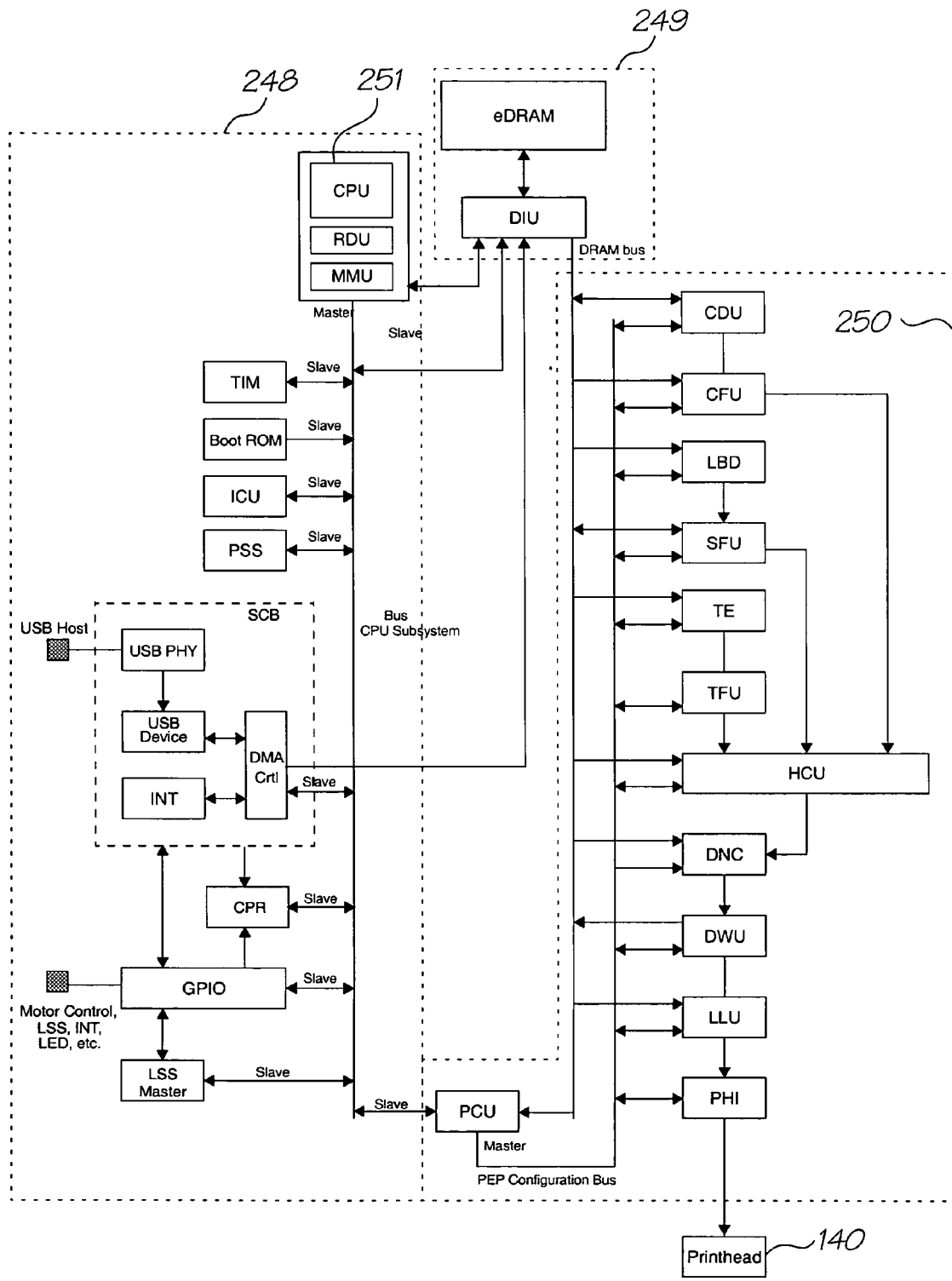
FIG. 39 shows a schematic view of a controller incorporated in a print engine assembly of the printer of FIG. 1.

Referring to FIG. 39, from the highest point of view the controller of the print engine assembly 107 consists of three distinct subsystems: a central processing unit (CPU) subsystem 248, a dynamic random access memory (DRAM) subsystem 249 and a print engine assembly pipeline (PEP) subsystem 250. Various components of these subsystems 248 to 250 are described below, with a more detailed description of these components, including their various functions, being provided later in Tables 1 to 3.

The CPU subsystem 248 includes a CPU 251 that controls and configures all aspects of the other subsystems and provides general support for interfacing and synchronizing the various components of the printer 100 with the print engine assembly 107. It also controls the low-speed communication to Quality Assurance (QA) devices (described in more detail later). The CPU subsystem 248 also contains various peripherals to aid the CPU 251, such as General Purpose Input Output ("GPIO"), which includes motor control, etc, Interrupt Controller Unit ("ICU"), Low-Speed Serial ("LSS") master and general Timers ("TIM").

The DRAM subsystem 249 accepts requests from the CPU 251, Serial Communications Block ("SCB") on the CPU subsystem 248, which provides a full speed USB1.1 interface to the host as well as an Interface ("INT") to other controllers of the print engine assembly 107 and blocks within the PEP subsystem 250. The DRAM subsystem 249, and in particular DRAM Interface Unit ("DIU") thereof, arbitrates the various requests and determines which request should win access to DRAM incorporated therein. DIU arbitrates based on configured parameters, to allow sufficient access to DRAM for all requestors. DIU also hides the implementation specifics of DRAM, such as page size, number of banks and refresh rates.

The PEP subsystem 250 accepts compressed pages from DRAM and renders them to bi-level dots for a given print line destined for PrintHead Interface ("PHI") that communicates directly with the printhead ICs of the printhead 140. The first stage of the page expansion pipeline includes Contone Decoder Unit ("CDU"), Lossless Bi-level Decoder ("LBD") and Tag Encoder ("TE"). CDU expands the JPEG-compressed contone (typically CMYK) layers, LBD expands the compressed bi-level layer (typically K), and TE encodes infrared tags for later rendering (typically in IR or K ink). The output from the first stage is a set of buffers: Contone FIFO Unit ("CFU"); Spot FIFO Unit ("SFU"); and Tag FIFO Unit ("TFU"). CFU and SFU buffers are implemented in dynamic random access memory.

The second stage includes Halftone Compositor Unit ("HCU"), which dithers the contone layer and composites position tags and the bi-level spot layer over the resulting bi-level dithered layer. A number of compositing options can be implemented, depending upon the printhead 140 with which the controller is used. Up to six channels of bi-level data are produced from this stage, although not all channels may be present on the printhead 140. For example, the printhead 140 may be CMY only, with K pushed into the CMY channels and IR ignored. Alternatively, the encoded tags may be printed in K if IR ink is not available (or for testing purposes).

In the third stage, Dead Nozzle Compensator ("DNC") compensates for dead nozzles in the printhead 140 by colour redundancy and error diffusing of dead nozzle data into surrounding dots. The resultant bi-level six channel dot-data (typically CMYK, IR and fixative) is buffered and written to a set of line buffers stored in DRAM via Dotline Writer Unit (DWU). Finally, the dot-data is loaded back from DRAM, and passed to PHI via a dot FIFO (not shown). The dot FIFO accepts data from Line Loader Unit ("LLU") at the system clock rate, while PHI removes data from the dot FIFO and sends it to the printhead 140 at a rate of 2/3 times the system clock rate.

The details and functions of the above-described components of the subsystems 248 to 250 and those shown in FIG. 39 but not described above are provided in Tables 1 to 3 below, for the CPU subsystem 248, the DRAM subsystem 249 and the PEP subsystem 250, respectively.

TABLE 1

| Acronym | Component | Description |
| --- | --- | --- |
| DIU | DRAM Interface Unit | Provides an interface for DRAM read and write access for the various controllers, the CPU 251 and SCB block, arbitration between competing units and controls access to DRAM |
| DRAM | (embedded) DRAM | 20 Mbits of embedded DRAM |

TABLE 2

| Acronym | Component | Description |
| --- | --- | --- |
| CPU | Central Processing Unit | For system configuration and control |
| MMU | Memory Management Unit | Limits access to certain memory address areas in CPU user mode |
| RDU | Real-time Debug Unit | Facilitates the observation of the contents of most of the CPU addressable registers in the controller, in addition to some pseudo-registers in real time |
| TIM | (general) Timer | Contains watchdog and general system timers |
| LSS | Low-Speed Serial interfaces | Low level controller for interfacing with the QA devices |
| GPIO | General Purpose Input/Outputs | General IO controller with built-in motor control and LED pulse units and de-glitch circuitry |
| ROM | Boot ROM | 16 KBytes of System Boot ROM code |
| ICU | Interrupt Controller Unit | General Purpose interrupt controller with configurable priority, and masking |
| CPR | Clock, Power and Reset block | Central Unit for controlling and generating the system clocks and resets and power-down mechanisms |
| PSS | Power Save Storage | Storage retained while system is powered down |
| USB | Universal Serial Bus device | USB device controller for interfacing with the host USB |
| INT | Interface | Interface controller for data and control communication with other controllers in a multiple controller print engine assembly 107 |
| SCB | Serial Communication Block | Contains both USB and Interface blocks |

TABLE 3

| Acronym | Component | Description |
| --- | --- | --- |
| PCU | PEP controller | Provides the CPU 251 with the means to read and write PEP Unit registers, and read and write DRAM in single 32-bit chunks |
| CDU | Contone Decoder Unit | Expands JPEG compressed contone layer and writes decompressed contone to DRAM |
| CFU | Contone FIFO Unit | Provides line buffering between CDU and HCU |
| LBD | Lossless Bi-level Decoder | Expands compressed bi-level layer |
| SFU | Spot FIFO Unit | Provides line buffering between LBD and HCU |
| TE | Tag Encoder | Encodes tag data into line of tag dots |
| TFU | Tag FIFO Unit | Provides tag data storage between TE and HCU |
| HCU | Halftoner Compositor Unit | Dithers contone layer and composites the bi-level spot and position tag dots |
| DNC | Dead Nozzle Compensator | Compensates for dead nozzles by colour redundancy and error diffusing dead nozzle data into surrounding dots |
| DWU | Dotline Writer Unit | Writes out the six channels of dot data for a given print-line to a line store DRAM |
| LLU | Line Loader Unit | Reads the expanded page image from the line store, formatting the data appropriately for the printhead 140 |
| PHI | PrintHead Interface | Responsible for sending dot data to the nozzles of the printhead 140 and for providing line synchronization between multiple controllers, and provides a test interface to the printhead 140 such as temperature monitoring and dead nozzle identification |

Preferably, DRAM of the DRAM subsystem 249 is 2.5 Mbytes in size, of which about 2 Mbytes are available for compressed page store data. A compressed page is received in two or more bands, with a number of bands stored in memory. As a band of the page is consumed by the PEP subsystem 250 for printing, a new band can be downloaded. The new band may be for the current page or the next page. Using banding it is possible to begin printing a page before the complete compressed page is downloaded, but care must be taken to ensure that data is always available for printing or a buffer under-run may occur.

The embedded USB 1.1 device accepts compressed page data and control commands from the PC 211 (FIG. 36), and facilitates the data transfer to either DRAM, or to another controller in a multiple controller print engine assembly. A multiple controller print engine assembly 107 may be used to perform different functions depending upon the particular implementation. For example, in some cases a controller can be used simply for its onboard DRAM, while another controller attends to the various decompression and formatting functions described above. This can reduce the chance of buffer under-run, which can happen in the event that the printhead 140 commences printing a page prior to all the data for that page being received and the rest of the data is not received in time. Adding an extra controller for its memory buffering capabilities doubles the amount of data that can be buffered, even if none of the other capabilities of the additional controller are utilized.

Each controller may have several QA devices designed to cooperate with each other to ensure the quality of the mechanics of the printer 100, the quality of the ink supply so the nozzles of the printhead 140 will not be damaged during printing and the quality of the software to ensure the printhead 140 and the mechanics of the printer 100 are not damaged.

Normally, each controller of the print engine assembly 107 will have an associated QA device (not shown) which stores information on the attributes of the printer 100, such as the maximum printing speed. The cartridge unit 139 of the print engine assembly 107 also contains an ink QA device (not shown) which stores information on the cartridge unit 139, such as the amount of ink remaining in the ink storage and handling reservoirs 141. The printhead 140 also has a QA device (not shown) which is configured to act as a ROM (effectively as an EEPROM) that stores printhead-specific information such as dead nozzle mapping and the characteristics of the printhead 140. The CPU 251 in the CPU subsystem 248 of the controller also runs a logical (software) QA device (not shown) and may optionally load and run program code from a QA device that effectively acts as a serial EEPROM. Generally, all of the QA devices are physically identical, with only the contents of flash memory differentiating one from the other.

Each controller has two LSS system buses that can communicate with QA devices for system authentication and ink usage accounting. A large number of QA devices can be used per bus and their position in the system is unrestricted with the exception that printhead QA and ink QA devices should be on separate LSS busses.

In use, the logical QA device communicates with the ink QA device to determine remaining ink. The reply from the ink QA device is authenticated with reference to the printhead QA device. The verification from the printhead QA device is itself authenticated by the logical QA device, thereby indirectly adding an additional authentication level to the reply from the ink QA device.

Data passed between the QA devices, other than the printhead QA device, is authenticated by way of digital signatures. For example, HMAC-SHA1 authentication may be used for data, and RSA may be used for program code, although other schemes could be used instead.

A single controller can control a plurality of the printhead ICs of the printhead 140 and up to the six printing fluid channels (e.g., CMYK, IR and F). However, the controller is preferably colour space agnostic. Such that, although the controller can accept contone data as CMYX or RGBX, where X is an optional 4th channel, it also can accept contone data in any print colour space. Additionally, the controller provides a mechanism for arbitrary mapping of input channels to output channels, including combining dots for ink optimization and generation of channels based on any number of other channels. However, inputs are typically CMYK for contone input, K for the bi-level input, the optional IR tag dots are typically rendered to an infrared layer, and a fixative channel is generated due to the high-speed printing capability.

Further, the controller is also preferably resolution agnostic, such that it merely provides a mapping between input resolutions and output resolutions by means of scale factors and has no knowledge of the physical resolution of the printhead 140. Further still, the controller is preferably pagelength agnostic, such that successive pages are typically split into bands and downloaded into the page store as each band of information is consumed.

Figure 40:
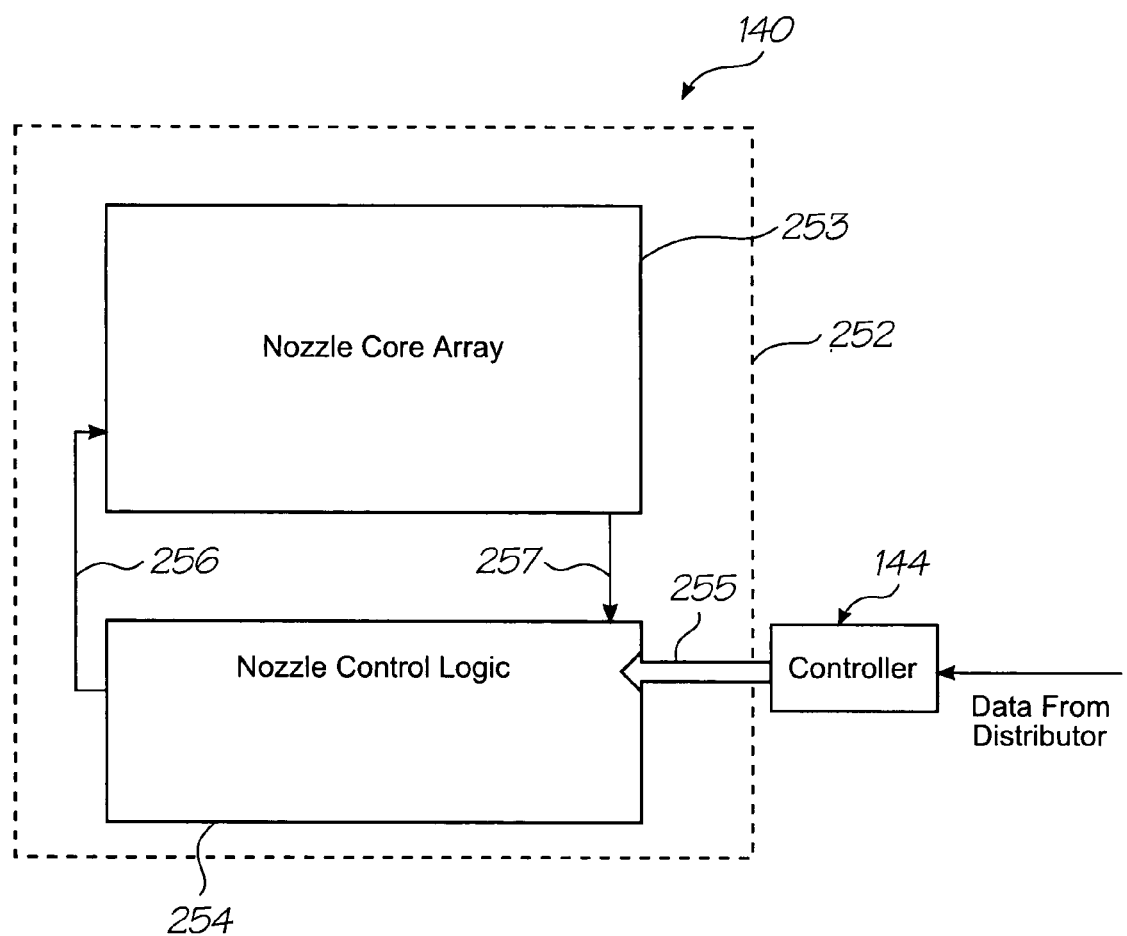
FIG. 40 shows a schematic diagram illustrating CMOS drive and control blocks for use in FIG. 36.

Turning now to FIGS. 40 to 43, the printhead ICs of the printhead 140 will be further described. For clarity, only one printhead IC 252 is shown in FIG. 40, but it will be appreciated that a corresponding arrangement is implemented for the other printhead ICs.

FIG. 40 shows an overview of the printhead IC 252 and its connections to the controller of the drive electronics 144 of the print engine assembly 107. The printhead IC 252 includes a nozzle core array 253 containing the repeated logic for firing each of the nozzles provided in the printhead IC 252 and nozzle control logic 254 for generating the timing signals to fire the nozzles in accordance with data received from the controller via a high-speed link 255. The nozzle control logic 254 is configured to send serial data to the nozzle core array 253 for printing via a link 256. Status and other operational information about the nozzle core array 253 is communicated back to the nozzle control logic 254 via another link 257.

Figure 41:
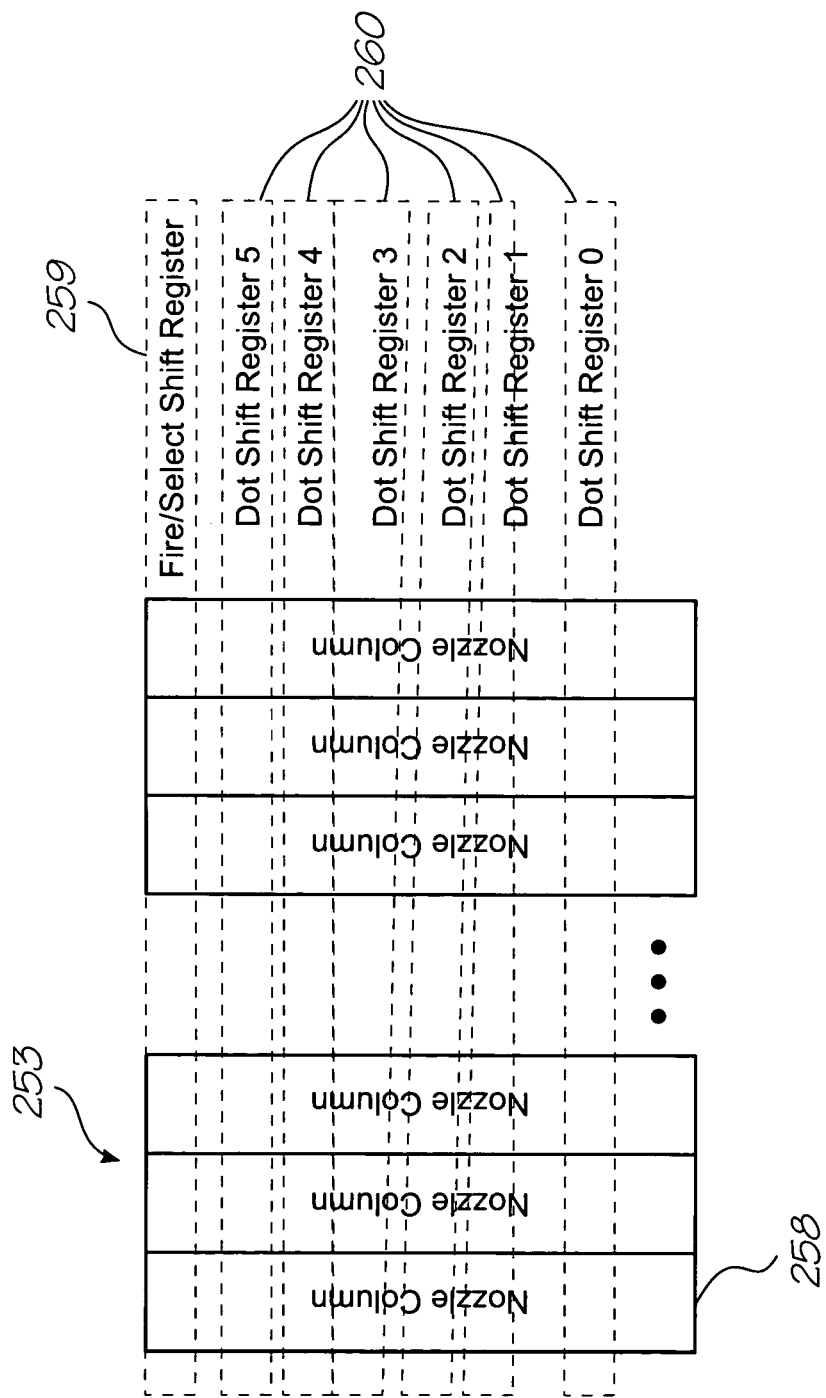
FIG. 41 shows a schematic diagram illustrating the relationship between nozzle columns and dot shift registers in the CMOS blocks of FIG. 40.
Figure 42:
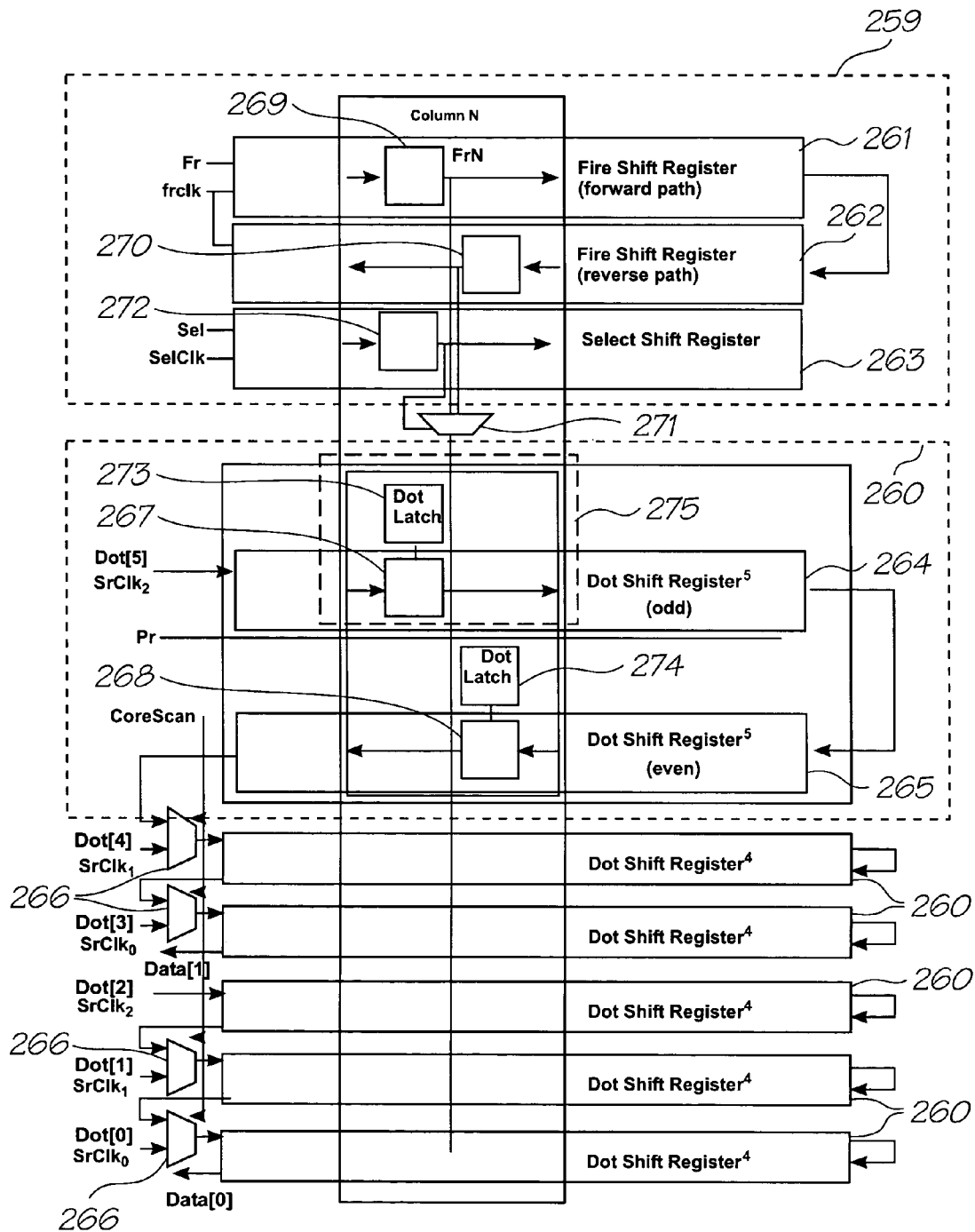
FIG. 42 shows a more detailed schematic diagram illustrating a unit cell and its relationship to the nozzle columns and dot shift registers of FIG. 41.

The nozzle core array 253 is shown in detail in FIGS. 41 and 42. As can be seen in FIG. 41 the nozzle core array 253 comprises an array of nozzle columns 258, a fire/select shift register 259 and up to six channels, each of which is represented by a corresponding dot shift register 260.

As shown in FIG. 42, the fire/select shift register 259 includes a forward path fire shift register 261, a reverse path fire shift register 262 and a select shift register 263, and each dot shift register 260 includes an odd dot shift register 264 and an even dot shift register 265. The odd and even dot shift registers 264 and 265 are connected at one end such that data is clocked through the odd shift register 264 in one direction, then through the even shift register 265 in the reverse direction. The output of all but the final even dot shift register 265 is fed to one input of one of plurality of multiplexers 266. This input of the multiplexers 266 is selected by a signal (CoreScan) during post-production testing. In normal operation, the CoreScan signal selects dot data input Dot[x] supplied to the other input of each of the multiplexers 266. This causes Dot[x] for each colour to be supplied to the respective dot shift registers 260.

A single column N of the array of nozzle columns 258 is also shown in FIG. 42. In the embodiment shown, the column N includes 12 data values, comprising an odd data value 267 and an even data value 268 for each of the six dot shift registers 260. Column N also includes an odd fire value 269 from the forward fire shift register 261 and an even fire value 270 from the reverse fire shift register 262, which are supplied as inputs to a multiplexer 271. The output of the multiplexer 271 is controlled by a select value 272 in the select shift register 263. When the select value 272 is zero, the odd fire value 269 is output, and when the select value 272 is one, the even fire value 270 is output.

Each of the odd and even data values 267 and 268 is provided as an input to corresponding odd and even dot latches 273 and 274, respectively. Each of the dot latches 273 and 274 and its associated data value 267 and 268 form a unit cell, such as a unit cell 275 shown in FIG. 42 for the odd latch 273 and the odd data value 267. This situation for the odd dot shift register 264 is illustrated in more detail in FIG. 43, which is also applicable to the situation for the even dot shift register 265.

Figure 43:
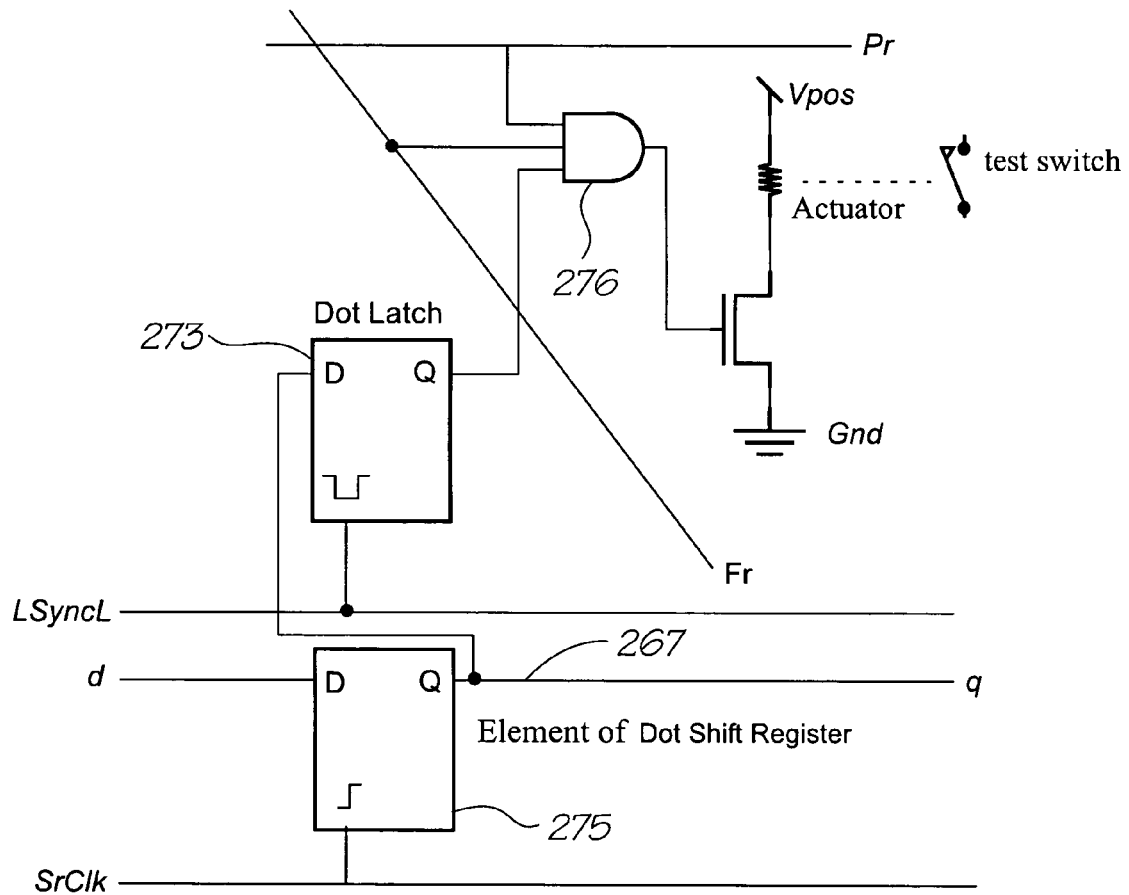
FIG. 43 shows a circuit diagram illustrating logic for a single nozzle in FIG. 36.

Referring to FIG. 43, the odd dot latch 273 is a D-type flip-flop that accepts the output of the odd data value 267, which is held by the unit cell (a D-type flip-flop) 275 which forms an element of the odd dot shift register 264. The data input to the flip-flop 275 is provided from the output of a previous element in the odd dot shift register 264 (unless the element under consideration is the first element in the shift register 260, in which case its input is the Dot[x] value). Data is clocked from the output of the flip-flop 275 into the odd dot latch 273 upon receipt of a negative pulse provided on line LsyncL.

The output of the odd dot latch 273 is provided as one of the inputs to a three-input AND gate 276. Other inputs to the AND gate 276 are a fire enable (Fr) signal (from the output of multiplexer 271) and a pulse profile (Pr) signal. The firing time of a nozzle is controlled by the pulse profile signal Pr and can be, for example, lengthened to take into account a low voltage condition that arises due to low battery, in a situation where the power supply of the printer 100 is provided as a battery element (not shown) mounted in the housing 101, for example. This is to ensure that a relatively consistent amount of ink is efficiently ejected from each nozzle as it is fired. The profile signal Pr may be the same for each of the dot shift registers 260, which provides a balance between complexity, cost and performance. However, the Pr signal can be applied globally (i.e., is the same for all nozzles) or can be individually tailored to each unit cell or even to each nozzle.

Once the data is loaded into the odd dot latch 273, the Fr and Pr signals are applied to the AND gate 276, combining to trigger the nozzle to eject a dot of ink for each odd dot latch 273 that contains a logic 1.

The signals for each nozzle channel as shown in FIGS. 42 and 43 are summarized in Table 4 below.

TABLE 4

| Name | Direction | Description |
|---|---|---|
| d | Input | Input dot pattern to shift register bit |
| q | Output | Output dot pattern from shift register bit |
| SrClk | Input | Shift register clock in; d is captured on rising edge of this clock |
| Fr | Input | Fire enable; needs to be asserted for nozzle to fire |
| Pr | Input | Profile; needs to be asserted for nozzle to fire |

As shown in FIG. 43, the Fr signals are routed on a diagonal to enable firing of one colour in the current column, the next colour in the following column, and so on. This averages the current demand by spreading it over six columns in time-delayed fashion.

The dot latches and the latches forming the various shift registers are fully static and are CMOS-based. The design and construction of latches is well known to those skilled in the art and so is not described in detail herein.

As stated earlier, the printhead 140, which has a printing surface or zone across the width of a maximum-sized page of print media that can be printed on using the printer 100, may incorporate at least 5,000 nozzles and even more than 50,000 nozzles in order to provide the required quality of printing at the high-speed printing of the printer 100 across this page-width. For example, the combined printhead ICs 252 may define a printhead having 13824 nozzles per channel, including the coloured ink and fixative channels.

The nozzle speed may be as much as 20 kHz for the printer 100 capable of printing at about 60 ppm, and even more for higher speeds. At this range of nozzle speeds the amount of ink than can be ejected by the entire printhead 140 is at least 50 million drop per second. However, as the number of nozzles is increased to provide for higher-speed and higher-quality printing at least 100 million drops per second, preferably at least 300 million drops per second, and more preferably at least 1 billion drops per second may be delivered.

Consequently, in order to accommodate printing at these speeds, the drive electronics 144, and particularly the controller(s) thereof, must calculate whether a nozzle is to eject a drop of ink at a rate of at least 50 million dots per second, and depending on the printing speed, at least 100 million dots per second, preferably at least 300 million dots per second, and more preferably at least 1 billion dots per second for the higher-speed, higher-quality printing applications.

For the colour printer 100 printing with the maximum width of A4 paper, the above-described ranges of the number of nozzles and print speeds results in an area print speed of at least 50 cm$^2$ per second, and depending on the printing speed, at least 100 cm$^2$ per second, preferably at least 200 cm$^2$ per second, and more preferably at least 500 cm$^2$ per second at the higher-speeds.

The above-described characteristics of the printer 100 enable it to print at high-quality of at least 1200 dpi, preferably at least 1600 dpi, in colour at the high-speed of at least 30 ppm, preferably at least 60 ppm. These characteristics coupled with the reduced footprint and size of the printer 100, as discussed earlier, results in a compact high-speed, high-quality printer which heretofore has not been possible. For example, the printer 100, not including the stand assembly 172, may be constructed to have an overall width of about 300 mm, an overall height of about 465 mm and an overall depth of about 230 mm for accommodating A4 paper as the maximum-sized paper. However, other dimensions are possible depending upon the application for the printer.

Thus, it is envisaged that the fully assembled printer 100 has a minimum total volume, i.e., the sum of the actual volumes occupied by the components of the printer 100 including the housing 101, the head unit 102, the source tray assembly 103 and the base unit 112, of about 30,000 cm$^3$ and a maximum total volume, i.e., the overall space occupied by the printer 100, of about 40,000 cm$^3$. This results in a minimum printing rate to printer size (volume) ratio of at least about 0.002 ppm/cm$^3$ for printing at 60 ppm. In cases where the printer 100 is able to print at even higher rates, i.e., more than 60 ppm and up to as much as 500 ppm for duplex printing as described earlier, a printing rate to printer size ratio of at least about 0.005 ppm/cm$^3$, preferably at least about 0.01 ppm/cm$^3$ and more preferably at least about 0.02 ppm/cm$^3$ is possible.

Further, the components of the printer 100 including the housing 101, the head unit 102, the source tray assembly 103, the base unit 112 and the various components thereof can in the most part be moulded from lightweight material, such as plastic. As such, along with the above-described reduced size, the weight of the printer 100 can also be reduced. For example, it is envisaged that the printer 100 will have a weight of about 3.5 kg to about 4.6 kg. Thus, at the above-mentioned possible printing rates of the colour printer 100 beginning at about 30 ppm, a printing rate to printer weight ratio of about 0.2 ppm/kg is possible. Even if different, heavier materials are used for constructing the components of the printer 100 a printing rate to printer weight ratio of at least about 0.5 ppm/kg, preferably at least about 1 ppm/kg, and more preferably at least about 5 ppm/kg is possible as the printing rate is increased. Such printing rate to printer weight ratios are much better than those possible for conventional colour printers capable of printing at high-speed, since these printers are typically very large and heavy.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

What is claimed is:

1. A printer having a substantially vertical form factor, the printer comprising:
   a base for supporting the printer;
   a substantially vertically extending body extending from the base;
   a print engine for printing an image onto print media, the print engine being supported at a top of the substantially vertically extending body, and overhanging a front surface of the substantially vertically extending body;
   a source tray assembly for holding a supply of print media, the source tray assembly provided against a back surface of the substantially vertically extending body; and
   a media collector disposed beneath the overhanging print engine, the media collector defining a collection surface on the front surface of the substantially vertically extending body, the media collector having a foot portion projecting from the front surface to catch sheets falling from an outlet of the overhanging print engine.

2. A printer according to claim 1, wherein the print engine comprises a pagewidth inkjet printhead.

3. A printer according to claim 1, wherein the source tray assembly is inclined to the vertical by an angle of about 15° to 20°.

4. A printer according to claim 1, wherein the media collector is inclined to the vertical by an angle of about 10° to 15°.

5. A printer according to claim 1, wherein the source tray assembly comprises an input tray adapted to be hingedly received by a receiving portion of the substantially vertically extending body formed on the back surface.

6. A printer according to claim 1, wherein the print engine comprises a media transport system for transporting media from the source tray assembly to the media collector via the print engine.

7. A printer according to claim 6, further comprising a head unit hingedly engaged with the substantially vertically extending body so as to cover the print engine and media transport system.

8. A printer according to claim 7, wherein the head unit comprises a user interface via which a user of the printer is able to control the operation of the printer.

9. A printer according to claim 8, wherein the user interface comprises a touch screen for displaying information pertaining to the operation of the printer and allowing said user to control said operation by touching predefined areas of the screen.

10. A printer according to claim 8, wherein the base comprises:
 power connectors for connection to an external power source for supply of power to the media transport system, the print engine and the user interface; and
 data connectors for connection to an external data source for supply of data to the print engine and the user interface.

11. A printer according to claim 7 wherein the head unit comprises a manual feeding slot located above the position of the print engine for manual feeding of media to the print engine.

12. A printer according to claim 1, further comprising:
 a printhead incorporated in the print engine for printing on said media; and
 a transport device for transporting the media through a delivery path from the media supply to the media collector via the printhead,
 wherein the print media supply and collector are substantially vertically disposed, and
 the print media delivery path passes through an angle of at least 140°.

13. A printer according to claim 1, wherein the collection surface is arranged to impart a lateral curvature to the collected print media orthogonal to the feed direction of the media.

14. A printer according to claim 1 incorporating a system for indicating a state of the printer, the system comprising:
 a light source arranged to emit light of a plurality of colours;
 a light transmitting channel extending along a surface of the printer and arranged so as to transmit light from the light source and emit said light along a length of the channel; and
 a controller arranged to control the light source in response to a detected operational state of the printer, so that the light transmitting channel emits predefined different colours to indicate predefined different states of the printer.

15. A printer according to claim 1, further comprising:
 a housing having the print engine;
 a media supply tray partially defined by the supply surface for receiving media for printing by said print engine, said media supply tray being arranged to be received by the housing so that said media is maintained in a substantially vertical orientation; and
 a retaining element provided on the housing and arranged to contact the media when the supply tray is received by the housing so as to retain the media in said substantially vertical orientation.

16. A printer according to claim 1 arranged as a desktop printer, wherein the print engine incorporates a pagewidth printhead arranged as a two-dimensional array of at least 5000 printing nozzles for printing across the width of media supplied from the substantially vertically orientated media supply and delivered to the substantially vertically orientated media collector after printing.

17. A printer according to claim 1 arranged as a desktop printer, wherein the print engine has an array of ink ejecting nozzles configured as a pagewidth printhead arranged to print on media supplied from the substantially vertically orientated media supply by ejecting drops of ink across the width of said media at a rate of at least 50 million drops per second and to deliver the printed media to the substantially vertically orientated media collector.

18. A printer according to claim 1, wherein the source tray assembly is configured to hold the supply of print media in a substantially vertical orientation.

19. A printer according to claim 1, wherein the source tray assembly, print engine, and media collector define an inverted U-shaped media feed path along which the print media is fed, the print engine substantially defining an apex of the inverted U-shaped media feed path.

20. A printer according to claim 1, wherein the source tray assembly comprises a picker assembly provided at a top thereof, the picker assembly for feeding a sheet of print media upwards towards the print engine.

* * * * *